US011948536B2

(12) United States Patent
Friedman et al.

(10) Patent No.: US 11,948,536 B2
(45) **Date of Patent: *Apr. 2, 2024**

(54) ANALOG VIDEO TRANSPORT INTEGRATION WITH TIMING CONTROLLER

(71) Applicant: HYPHY USA INC., San Jose, CA (US)

(72) Inventors: Eyal Friedman, Cheltenham (AU); Todd Rockoff, Holgate (AU)

(73) Assignee: HYPHY USA INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/333,987

(22) Filed: Jun. 13, 2023

(65) Prior Publication Data

US 2023/0326429 A1 Oct. 12, 2023

Related U.S. Application Data

(63) Continuation of application No. 18/098,612, filed on Jan. 18, 2023, now Pat. No. 11,769,468.

(Continued)

(51) Int. Cl.
*G09G 5/00* (2006.01)
*G09G 5/18* (2006.01)

(52) U.S. Cl.
CPC ............... *G09G 5/18* (2013.01); *G09G 5/008* (2013.01); *G09G 2300/0828* (2013.01); *G09G 2310/08* (2013.01); *G09G 2370/08* (2013.01)

(58) Field of Classification Search
CPC .. H04B 1/707; H04B 1/69; H04B 1/04; H04J 13/004; H04J 13/0077; G09G 2310/0291;

(Continued)

(56) References Cited

U.S. PATENT DOCUMENTS

| | | |
|---|---|---|
| 3,204,035 A | 8/1965 | Ballard et al. |
| 3,795,765 A | 3/1974 | DeGroat et al. |

(Continued)

FOREIGN PATENT DOCUMENTS

| | | |
|---|---|---|
| CN | 101933277 | 12/2010 |
| CN | 101969319 | 2/2011 |

(Continued)

OTHER PUBLICATIONS

Eltokhy et al., "A Low Power Analog Matched-Filter with Smart Sliding Correlation", IEEJ Trans., EIS, vol. 123, No. 11, 2003, pp. 1970-1976.

(Continued)

*Primary Examiner* — Insa Sadio
(74) *Attorney, Agent, or Firm* — Beyer Law Group LLP

(57) ABSTRACT

A timing controller of a display set is integrated with an encoder for transport of analog signals between a display controller and source drivers of the display panel. The timing controller and integrated encoder are within an integrated circuit and are part of a chipset. The integrated circuit is located immediately after the SoC of a display set or is integrated within the SoC. A video signal sent to the timing controller chip is unpacked into sample values which are permuted into vectors of samples, one vector per encoder. Each vector is converted to analog, encoded and the analog levels are sent to the source drivers which decode into analog samples. Or, each digital vector is encoded and then converted to analog. A line buffer uses a memory to present a row of pixel information to the encoders. A mobile telephone has an integrated TCON with SSVT transmitter.

21 Claims, 30 Drawing Sheets

Related U.S. Application Data

(60) Provisional application No. 63/391,226, filed on Jul. 21, 2022, provisional application No. 63/317,745, filed on Mar. 8, 2022, provisional application No. 63/300,975, filed on Jan. 19, 2022.

(58) Field of Classification Search
CPC ............. G09G 2370/20; G09G 3/2096; G09G 3/3685; G09G 2310/027; G09G 2310/0275; G09G 2310/0278; G09G 2310/0289; G09G 2310/0294; G09G 2330/021; G09G 2330/06; G09G 2340/02; G09G 2350/00; G09G 2354/00; G09G 2360/04; G09G 2360/08; G09G 2370/08; G09G 2370/14; G09G 2370/16; G09G 3/001; G09G 3/003; G09G 3/3275; G09G 3/3614; G09G 3/3674; H04N 19/186; H04N 19/423; H04N 21/2381; H04N 5/92; H04N 7/20; H04N 9/79; G02B 27/017; G06F 3/011; G06F 3/016; G06F 3/1407; H04L 27/34; H04L 27/36; H04L 27/38
See application file for complete search history.

(56) References Cited

U.S. PATENT DOCUMENTS

| | | | |
|---|---|---|---|
| 5,793,759 | A | 8/1998 | Rakib et al. |
| 5,796,774 | A | 8/1998 | Kato |
| 5,870,414 | A | 2/1999 | Chaib et al. |
| 5,936,997 | A | 8/1999 | Kanda |
| 5,938,787 | A | 8/1999 | Stark et al. |
| 5,956,333 | A | 9/1999 | Zhou et al. |
| 5,966,376 | A | 10/1999 | Rakib et al. |
| 6,018,547 | A | 1/2000 | Arkhipkin |
| 6,128,309 | A | 10/2000 | Tariki et al. |
| 6,154,456 | A | 11/2000 | Rakib et al. |
| 6,289,039 | B1 | 9/2001 | Garodnick |
| 6,310,923 | B1 | 10/2001 | Lee et al. |
| 6,456,607 | B2 | 9/2002 | Arai et al. |
| 6,480,559 | B1 | 11/2002 | Dabak et al. |
| 6,751,247 | B1 | 6/2004 | Zhengdi |
| 6,763,009 | B1 | 7/2004 | Bedekar et al. |
| 6,956,891 | B2 | 10/2005 | Tan et al. |
| 7,710,910 | B2 | 5/2010 | Ode et al. |
| 7,793,022 | B2 | 9/2010 | Travers et al. |
| 7,796,575 | B2 | 9/2010 | Lim et al. |
| 7,873,097 | B1 | 1/2011 | Luecke et al. |
| 7,873,980 | B2 | 1/2011 | Horan et al. |
| 7,908,634 | B2 | 3/2011 | Keady et al. |
| 7,937,605 | B2 | 5/2011 | Rea et al. |
| 7,996,584 | B2 | 8/2011 | Keady et al. |
| 8,073,647 | B2 | 12/2011 | Horan et al. |
| 8,094,700 | B2 | 1/2012 | Okazaki |
| 8,272,023 | B2 | 9/2012 | Horan et al. |
| 8,280,668 | B2 | 10/2012 | Horan et al. |
| 8,295,296 | B2 | 10/2012 | Keady et al. |
| 8,369,794 | B1 | 2/2013 | Bharghavan et al. |
| RE44,199 | E | 5/2013 | Garodnick |
| 8,520,776 | B2 | 8/2013 | Rea et al. |
| 8,546,688 | B2 | 10/2013 | Horan et al. |
| 8,674,223 | B2 | 3/2014 | Horan et al. |
| 8,674,224 | B2 | 3/2014 | Horan et al. |
| 8,674,225 | B2 | 3/2014 | Horan et al. |
| 8,674,226 | B2 | 3/2014 | Horan et al. |
| 8,680,395 | B2 | 3/2014 | Horan et al. |
| 8,705,588 | B2 | 4/2014 | Odenwalder |
| 9,324,478 | B2 | 4/2016 | Horan et al. |
| 9,970,768 | B2 | 5/2018 | Monroe et al. |
| 10,158,396 | B2 | 12/2018 | Hannebauer et al. |
| 10,763,914 | B2 | 9/2020 | Hannebauer et al. |
| 11,025,292 | B2 | 6/2021 | Hannebauer et al. |
| 11,394,422 | B2 | 7/2022 | Hannebauer et al. |
| 11,463,125 | B2 | 10/2022 | Hannebauer et al. |
| 11,716,114 | B2 | 8/2023 | Hannebauer |
| 2002/0013926 | A1 | 1/2002 | Kim et al. |
| 2002/0097779 | A1 | 7/2002 | Bang et al. |
| 2002/0154620 | A1 | 10/2002 | Azenkot et al. |
| 2003/0139178 | A1 | 7/2003 | Uesugi et al. |
| 2004/0120415 | A1 | 6/2004 | Song et al. |
| 2005/0069020 | A1 | 3/2005 | Lakkis |
| 2006/0080711 | A1* | 4/2006 | Kim ................. H04N 21/47214 348/E5.096 |
| 2006/0109228 | A1 | 5/2006 | Kang |
| 2008/0084920 | A1 | 4/2008 | Okazaki |
| 2008/0106306 | A1 | 5/2008 | Keady et al. |
| 2010/0013579 | A1 | 1/2010 | Horan et al. |
| 2010/0091990 | A1 | 4/2010 | Etemad et al. |
| 2010/0142723 | A1 | 6/2010 | Bucklen |
| 2010/0321591 | A1 | 12/2010 | Onomatsu |
| 2011/0037574 | A1* | 2/2011 | Pratt .................. G06Q 30/0607 705/26.25 |
| 2011/0044409 | A1 | 2/2011 | Yoshimoto et al. |
| 2012/0014464 | A1 | 1/2012 | Eiger et al. |
| 2013/0194284 | A1 | 8/2013 | Bi |
| 2014/0218616 | A1 | 8/2014 | Toba et al. |
| 2015/0154943 | A1 | 6/2015 | Lee et al. |
| 2016/0127087 | A1 | 5/2016 | Feher |
| 2016/0163277 | A1 | 6/2016 | Ludden et al. |
| 2019/0174027 | A1 | 6/2019 | LV et al. |
| 2019/0260629 | A1 | 8/2019 | Nikopour et al. |
| 2020/0388237 | A1 | 12/2020 | Tu et al. |
| 2022/0302953 | A1 | 9/2022 | Hannebauer et al. |
| 2023/0223981 | A1 | 7/2023 | Hannebauer |
| 2023/0230559 | A1 | 7/2023 | Friedman |

FOREIGN PATENT DOCUMENTS

| | | |
|---|---|---|
| CN | 101917209 | 7/2015 |
| EP | 0 727 881 | 8/1996 |
| EP | 1 079 536 | 2/2001 |
| EP | 1079536 | 2/2001 |
| EP | 1 968 324 | 9/2008 |
| JP | 08293818 | 11/1996 |
| JP | H09312590 | 12/1997 |
| JP | 2001-144653 | 5/2001 |
| JP | 2001156861 | 6/2001 |
| JP | 2001510658 | 7/2001 |
| JP | 2002281545 | 9/2002 |
| JP | 2007-150971 | 6/2007 |
| JP | 2011003331 | 6/2011 |
| KR | 10-2021-0099972 | 8/2021 |
| WO | WO 97/02663 | 1/1997 |
| WO | WO 98/52365 | 11/1998 |
| WO | 2010/106330 | 9/2010 |
| WO | 2018-170546 | 9/2010 |
| WO | WO 2012/007785 | 1/2012 |
| WO | WO 2017/049347 | 3/2017 |

OTHER PUBLICATIONS

Van der Heijden, "An Analog Correlator for a High Speed DS-CDMA Modem", Eindhoven University of Technology, Department of Electrical Engineering Telecommunication Technology and Electromagnetics, 1998, 65 pages.

Shanmugam et al., "An Analog Spread-Spectrum Interface for Power-Line Data Communication in Home Networking", IEEE transactions on Power Delivery, vol. 20, No. 1, Jan. 2005.

Immink, "Construction of DC-free Codes Using the fast Hadamard Transform", Nov. 7, 2001, 6 pages.

U.S. Appl. No. 18/098,612 entitled "Spread-Spectrum Video Transport Integration With Timing Controller", filed Jan. 18, 2023.

International Search Report and Written Opinion dated May 11, 2023 from International Application No. PCT/US2023/011064.

* cited by examiner

Encoding of Analog Samples

Encoding of Digital Samples

8K Display Set with Integrated SSVT Transmitter and Timing Controller

8k Display Set with Integrated SSVT Transmitter, Timing Controller and SoC

Integrated TCON, SSVT Transmitter Module

Integrated TCON, SSVT Transmitter Module

8k120 Display Set with Integrated SSVT Transmitter, Timing Controller and SoC, Having Multiplexed Source Drivers SSVT Source Drivers Smartphone Display with SSVT

ANALOG VIDEO TRANSPORT INTEGRATION WITH TIMING CONTROLLER

CROSS-REFERENCE TO RELATED APPLICATIONS

This application is a continuation of U.S. application Ser. No. 18/098,612, filed Jan. 18, 2023, which claims priority of U.S. provisional patent application No. 63/300,975, filed Jan. 19, 2022, No. 63/317,746, filed on Mar. 8, 2022, No. 63/391,226, filed on Jul. 21, 2022, all of which are hereby incorporated by reference.

This application also incorporates by reference U.S. application Ser. No. 15/925,123, filed on Mar. 19, 2018, U.S. application Ser. No. 16/494,901 filed on Sep. 17, 2019, U.S. application Ser. No. 17/879,499 filed on Aug. 2, 2022, U.S. application Ser. No. 17/686,790, filed on Mar. 4, 2022, U.S. application Ser. No. 17/887,849 filed on Aug. 15, 2022, U.S. application Ser. No. 17/851,821, filed on Jun. 28, 2022, U.S. provisional application No. 63/398,460 filed on Aug. 16, 2022, U.S. application Ser. No. 17/900,570 filed on Aug. 31, 2022, and U.S. provisional application No. 63/346,064 filed on May 26, 2022.

FIELD OF THE INVENTION

The present invention relates generally to displaying video on a display panel of a display set. More specifically, the present invention relates to a timing controller that is integrated with an encoder that encodes a digital signal into an analog signal for a display.

BACKGROUND OF THE INVENTION

Image sensors, display panels, and video processors are continually racing to achieve larger formats, greater color depth, higher frame rates, and higher resolutions. Local-site video transport includes performance-scaling bottlenecks that throttle throughput and compromise performance while consuming ever more cost and power. Eliminating these bottlenecks can provide advantages.

For instance, with increasing display resolution, the data rate of video information transferred from the video source to the display screen is increasing exponentially: from 3 Gbps a decade ago for full HD, to 160 Gbps for new 8K screens. Typically, a display having a 4K display resolution requires about 20 Gbps of bandwidth at 60 Hz while at 120 Hz 40 Gbps are needed. And, an 8K display requires 80 Gbps at 60 Hz and 160 Gbps at 120 Hz.

Currently, conventional column (or source) drivers rely upon a wiring loom within the display set that can restrict scaling to larger formats and higher frame rates for a number of reasons. For one, the area and volume required by a complex wiring loom becomes too large, meaning that the size and cost of the printed circuit implementing the wiring loom exceeds practical limits. Further, the DACs of the source drivers are limited to 8 bits of resolution; a further increase would lead to excessive data rates and would consume too much power. These restrictions force an architecture discontinuity on the display set industry, increasing cost and risk.

Until now, the data is transferred digitally using variants of low voltage differential signaling (LVDS) data transfer, using bit rates of 16 Gbps per signal pair (depending upon the architecture), and parallelizing the pairs to achieve the required total bit rate. This digital information then needs to be converted to the analog pixel information on the fly using D-to-A conversion at the source drivers of the display.

Nowadays, most source driver D-to-A converters require 8 bits; soon, D-to-A conversion may need 10 or even 12 bits and then it will become very difficult to maintain a fast enough data rate. Thus, displays must clock the digital data in a very short amount of time, resulting in destabilization of the digital signal transmission. Another issue due to the limits of existing digital transport is that not all 12 bits or 10 bits or even 8 bits per sample are conveyed within the display panel; modern intra-display compression schemes carry just 6 bits per sample, thereby limiting the color depth of the display.

Accordingly, new apparatuses and techniques are desirable to eliminate the need for D-to-A conversion at a source driver of a display, to increase bandwidth, and to utilize an analog video signal generated within a display unit.

SUMMARY OF THE INVENTION

To achieve the foregoing, and in accordance with the purpose of the present invention, a timing controller of a display set is integrated with an SSVT transmitter having at least one encoder to allow for transport of analog signals between a display controller of the display set and source drivers of the display panel.

It is realized that digital representations (e.g., 8-bit or 10-bit numerals) of the pixel brightness levels are poor representations of that video data, especially during video transport, whereas analog voltages representing those brightness levels are better representations and have much greater resolution. Therefore, the present invention proposes to transport video data within a display set in the analog domain using voltages that represent pixel brightness levels.

Advantages of the present invention include reducing power consumption. In the prior art, power consumption significantly constrains display performance; using the present invention, less power is consumed by the display electronics. Embodiments of the invention described below can scale to arbitrarily large formats and frame rates, consuming as much as 50% less power for panel driving and offering greater than ten times the noise rejection. Further, embodiments provide noise immunity and EM stealth in that EMI/RFI emissions of a display set will be well below mandated limits. Yet further, the transmission reach of the novel analog signal can be much greater than that of conventional Ethernet or HDBaseT signals. And, whereas conventional transport uses expensive, mixed-signal processes for high-speed digital circuits, embodiments of the present invention make use of mature analog processes for greater flexibility and lower production cost. Further, the size of the wiring loom is reduced thus taking up less space in the edge areas of the display panel.

Further, use of spread-spectrum video transport (SSVT) for data transfer within a display set between a display controller and source drivers of a display panel can reduce the silicon area, and thus the chip cost, associated with video transport by up to a factor of three for 4K 60 Hz panels and by up to a factor of ten for 8K 120 Hz panels.

In a specific embodiment, the SSVT transmitter (and its encoders) and integrated timing controller are within a single integrated circuit. The main advantage of this integration is that digital video transfer occurs on-chip, so that there is no difficulty in bringing digital signals from the TCON to the encoders. There will be power and cost benefits as well. Another advantage is that the combined chip area will be smaller due to saving pins and sharing components.

In a variation, the transmitter, TCON and SoC are all within an integrated circuit. Integrating the SSVT transmitter into the TCON also aligns with existing industry practice where the TCON has an integrated digital video transport (like CEDS). In another specific embodiment, the SSVT transmitter and timing controller chip (or transmitter, TCON and SoC) are part of a display panel driver chipset, the other semiconductor chip or chips receiving the SSVT signal and implementing source drivers of the display.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
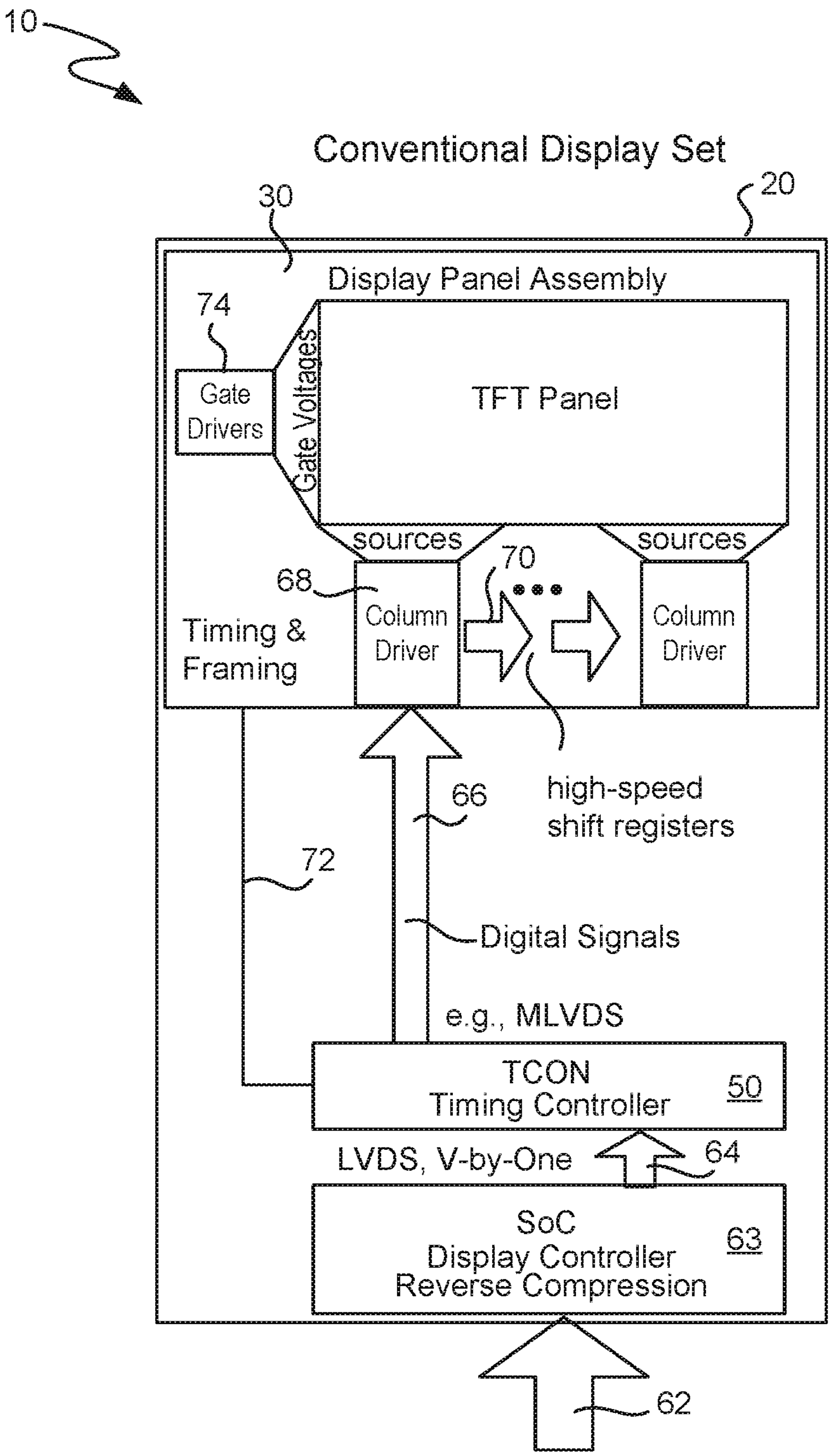
FIG. 1 (PRIOR ART)
FIG. 1 illustrates a prior art delivery of a digital signal to a display panel within a conventional display set.

In a video system the transformation of the incident light into a signal is generally performed by a source assembly or a Graphics Processing Unit (GPU) and a predetermined transformation will determine the format of the payload that is to be transported from the source assembly, over one or more electromagnetic pathways, to a sink assembly, which may be a display or a video processor, which receives the predetermined format and transforms the received payload into a signal used with a suitable output device for creating radiated light suitable for viewing by humans.

It is realized that digitization of the video signal takes place at the signal source of the system (usually at the GPU) and then the digital signal is transferred, usually using a combination of high performance wiring systems, to the display drivers, where the digital signal is returned to an analog signal again, to be loaded onto the display pixels. So, the only purpose of the digitization is data transfer from video source to display pixel. Therefore, we realize that it is much more beneficial to avoid digitization altogether (to the extent possible), and to directly transfer the analog data from video source (or from a display controller) to the display drivers. This can be done using our novel encoding, leading to accurate analog voltages to be decoded again in the source drivers. The decoded analog data is a high-bit-depth approximation of each sample, without the need to reproduce exactly a predetermined number of bit positions. This means the sample rate is at least a factor of ten lower than in the case of digital transfer, leaving further bandwidth for expansion.

Further it is recognized that it is much easier to perform the D-to-A conversion (if needed) at the point where less power is needed than at the end point where the display panel is driven, where much power is required. Thus, instead of transporting a digital signal from the video source (or from a display controller) all the way to the location where the analog signal needs to be generated, we transport the analog signal to the display panel using a much lower sample rate than normally needed by digitalization. This means that instead of having to send Gigabits per second over a number of lines, we can now do with only a few analog mega-samples per second, thus reducing the bandwidth of the channel that has to be used. Further, with prior art digital transport, every bit will occupy just about half an inch in the signal wire, whereas transporting analog data results in an increase of tenfold amount of space available, meaning extra bandwidth available. And further, a bit in digital data must be well defined. This definition is fairly sensitive to errors and noise, and one needs to be able to detect the high point and the low point very accurately, whereas the proposed analog transport is much less sensitive. That means that the quality of the cable (e.g., going from one side to the other in a display set) does not need to be high.

The invention is especially applicable to high resolution, high dynamic range displays used in computer systems, televisions, monitors, game displays, home theater displays, retail signage, outdoor signage, etc.

Digital Transport

FIG. 1 illustrates a prior art delivery 10 of a digital signal to a display panel within a conventional display set. For purposes of this disclosure, "display panel" refers to that interior portion of the display set that implements pixels that produce light for viewing, while "display set" refers to the entire (typically) rectangular enclosure that includes the display panel, panel assembly, a frame, drivers, cabling, and associated electronics controls for receiving, transporting and displaying video images.

Shown is an input of a digital video signal 62 to the display set via an HDMI connector (or via LVDS, HDBaseT, MIPI, IP video, etc.) into a system-on-a-chip (SoC) 63 of the display set. SoC 63 performs functions such as a display controller, reverse compression and outputs the video signal 64 to a conventional TCON (timing controller) 50. In turn, the timing controller transports a digital signal 66 to a display panel 30. (Digital transport may also use MLVDS, DDI, etc.) Display panel 30 includes any number of DACs (digital-to-analog converters) within the column drivers 68 of the display panel which convert the digital signal into an analog signal for input into pixels of the display panel. High-speed shift registers 70 use a "cascade" technique to pass the digital signal from column driver to column driver. Shown also is a timing and framing signal 72 output by the timing controller 50 that provides timing and framing for the gate drivers 74.

In addition to the disadvantages above, this digital transport within the conventional display set results in higher EMI/RFI concerns due to reliance on high-speed digital circuits, and it must be implemented using relatively costly integrated circuit processes. Further, an 8K V-by-One HS requires 48 wire pairs at 3.5 Gbps, for example. And, a high-speed bit-serial interface will also have synchronization issues.

It is realized that performing the conversion of the digital video signal from digital to analog as close as possible to the SoC will not only eliminate the need for DACs within the column drivers of the display panel but will also eliminate the disadvantages above and will realize advantages in transporting an analog signal within the display set instead of transporting a digital signal.

Analog Transport within a Display Set

Figure 2:
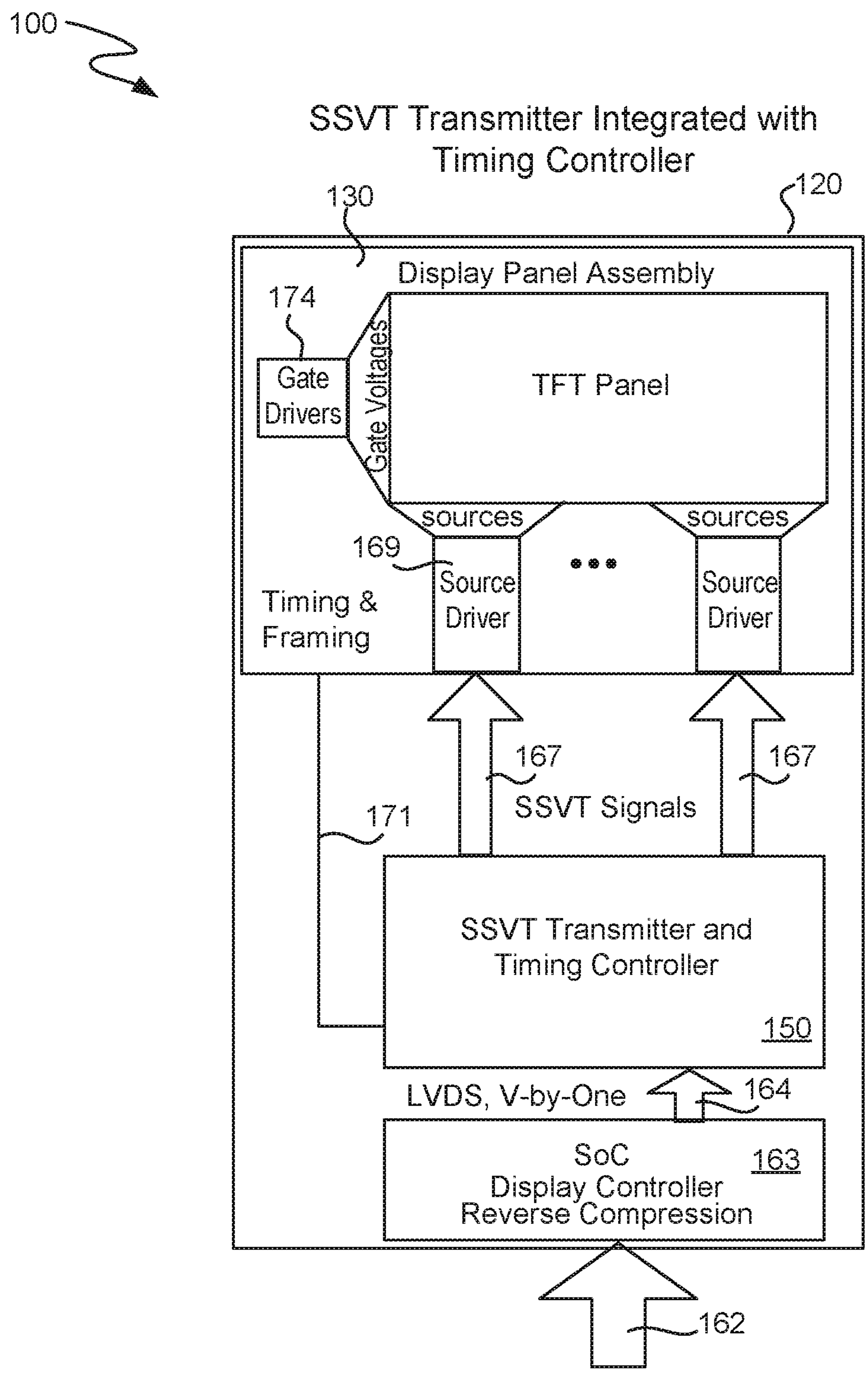
FIG. 2 illustrates delivery of an analog video signal to a display panel using encoding immediately after the SoC of the display set.

FIG. 2 illustrates delivery 100 of analog video signals to a display panel 130 using conversion and encoding immediately after the SoC 163 of the display set 120. In this embodiment, converting of, and encoding of the digital video signal into analog SSVT signals 167 occurs within the display set itself, thus improving display connectivity. Shown is an input of a digital video signal 162 via an HDMI connector (or via LVDS, HDBaseT, MIPI, IP video, etc.) into a system-on-a-chip 163 which performs functions such as display controller, reverse compression, brightness, contrast, overlays, etc. The modified digital video signal 164 is then delivered to the integrated SSVT transmitter and timing controller 150 using LVDS, V-by-one, etc. In this embodiment, the timing controller is integrated with the transmitter and both are implemented within a circuit, preferably an integrated circuit on a semiconductor chip. Display panel 130 may be a display panel of any size. Note that transmitter and timing controller chip 150 is located immediately after SoC chip 163 thus making transmission of the digital signal (at that point) easier. Preferably, chip 150 is located about 10 cm or less from the SoC chip. In one embodiment chip 150 is about 5 cm or less from the SoC, in another embodiment, about 2 cm or less. The physical properties of LVDS will restrict the maximum chip-to-chip communication distance to about several inches. The advantages of integration also include an SoC with integrated TCON. Therefore, another embodiment discussed below is the SSVT distributor, encoders, and line drivers being integrated with the SoC and TCON.

In one embodiment, transmitter and timing controller chip 150 is one of two semiconductor chips in a display panel driver chipset, the other semiconductor chip (an "SSVT source driver" chip) receiving a signal 167 and incorporating source drivers 169. Depending upon the size of the display panel, there may be more than one SSVT source driver chip. Typically, the distance between chip 150 and source drivers 169 is in the range of about 5 cm to about 1.5 m, depending on the panel size.

Transmitter 150 converts the received digital video signal into spread-spectrum video transport (SSVT) signals 167 which are transported to a display panel 130. Preferably, signals 167 are delivered to the source drivers 169 using differential pairs of wires, e.g., one or two pairs per source driver. Display panel 130 has a corresponding SSVT decoder (typically within each source driver 169) which then decodes each analog SSVT signal into an analog signal expected by the display panel. Note that no DACs (digital-to-analog converters) are needed at the display panel nor within the source drivers. Timing signal 171 controls the gate drivers 174 so that the correct line of the display is enabled in synchronization with the source drivers 169. In one particular embodiment, novel source drivers 169 are implemented as described herein and in U.S. patent application Ser. No. 17/900,570 mentioned above.

Advantageously, through use of SSVT signals within the display instead of using digital transport, EMI/RFI emissions are well below mandated limits, and an 8K display will only require 24 wire pairs at 680 Mbps. By contrast, prior art transport of a digital video signal within a display set from the system-on-a-chip (SoC) (for example) to the display panel must be implemented in high resolution and therefore relatively costly IC processes, and EMI/RFI emissions will be a concern due to reliance upon high-speed digital circuits, and an 8K display will require 48 wire pairs at 3.5 Gbps.

There is a significant advantage to using SSVT signals internally in a display set even if the input signal 162 is not SSVT, i.e., it is a digital video signal. In prior art display sets, one decompresses the HDMI signal and then one has the full fledged, full-bit-rate digital data that must then be transferred from the receiving end of the display set to all locations within the display set. Those connections can be quite long for a 64- or 80-inch display set; one must transfer that digital data from one side of the set where the timing controller is to the other side where the final display source driver is. Therefore, there is an advantage to converting the digital signal to SSVT internally at or near the SoC and then sending SSVT signals to all locations of the display set where the source drivers are located. Specifically, there will be a shorter distance for digital transmission and longer distance for SSVT transmission, thereby reducing the cost and complexity of the digital transmission implementation while increasing the flexibility of system integration.

Figure 10:
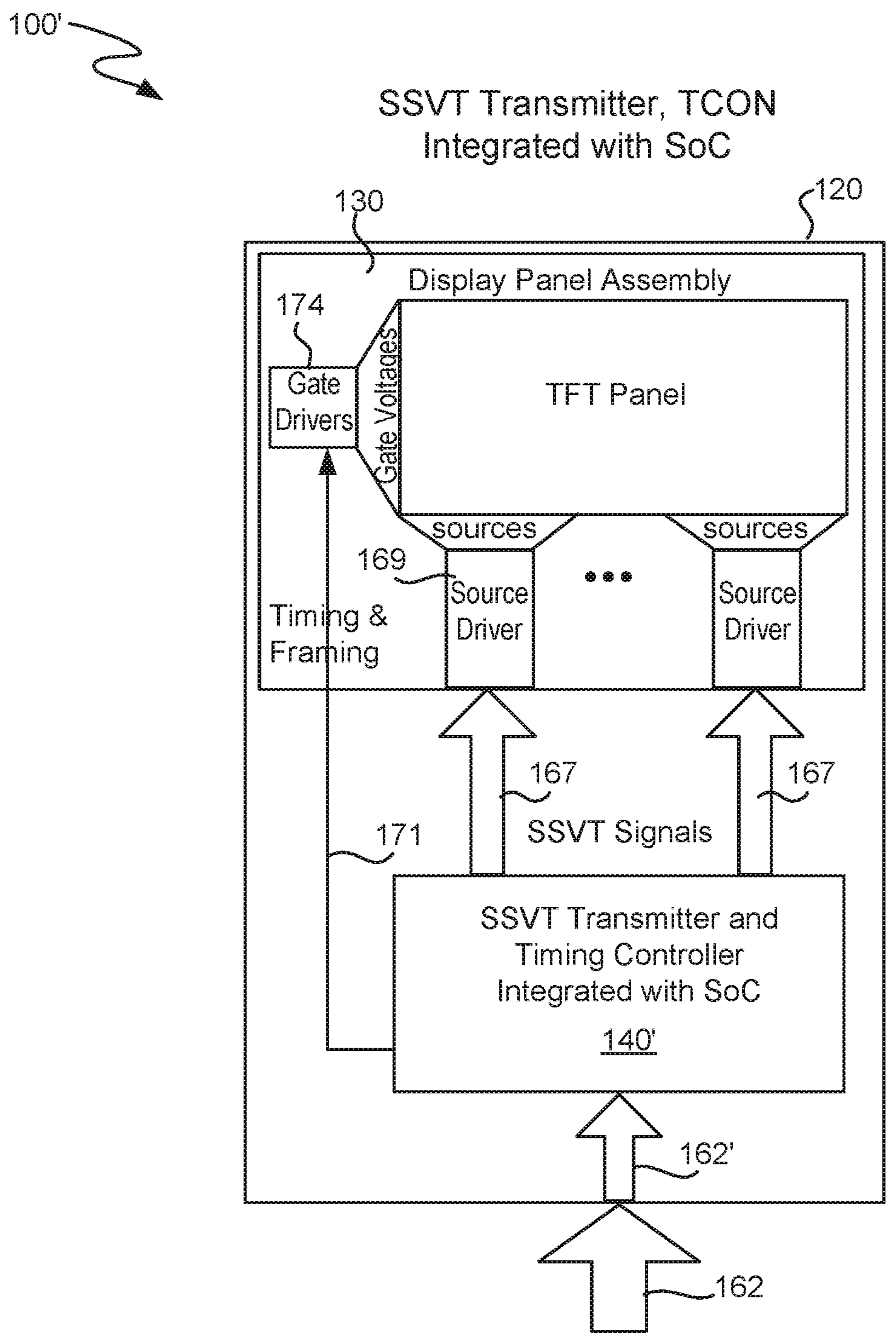
FIG. 10 illustrates delivery of an analog video signal to a display panel using encoding integrated with the SoC of the display set.

FIG. 10 illustrates delivery 100' of an analog video signal to a display panel 130 using conversion and encoding integrated with an SoC 140' of the display set 120. In this embodiment, converting of, and encoding of the digital video signal 162 into analog SSVT signals 167 occurs within a single chip 140' which integrates the SSVT transmitter and timing controller within the SoC 140'.

Shown is an input of a digital video signal 162 via an HDMI connector (or via LVDS, HDBaseT, MIPI, IP video, etc.) into the display set 120, which is then transmitted internally 162' to SoC 140'. The system-on-a-chip (SoC) 140' performs its traditional functions such as display controller, reverse compression, brightness, contrast, overlays, etc., as well as serving as a timing controller and SSVT transmitter. After the SoC performs its traditional functions, the modified digital video signal (not shown) is then delivered internally to the integrated SSVT transmitter and timing controller using a suitable protocol such as LVDS, V-by-one, etc. In this embodiment, the timing controller and SSVT transmitter are both integrated with the SoC and all three are implemented within a single circuit, preferably an integrated circuit on a semiconductor chip.

Because SoC 140' performs the encoding, a corresponding semiconductor chip or chips ("SSVT source driver" chips) receives signals 167 and incorporates source drivers 169. Depending upon the size of the display panel, there may be more than one SSVT source driver chip. Typically, the distance between chip 140' and column drivers 169 is in the range of about 5 cm to about 1.5 m, depending on the panel size.

The SSVT transmitter within chip 140' converts the modified digital video signal into spread-spectrum video transport (SSVT) signals 167 which are transported to display panel 130. Preferably, signals 167 are delivered to the source drivers 169 using differential pairs of wires, e.g., one or two pairs per source driver. Display panel 130 has a corresponding SSVT decoder (typically within each column driver 169) which then decodes an analog SSVT signal into an analog signal expected by the display panel. Note that no DACs (digital-to-analog converters) are needed at the display panel nor within the source drivers. Timing signal 171 controls the gate drivers 174 so that the correct line of the display is enabled in synchronization with the source drivers 169.

Figure 4:
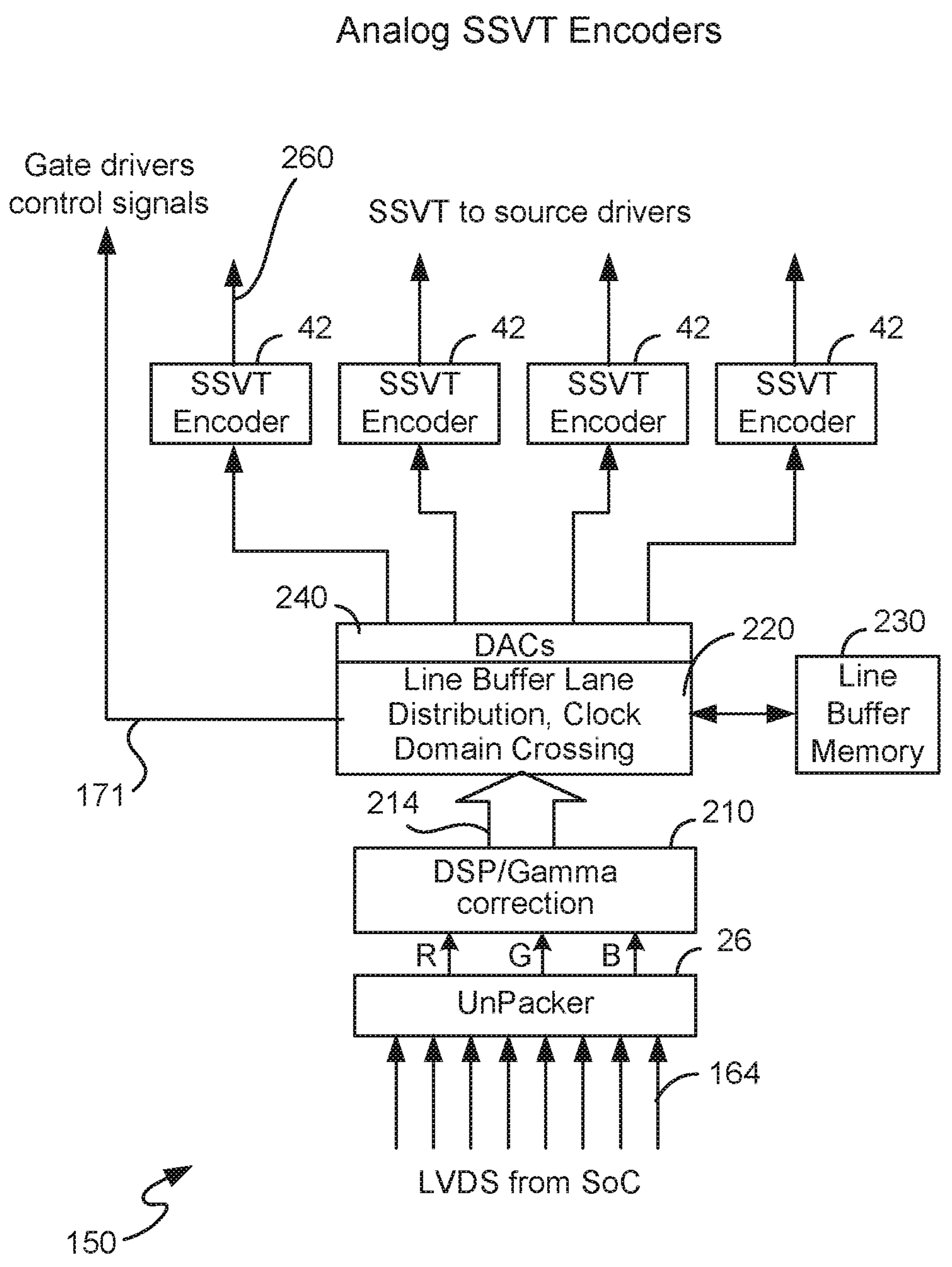
FIG. 4 illustrates the integrated SSVT transmitter with analog encoders in greater detail.
Figure 6:
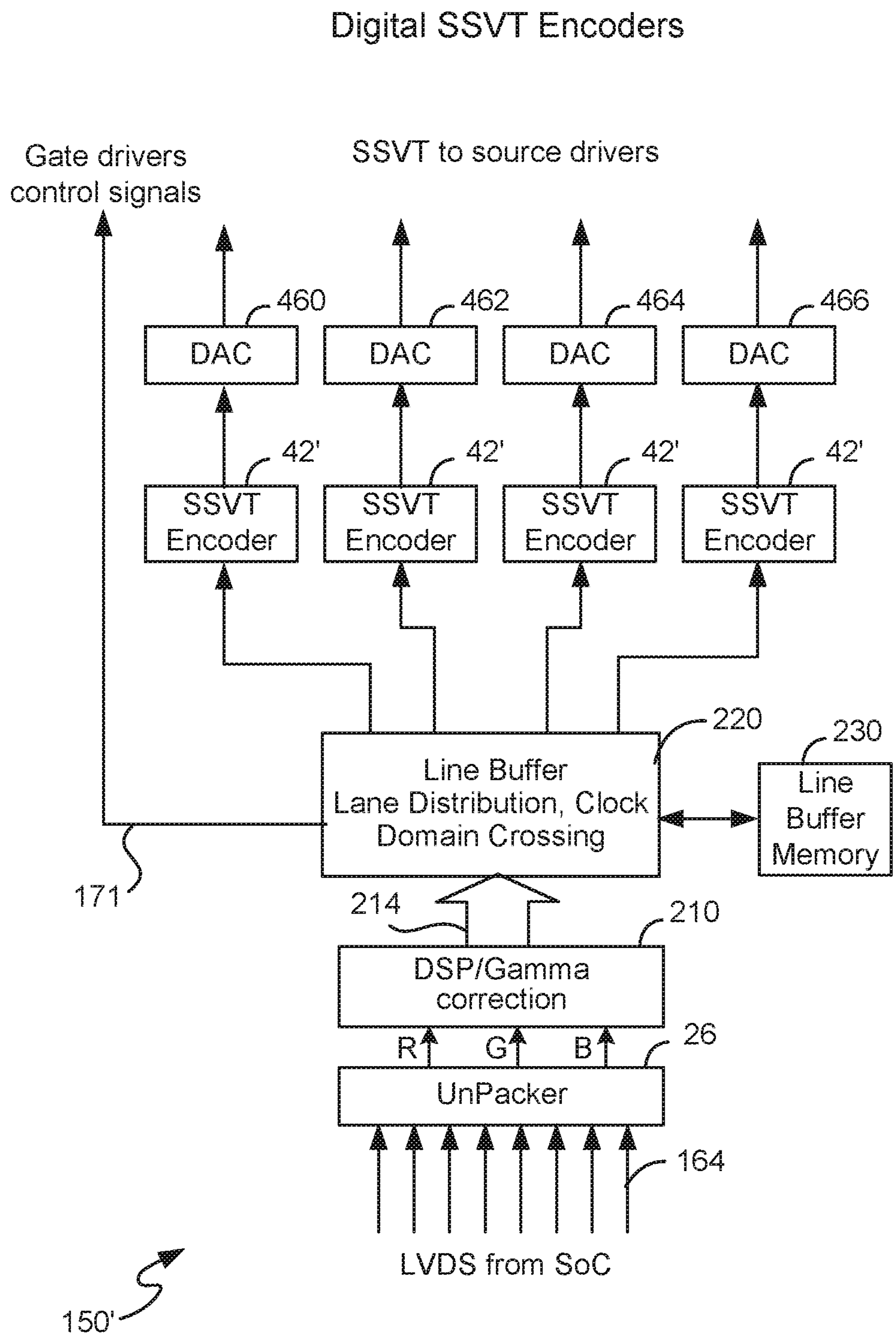
FIG. 6 illustrates the integrated SSVT transmitter with digital encoders in greater detail.

The integrated SoC chip 140' may be implemented as herein described, i.e., as shown in FIG. 4 or 6, keeping in mind that the functionality of the SSVT transmitter, timing controller and SoC are all integrated on the same chip. This embodiment of FIG. 10 has the same advantages listed above with respect to FIG. 2. In addition, by integrating the SSVT transmitter and timing controller with the SoC chip itself further advantages are obtained such as fewer chips, less complexity, smaller area required, and less power needed.

SSVT Analog Encoder and Timing Controller

Figure 5A:
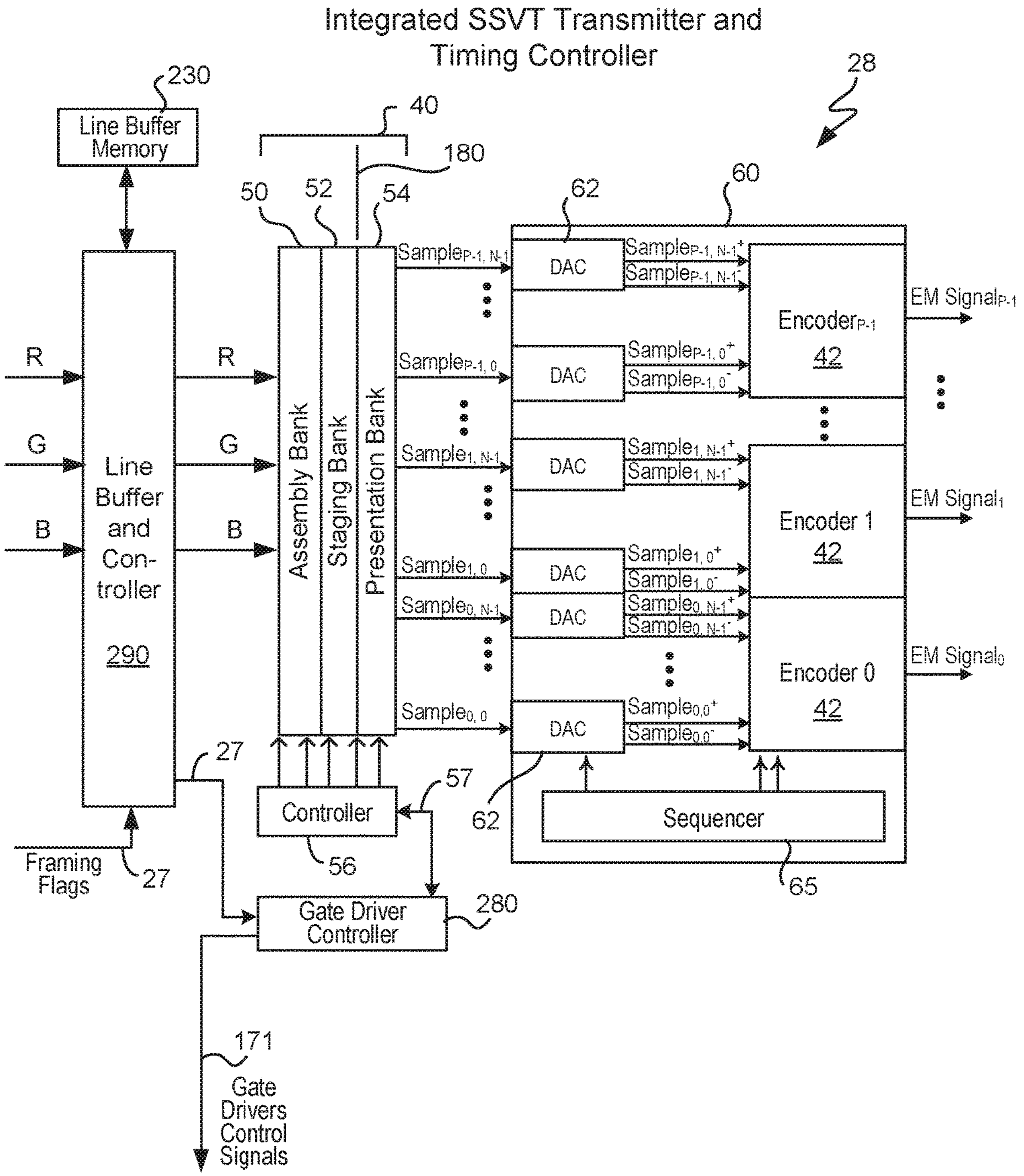
FIG. 5A illustrates in greater detail the line buffer controller, distributor, clock domain crossing, DACs and encoders of FIG. 4.

FIG. 4 illustrates the SSVT transmitter and timing controller 150 in greater detail. SSVT transmitter and timing controller 150 connects to source drivers 169 of a display via a transmission medium as shown in FIG. 2. First distribution and encoding is described, followed by details on the timing controller. Further details are shown in FIG. 5A.

Briefly, a stream of input digital video samples is received at chip 150, the input digital video samples are repeatedly (1) distributed by assigning the input video samples into encoder input vectors (four, in this example) according to a predetermined permutation and (2) encoded using encoders 42 in order to generate multiple composite analog EM signals 260. The analog EM signals are then transmitted (3) over a transmission medium to a corresponding chip or chips that incorporate the source drivers. On the receive side, (4) the incoming analog EM signals are decoded using corresponding decoders, in order to reconstruct the samples into output vectors and then (5) the output vectors are collected by assigning the reconstructed video samples from the output vectors to an output stream using the inverse of the predetermined permutation. As a result, the original stream of time-ordered video samples containing color and pixel-related information is conveyed from video source to video sink.

Signal 164 is typically an LVDS digital signal from the SoC in which the pixel values come in row-major order through successive video frames. More than one pixel value may arrive at a time (e.g., two, four, etc.); they are serial in the sense that groups of pixels are transmitted progressively, from one side of the line to the other. Unpacker 26 unpacks (or exposes) these serial pixel values into parallel RGB values. The number of output sample values S in each set of pixel samples is determined by the color space applied by the video source. With RGB, S=3, and with YCbCr 4:2:2, S=2. In other situations, the sample values S in each set of samples can be just one or more than three. Unpacker 26 also unpacks from digital signal 164 framing information in the form of framing flags 27 (shown in FIG. 5A) that come along with the pixel values. Basically, framing flags indicate the location of pixels in a particular video frame; they mark the start of a line, the end of the line, the active video section, the horizontal and vertical blanking sections, etc., as is known in the art. Framing flags 27 tell the gate drivers which line is currently sent to the display panel and will also control the timing of gate drivers' action. Framing flags are input into a line buffer 290 which will be described in greater detail below in FIG. 5A.

A distributor 40 of block 220 (shown in detail in FIG. 5A) is arranged to receive the pixel color information (e.g., R, G, and B values) exposed in the input sets of samples. The distributor 40 takes the exposed color information and builds multiple encoder input vectors according to a predefined permutation. In the embodiment shown, there are four encoder input vectors ($V_0$, $V_1$, $V_2$ and $V_3$), one for each of four EM pathways on the transmission medium respectively. In various embodiments, the transmission medium may be a cable such as HDMI or fiber optic, or may be wireless. One of the multiple encoders 42 is assigned to one of the four vectors $V_0$, $V_1$, $V_2$ and $V_3$ respectively. Each encoder 42 is responsible for encoding sample values contained in the corresponding encoder input vector and generating an EM signal that is sent over one of the parallel pathways on the transmission medium.

In this particular embodiment shown, there are four EM pathways, and each encoder 42 generates an EM signal for each of the four pathways respectively. It should be understood, however, the present invention should be by no means be limited to four pathways; the number of pathways on the transmission medium may widely range from one to any number more than one.

On the receive side, an SSVT receiver is provided (not shown). The function of the SSVT receiver is the complement of the SSVT transmitter and timing controller 150 on the transmit side. That is, the SSVT receiver (a) receives the sequences of EM signals from the multiple EM pathways of the transmission medium, (b) decodes each sequence by applying SSVT demodulation to reconstruct the video samples in multiple output vectors, and (c) collects the samples from the multiple output vectors using the same permutation used to distribute the input samples into input vectors on the transmit side. More specifically, the output vectors are rearranged in their spatially correct location on the source driver's output pins towards the display panel. The collected output samples are then transformed into a format that is suitable for display by the video sink for display in a time-shifted mode.

The modulation and demodulation, as described herein, may be performed in the analog or digital domain as explained below in FIGS. 7-9. As explained in more detail below, the stream of sets of input samples are distributed at a first clock rate (pixel clock or "pix-clk") to create encoder input vectors according to a predetermined permutation. Modulation is then applied to each of the encoder input vectors, resulting in the generation of an encoded EM signal for each encoder input vector. The EM signals are then transmitted over the transport in parallel at a second clock rate (SSVT clock or "SSVT_clk"). Applying spreading (SSDS) to each sample in the encoder input vectors provides electrical resiliency, but at the expense of bandwidth per sample. By modulating using a set of mutually orthogonal codes and transmitting all of the resultant EM signals simultaneously, however, some or all of the lost bandwidth is recovered.

As mentioned earlier, modified digital video signal 164 arrives from the SoC 163 via LVDS pairs (for example); typically, the number of pairs is implementation specific and depends upon the data rate per pair as well as upon panel resolution, frame rate, bandwidth etc. Digital signal processing (DSP) is performed in function block 210 and includes frame-by-frame inversion and other processing such as gamma correction, LCD drive optimization, gamma correction, LCD drive optimization, HDR implementation, compensation for specific EM pathway electrical characteristics, etc. Gamma correction converts samples from a linear color space to a non-linear color space in order to take best advantage of the physical luminance characteristics of an individual display. Gamma correction is a fundamental requirement for high-video-quality systems. Compensation for EM pathway characteristics includes any signal processing function that corrects in advance for measured parameters of the circuit elements in the EM pathway.

After DSP and Gamma correction 210 the digital video signal is passed internally 214 into block 220 which includes a line buffer (and line buffer controller), lane distribution (via the distributor 40), clock domain crossing, and generation of gate drivers control signals 171. Line buffer memory 230 provides temporary storage for a row of pixel information before distribution to the encoders. Typically, pixel information for a row of the display panel arrives serially from the SoC, but, as the gate drivers will enable a row of pixel information to be displayed at the same time, the source drivers 169 will need pixel voltages for an entire row to be ready at the same time. Thus, line buffer memory 230 provides storage for a row of pixel information as it arrives serially from the SoC; once an entire row of pixel information is stored it may then be used by block 220 for later conversion, encoding, transport and display in the appropriate row of the display panel. Furthermore, sometimes on the display panel only half of the row of pixels is enabled at any given time by the gate drivers, thus half the row information has to be sent to the source drivers, and then the other half; the line buffer memory helps to facilitate this. E.g., a line is stored in the line buffer memory, then extracted half-by-half to be transmitted, while a new line is being stored. Depending upon the specific implementation, line buffer memory 230 may be within integrated circuit 150 or may be external.

The digital video samples are then converted using medium frequency DACs 240 before being encoded in analog using any number of SSVT encoders 42, the number of encoders corresponding to the number of EM signals (EM pathways) desired to be used over the transmission medium as will be described in greater detail below. Analog signals 260 are then each sent to source drivers 169 for decoding into the voltage levels expected by the display panel 130.

Figure 3:
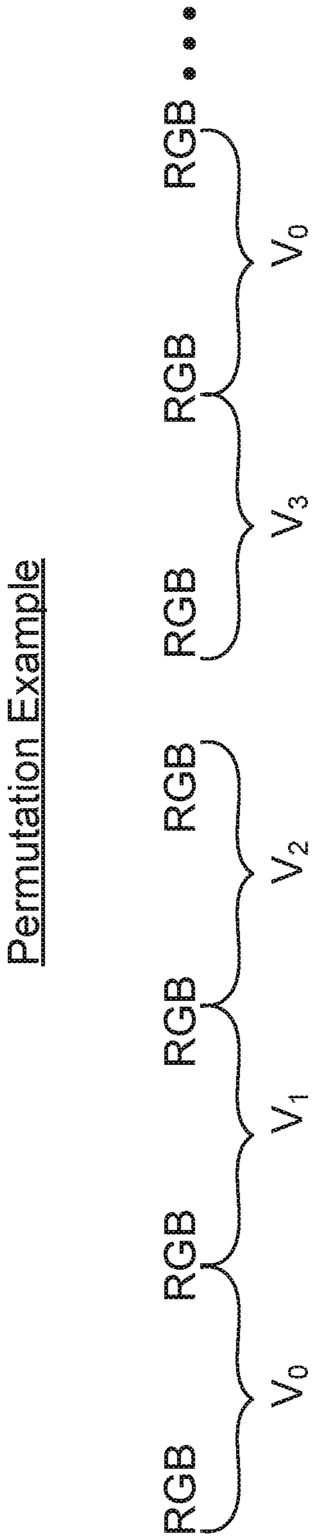
FIG. 3 is a diagram of one possible permutation implemented by the distributor for building four vectors $V_0$, $V_1$, $V_2$ and $V_3$ as shown.

Referring now to FIG. 3, a diagram of one possible permutation implemented by the distributor 40 for building four vectors $V_0$, $V_1$, $V_2$ and $V_3$ is shown. Each of the vectors includes N samples of exposed color information. The exposed RGB samples from the sets of samples 164 in this example are assigned to vectors $V_0$, $V_1$, $V_2$ and $V_3$ from left to right. In other words, the "R", "G" and "B" values of the left-most sample and the "R" signal of the next set of samples are assigned to vector $V_0$, whereas the next (from left to right) "G", "B", "R" and "G" values of the next sample are assigned to vector $V_1$, the next (from left to right) "B", "R", G" and "B" values are assigned to vector $V_2$, and the next (from left to right) "R", "G", "R" and "R" values are assigned to vector $V_3$. Once the fourth vector $V_3$ has been assigned its signals, the above process is repeated until each of the four vectors $V_0$, $V_1$, $V_2$ and $V_3$ have N samples.

In various embodiments, the number of N samples may widely vary. By way of example, consider an embodiment with N=60. In this case, the total number of N samples included in the four vectors $V_0$, $V_1$, $V_2$ and $V_3$ is 240 (60×4=240). The four encoder input vectors $V_0$, $V_1$, $V_2$ and $V_3$, when completely built up, include the samples (where S=3) for 80 distinct sets of samples 22 (240/3=80). In other words:

Vector $V_0$ includes Samples $P_0$, $N_0$ through $P_0$, $N_{N-1}$;
Vector $V_1$ includes Samples $P_1$, $N_0$ through $P_1$, $N_{N-1}$;
Vector $V_2$ includes Samples $P_2$, $N_0$ through $P_2$, $N_{N-1}$; and
Vector $V_3$ includes Samples $P_3$, $N_0$ through $P_3$, $N_{N-1}$.

It should be understood that the above example is merely illustrative and should not be construed as limiting. The number of samples N may be more or less than 60. Also, it should be understood that (a) the exposed color information for each set of samples can be any color information (e.g., Y, C, Cr, Cb, etc.) and is not limited to RGB. The number of EM pathways over the transmission medium can also widely vary. Accordingly, the number of vectors V and the number of encoders 42 may also widely vary from just one or any number larger than one. It should also be understood that any permutation scheme used to construct the vectors may be used, limited only by the requirement that whichever permutation scheme is used on the transmit side is also used (as de-permutation) on the receive side.

Integrated SSVT Transmitter and Timing Controller

FIG. 5A illustrates in greater detail the line buffer and its controller 290, line buffer memory 230, distributor 40, clock domain crossing 180, DACs 62 and encoders 42 of FIG. 4. The distributor 40 may include an assembly bank 50, a staging bank 52, a presentation bank 54 and a frame controller 56. An encoder block 60 includes a bank of digital-to-analog converters (DACs) 62 and four encoders 42, one for each EM pathway on the transmission medium.

The distributor 40 is arranged to receive the exposed color information (e.g., RGB) from the line buffer controller 290, which in turn has received this information from the unpacker 26 (after DSP and Gamma correction). In response, the assembly bank 50 builds the four vectors $V_0$, $V_1$, $V_2$ and $V_3$ from the exposed color information (e.g., RGB) for the incoming stream of sets of samples. As the sets of samples are received, they are stored in the assembly bank 50 according to the predetermined permutation. Again, the distributor 40 may use any number of different permutations when building the vectors containing N samples each.

The staging bank 52 facilitates the crossing of the N samples of each of the four vectors $V_0$, $V_1$, $V_2$ and $V_3$ from a first clock frequency (or pixel clock domain) used by the unpacker 26 into a second clock frequency (or SSVT clock domain) used for the encoding and transmission of the resulting EM signals over the transmission medium. As previously discussed in the example above with N=60 and S=3, the samples representing exactly 80 sets of RGB samples are contained in the four encoder input vectors $V_0$, $V_1$, $V_2$ and $V_3$.

Boundary 180 shows the clock domain crossing between the pixel clock domain and the SSVT clock domain. The pixel clock domain clocks in pixel values to the left of boundary 180, while the SSVT clock domain clocks out the sample values into the DACs and encoders. Essentially, the pixel clock allows for the signals in the staging bank 52 to be stable long enough for the presentation bank 54 to sample those signals in the SSVT clock domain. The controller 56 will use the pixel clock in the staging bank and the SSVT clock in the presentation bank.

In various embodiments, the pixel clock frequency can be faster, slower or the same as the SSVT clock frequency. The first clock frequency f_pix is determined by the video format selected by any suitable video source. The second clock frequency f_ssvt is a function of f_pix, the number P of EM pathways in the transmission medium, the number S of samples in each set of input/output samples, and the SSVT transform parameters N (the number of input/output vector locations) and L (the length of each SSDS code), where f_ssvt=(f_pix*S*L)/(P*N). With this arrangement, the input clock (pix_clk) oscillates at one rate, and the SSVT clock (ssvt_clk) oscillates at a different rate. These clock rates may be the same or may be different.

The presentation bank 54 presents the N samples (0 through N−1) of each of the four encoder input vectors $V_0$, $V_1$, $V_2$ and $V_3$ to the encoder block 60. Typically, N input samples (individual color components) are assigned to an input vector; then the encoder performs the forward transform (modulation) while the next input vector is prepared.

The controller 56 controls the operation and timing of the assembly bank 50, the staging bank 52, and the presentation bank 54. In particular, the controller is responsible for defining the permutation used and the number of samples N when building the four encoder input vectors $V_0$, $V_1$, $V_2$ and $V_3$. The controller 56 is also responsible for coordinating the clock domain crossing from the first clock frequency to the second clock frequency as performed by the staging bank 52. The controller 56 is further responsible for coordinating the timing of when the presentation bank 54 presents the N samples (0 through N−1) of each of the encoder input four vectors $V_0$, $V_1$, $V_2$ and $V_3$ to the encoder block 60. Controller 56 may also include a permutation controller that controls distribution of the RGB samples to locations in the encoders' input vectors.

Within the encoder block 60, a plurality of digital-to-analog Converters (DACs) 62 is provided, each arranged to receive one of the P*N samples (P0, $N_0$ through $P_3$, $N_{N-1}$) assigned to the four encoder input vectors $V_0$, $V_1$, $V_2$ and $V_3$ collectively. Each DAC 62 converts its received sample from the digital domain into a differential pair of voltage signals having a magnitude that is proportional to its incoming digital value. In one embodiment, the output of the DACs 62 range from a maximum voltage to a minimum voltage. In this example, there is one DAC per signal pair (i.e., N lower-speed DACs per encoder, each DAC output presenting one sample to the encoder for an entire encoding interval). It is also possible in this configuration to use one DAC per encoder (thus driving levels into the wire pair at F_ssvt) and to multiplex the samples onto the one DAC. Such a multiplexing requires a fast and accurate DAC to do N conversions within one SSVT clock cycle.

The four encoders 42 are provided the four encoder input vectors $V_0$, $V_1$, $V_2$ and $V_3$ respectively. Each encoder 42 receives the differential pair of signals for each of the N samples (0 through N−1) for its encoder input vector, modulates each of the N differential pair of voltage signals using unique orthogonal codes as discussed herein, accumulates the modulated values, and then generates a differential EM signal, which is the accumulated modulated sample values. Since there are four encoders 42 in this example, there are four EM signals ($Signal_0$ through $Signal_3$) that are simultaneously transmitted over the transmission medium. Modulation and encoding are discussed in greater detail below in FIGS. 7 and 8.

A sequencer circuit 65 coordinates the timing of the operation of the DACs 62 and the encoders 42. The sequencer circuit 65 is responsible for controlling the clocking of the DACs 62 and the encoders 42. As described in detail below, the sequencer circuit 65 is also responsible for generating two clock phase signals, "clk 1" and "clk 2", that are responsible for controlling the operation of the encoders 42.

As mentioned before, line buffer controller 290 coordinates storage and retrieval of pixel values into and from line buffer memory 230. The line buffer controller stores a row of pixels for the display in the line buffer memory and then retrieves that row into the line buffer when the row is complete so that the source drivers of the display can be sent the pixel values for that row (via the distributor, encoders, EM pathways, etc.) at the same time for display. Line buffer memory 230 may be a memory implemented within the SSVT transmitter and timing controller chip 150 or may be a memory separate from chip 150.

As mentioned earlier, framing flags 27 come from the unpacker 26 and are input into line buffer controller 290 which uses these flags in order to know the location of pixels in a line, in order to store and then place them into the correct encoders. After the framing flags are output from the line buffer controller (typically delayed) they are input into gate driver controller 280 which will then generate numerous gate driver control signals 171 for control of the timing of the gate drivers. These signals 171 will include at least one clock signal, at least one frame-strobe signal, and at least one line-strobe signal. Once the pixel values have been pushed into the source drivers for a specific line the line-strobe signal is used for a particular line that has been enabled by the panel gate driver controller. The line-strobe signal, thus, drives the selected line at the right time. Control of the timing of the gate drivers may be performed as is known by a person skilled in the art. Also shown is bidirectional communication 57 between controller 56 and gate driver controller 280; this communication is used for timing management between the source and gate drivers.

Figure 5B:
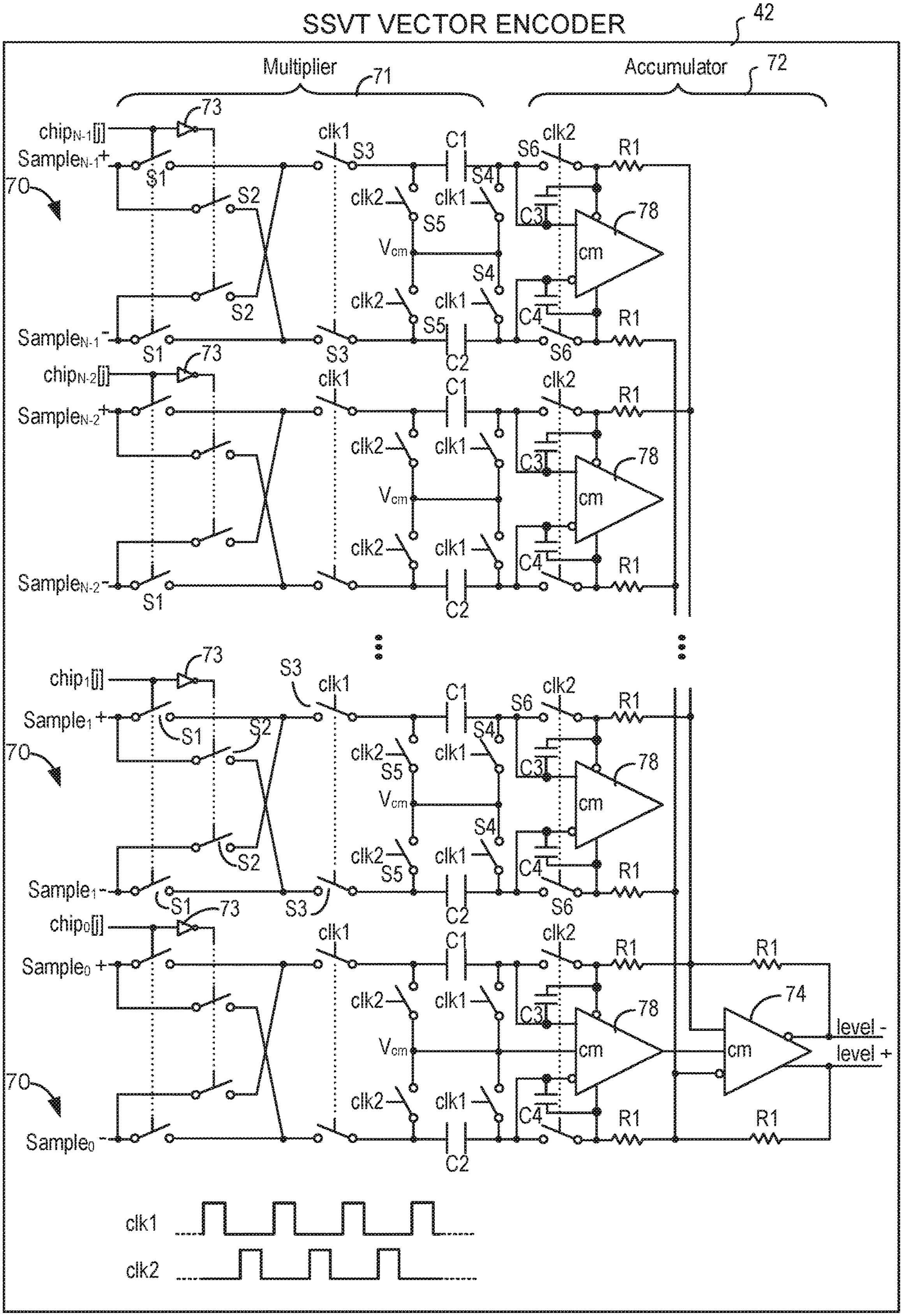
FIG. 5B illustrates one particular embodiment of an encoder that encodes analog values.

FIG. 5B illustrates one particular embodiment of an encoder 42 that encodes analog values. A circuit diagram of an encoder 42 for one of the input vectors V is illustrated. The encoder circuit 42 includes a multiplier stage 71 with a plurality of multiplier stages 70 and an accumulator stage 72 that includes a differential amplifier 74.

Each multiplier stage 70 is arranged to receive at first (+) and second (−) terminals a differential pair of sample signals (+$\text{Sample}_{N-1}$/−$\text{Sample}_{N-1}$ through +$\text{Sample}_0$/−$\text{Sample}_0$) from one of the DACs 62 respectively. Each multiplier stage 70 also includes a terminal to receive a chip from a code, an inverter 73, sets of switches S1-S1, S2-S2 and S3-S3, sets of switches driven by clk 1 and clk 2, and storage devices C1 and C2 of equal value that each store a voltage sample when subjected to the various switches, thus storing differing voltages across each device at different times according to the switching sequence.

During operation, each multiplier stage 70 modulates its received differential pair of analog signals by conditionally multiplying by either (+1) or (−1), depending on a value of a received chip. If the chip is (+1), then when clk 1 is active, switch pairs S1-S1 and S3-S3 close, while switch pair S2-S2 remain open. As a result, both the differential pair of +/−samples are stored on the storage devices C1 and C2 without any inversion (i.e., multiplied by +1) respectively. On the other hand, if the chip is (−1), then the complement of the above occurs. In other words, switch pair S1-S1 opens and switch pair S2-S2 closes, and pair S3-S3 closes when clk 1 is active. As a result, the differential pair of samples are switched and stored on C1 and C2, respectively, thus effecting multiplication by −1.

The accumulator stage 72 operates to accumulate the charges on the storage devices C1 and C2 for all of the multiplier stages 70. When clk 1 transitions to inactive and clk 2 transitions to active, then all the clk 1 controlled switches (S3-S3, S4-S4) open and the clk 2 controlled switches (S5-S5, S6-S6) close. As a result, all the charges on the first storage devices C1 of all the multiplier stages 70 are amplified by amplifiers 78 and accumulated on a first input of the differential amplifier 74, while all the charges on the second storage devices C2 of all the multiplier stages 70 are amplified by amplifiers 78 and accumulated on a second input of the differential amplifier 74. In response, the differential amplifier 74 generates a pair of differential electromagnetic (EM) level signals. Amplifier 74 may use the same Vcm as amplifier 78 to its immediate left. Depending upon the implementation, the resistors R1 shown for each amplifier 78 and 74 may be the same or different, and the resistors R1 of amplifier 74 may be the same or different from those of amplifiers 78. Capacitors C1, C2, C3 and C4 should be of the same size.

The above process is performed for all four vectors $V_0$, $V_1$, $V_2$ and $V_3$. In addition, the above-described process is continually repeated so long as the stream of sets of samples 22 is received by the SSVT transmitter 28. In response, four streams of differential EM output level signals are transmitted over the transmission medium.

SSVT Digital Encoder and Timing Controller

FIG. 6 illustrates an SSVT transmitter and timing controller 150' in greater detail. As mentioned earlier, the present invention may modulate either analog or digital pixel values. In this embodiment, encoders 42' modulate and encode digital samples from the distributor rather than modulate and encode analog samples as in FIG. 4.

Elements 26, 210-230, and 171 are implemented and performed as previously discussed in FIG. 4. The SSVT encoders 42' are modified as follows with respect to previously described encoders 250-256. Turning now to FIG. 5A showing the integrated transmitter 28, this circuit will be modified to not include DACs 62. In other words, the samples output from presentation bank 54 are output directly into their respective encoders 42 for digital encoding. Further details on digital encoding are explained below in FIG. 8. After each digital encoder 42', its output digital EM signal will be converted into an analog EM signal by a corresponding high-frequency DAC 460-466 before being sent over its respective EM pathway to the source drivers.

SSVT Decoding and Integration with Source Driver

On the receive side, the decoders of each source driver are responsible for decoding the stream of the differential EM signals received over the transmission medium back into a format suitable for display. Once in the suitable format, the video content contained in the samples can be presented on a video display, frame after frame. As a result, the video capture by any video source can be re-created by a video sink. Alternatively, the decoded video information can be stored for display at a later time in a time-shifted mode.

SSVT Signal, Encoding and Decoding, Resulting Waveform

As mentioned earlier, various embodiments of the present invention disclose that an analog signal be used to transport video information within a display set in order to dispense with the need for DACs within the source drivers, among other advantages.

For the purposes of this disclosure, an electromagnetic signal (EM signal) is a variable represented as electromagnetic energy whose amplitude changes over time. EM signals propagate through EM paths, such as a wire pair (or cable), free space (or wireless) and optical or waveguide (fiber), from a transmitter terminal to a receiver terminal. EM signals can be characterized as continuous or discrete independently in each of two dimensions, time and amplitude. "Pure analog" signals are continuous-time, continuous-amplitude EM signals; "digital" signals are discrete-time, discrete-amplitude EM signals; and "sampled analog" signals are discrete-time, continuous-amplitude EM signals. The present disclosure discloses a novel discrete-time, continuous-amplitude EM signal termed a "spread-spectrum video transport" (SSVT) signal that is an improvement over existing SSDS-CDMA signals. SSVT refers to the transmission of electromagnetic signals over an EM pathway or pathways using an improved spread-spectrum direct sequence (SSDS)-based modulation.

Code Division Multiple Access (CDMA) is a well-known channel access protocol that is commonly used for radio communication technologies, including cellular telephony. CDMA is an example of multiple access, wherein several different transmitters can send information simultaneously over a single communication channel. In telecommunications applications, CDMA allows multiple users to share a given frequency band without interference from other users. CDMA employs Spread Spectrum Direct Sequence (SSDS) encoding which relies on unique codes to encode each user's data. By using unique codes, the transmission of the multiple users can be combined and sent without interference between the users. On the receive side, the same unique codes are used for each user to demodulate the transmission, recovering the data of each user respectively.

An SSVT signal is different from CDMA. As a stream of input video (for example) samples is received at encoders, they are encoded by applying an SSDS-based modulation to each of multiple encoder input vectors to generate the SSVT signals. The SSVT signals are then transmitted over a transmission medium. On the receive side, the incoming SSVT signals are decoded by applying the corresponding SSDS-based demodulation in order to reconstruct the samples that were encoded. As a result, the original stream of time-ordered video samples containing color and pixel-related information is conveyed from a single video source to a single video sink, unlike CDMA which delivers data from multiple users to multiple receivers.

Figure 7:
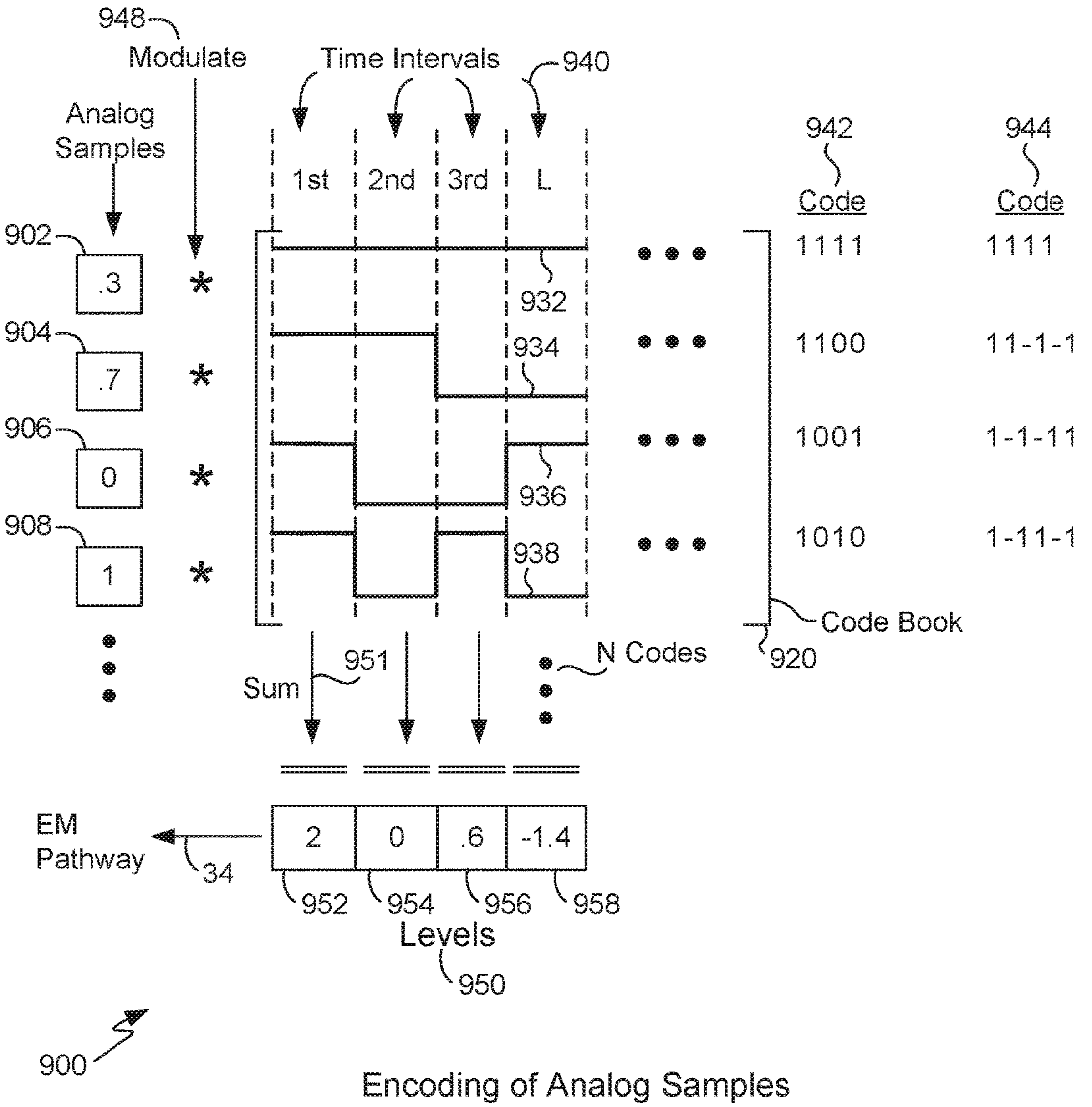
FIG. 7 is an example showing how analog voltage values are encoded within an encoder and then sent over an electromagnetic pathway.

FIG. 7 illustrates a simplistic example showing how signal samples, in this case, analog values, are encoded within an encoder and then sent over an electromagnetic pathway. Shown is an input vector of N analog values 902-908 which represent voltages of individual pixels within a video frame. These voltages may represent luminosity of a black-and-white image or luminosity of a particular color value in a pixel, e.g., an R, G or B color value of the pixel, i.e., each value represents a sensed or measured amount of light in the designated color space. Although pixel voltages are used in this example, this encoding technique may be used with voltages representing any of a variety of signals from a sensor such LIDAR values, sound values, haptic values, aerosol values, etc., and the analog values may represent other samples such as current, etc. Signal samples that are digital values may also be encoded and this digital encoding is explained below. Further, even though one encoder and one EM pathway is shown, an embodiment of the invention works well with multiple encoders, each transmitting over an EM pathway.

Preferably, the range of these voltages is from 0 to 1 V for efficiency, although a different range is possible. These voltages typically are taken from pixels in a row of a frame in a particular order, but another convention may be used to select and order these pixels. Whichever convention is used to select these pixels and to order them for encoding, that same convention will be used at the receiving end by the decoder in order to decode these voltages in the same order and then to place them in the resulting frame where they belong. By the same token, if the frame is in color and uses RGB, the convention in this encoder may be that all of the R pixel voltages are encoded first, and then the G and B voltages, or the convention may be that voltages 902-906 are the RGB values of a pixel in that row and that the next three voltages 908-912 represent the RGB values of the next pixel, etc. Again, the same convention used by this encoder to order and encode voltages will be used by the decoder at the receiving end. Any particular convention for ordering analog values 902-908 (whether by color value, by row, etc.) may be used as long as the decoder uses the same convention. As shown, any number of N analog values 902-908 may be presented for encoding at a time using code book 920, limited only by the number of entries in the code book.

As mentioned, code book 920 has any number of N codes 932-938; in this simple example, the code book has four codes meaning that four analog values 902-908 are encoded at a time. A greater number of codes such as 127 codes, 255 codes, etc., may be used, but due to practical considerations such as circuit complexity, fewer codes are preferably used.

As known in the art, code book 920 includes N mutually-orthogonal codes each of length L; in this example L=4. Typically, each code is an SSDS code, but need not necessarily be a spreading code as discussed herein. As shown, each code is divided into L time intervals (also called "chips") and each time interval includes a binary value for that code. As shown at code representation 942, code 934 may be represented in the traditional binary form "1100", although that same code may also be represented as "1 1 −1 −1" as shown in code representation 944 for ease-of-use in modulating the value as will be explained below. Codes 932 and 936-938 may also be represented as in 942 or in 944. Note that each code of length L is not associated with a different computing device (such as a telephone), a different person or a different transmitter, as is done in CDMA.

Therefore, in order to send the four analog values 902-908 over a transmission medium to a receiver (with a corresponding decoder) the following technique is used. Each analog value will be modulated by each chip in the representation 944 of its corresponding code; e.g., value 902, namely .3, is modulated 948 by each chip in the representation 944 of code 932 sequentially in time. Modulation 948 may be the multiplication operator. Thus, modulating .3 by code 932 results in the series ".3, .3, .3, .3". Modulating .7 by code 934 becomes ".7, .7, −.7, −.7"; value "0" becomes "0, 0, 0, 0"; and "value "1" becomes "1, −1, 1, −1". Typically, the first chip of each code modulates its corresponding analog value, and then the next chip of each code modulates its analog value, although an implementation may also modulate a particular analog value by all the chips of its code before moving on to the next analog value.

Each time interval, the modulated analog values are then summed at 951 (perceived vertically in this drawing) to obtain analog output levels 952-958; e.g., the summation of modulated values for these time intervals results in output levels of 2, 0, .6, −1.4. These analog output levels 952-958 may be further normalized or amplified to align with a transmission line's voltage restrictions, and may then be sent sequentially in time as they are produced over an electromagnetic pathway (such as a differential twisted-pair) of transmission medium in that order. A receiver then receives those output levels 952-958 in that order and then decodes them using the same code book 920 using the reverse of the encoding scheme shown here. The resultant pixel voltages 902-908 may then be displayed in a frame of a display at the receiving end in accordance with the convention used. Thus, analog values 902-908 are effectively encoded synchronously and sent over a single electromagnetic pathway in a sequential series of L analog output levels 952-958. Numerous encoders and electromagnetic pathways may also be used as shown and described herein. Further, the number of N samples that can be encoded in this manner depends upon the number of orthogonal codes used in the code book.

Advantageously, even though the use of robust SSDS techniques (such as spreading codes) results in a significant drop in bandwidth, the use of mutually-orthogonal codes, the modulation of each sample by chips of its corresponding code, summation, and the transmission of N samples in parallel using L output levels results in a significant bandwidth gain. In contrast with traditional CDMA techniques in which binary digits are encoded serially and then summed, the present invention first modulates the entire sample (i.e., the entire analog or digital value, not a single bit) by each chip in a corresponding code, and then sums those modulations at each time interval of the codes to obtain a resultant analog voltage level for each particular time interval, thus exploiting the amplitude of the resultant waveform. It is these analog output levels that are sent over a transmission medium, not representations of binary digits. Further, the present invention facilitates sending analog voltages from one video source to another video sink, i.e., from endpoint to endpoint, unlike CDMA techniques which allow for multiple access by different people, different devices or different sources, and send to multiple sinks. Moreover, compression is not required for the transport of the sample values.

Figure 8:
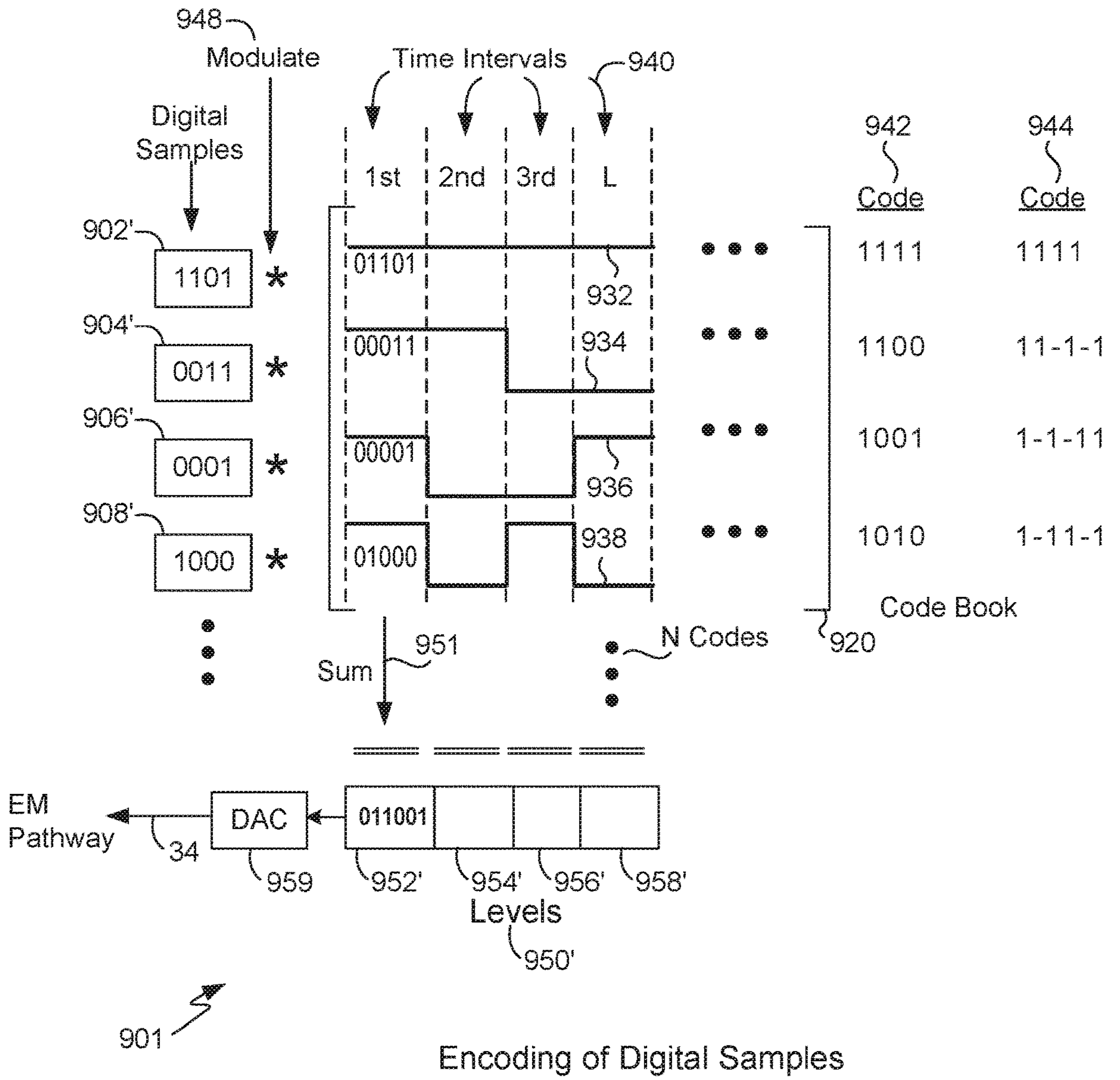
FIG. 8 shows the encoding technique as applicable to digital values.

FIG. 8 illustrates this novel encoding technique as being applicable to signal samples that are digital values. Here, digital values 902'-908' are digital representations of voltages. Using a different example of voltages, value 902' is "1101" value 904' is "0011," value 906' is "0001," and value 908' is "1000." Each digital value is modulated (digitally multiplied) by the representation 944 of each code, that is by "1" or by "−1" depending upon the chip of the code corresponding to the digital value to be modulated. Considering only the first time interval 940 of each code, and adding a most significant bit (MSB) which is the sign bit, modulating "1101" yields "01101" (the MSB "0" meaning a positive value), modulating "0011" yields "00011", modulating "0001" yields "00001," and modulating "1000" yields "01000." These modulated values are shown annotated on the first time interval. (Although not shown, modulating by a −1 chip yields a negative value which may be expressed in binary using a suitable binary representation for negative values.)

Summing digitally, these modulated values in the first time interval yields digital value 952' "011001" (again, the MSB is the sign bit); the other digital values 954'-958' are not shown in this example, but are calculated in the same way. Considering this summation in base 10, one can verify that the modulated values 13, 3, 1 and 8 do sum to 25. Although not shown in this example, typically additional MSBs will be available for the resultant levels 952'-958' in that the sum may require more than five bits. For example, if values 902'-908' are represented using four bits, then levels 952'-958' may be represented using up to ten bits, in the case where there are 64 codes (adding log 2 of 64 bits). Or, if 32 modulated values are summed then five more bits will be added. The number of bits needed for the output levels will depend upon the number of codes.

The output levels 950' may be first normalized to adjust to the DAC's input requirements and then fed sequentially into a DAC 959 for conversion of each digital value into its corresponding analog value for transmission over the EM pathway. DAC 959 may be a MAX5857 RF DAC (includes a clock multiplying PLL/VCO and a 14-bit RF DAC core, and the complex path may be bypassed to access the RF DAC core directly), and may be followed by a bandpass filter and then a variable gain amplifier (VGA), not shown. In some situations the number of bits used in levels 950' are greater than the number allowed by DAC 959, e.g., level 952' is represented by ten bits but DAC 959 is an 8-bit DAC. In these situations, the appropriate number of LSBs are discarded and the remaining MSBs are processed by the DAC, with no loss in the visual quality of the resultant image at the display.

Advantageously, entire digital values are modulated, and then these entire modulated digital values are summed digitally to produce a digital output level for conversion and transmission. This technique is different from CDMA which modulates each binary digit of a digital value and then sums these modulated bits to produce outputs. For example, assuming that there are B bits in each digital value, with CDMA, there will be a total of B*L output levels to send, whereas with this novel digital (or analog) encoding technique there will only be a total of L output levels to send, thus having an advantage.

Figure 9:
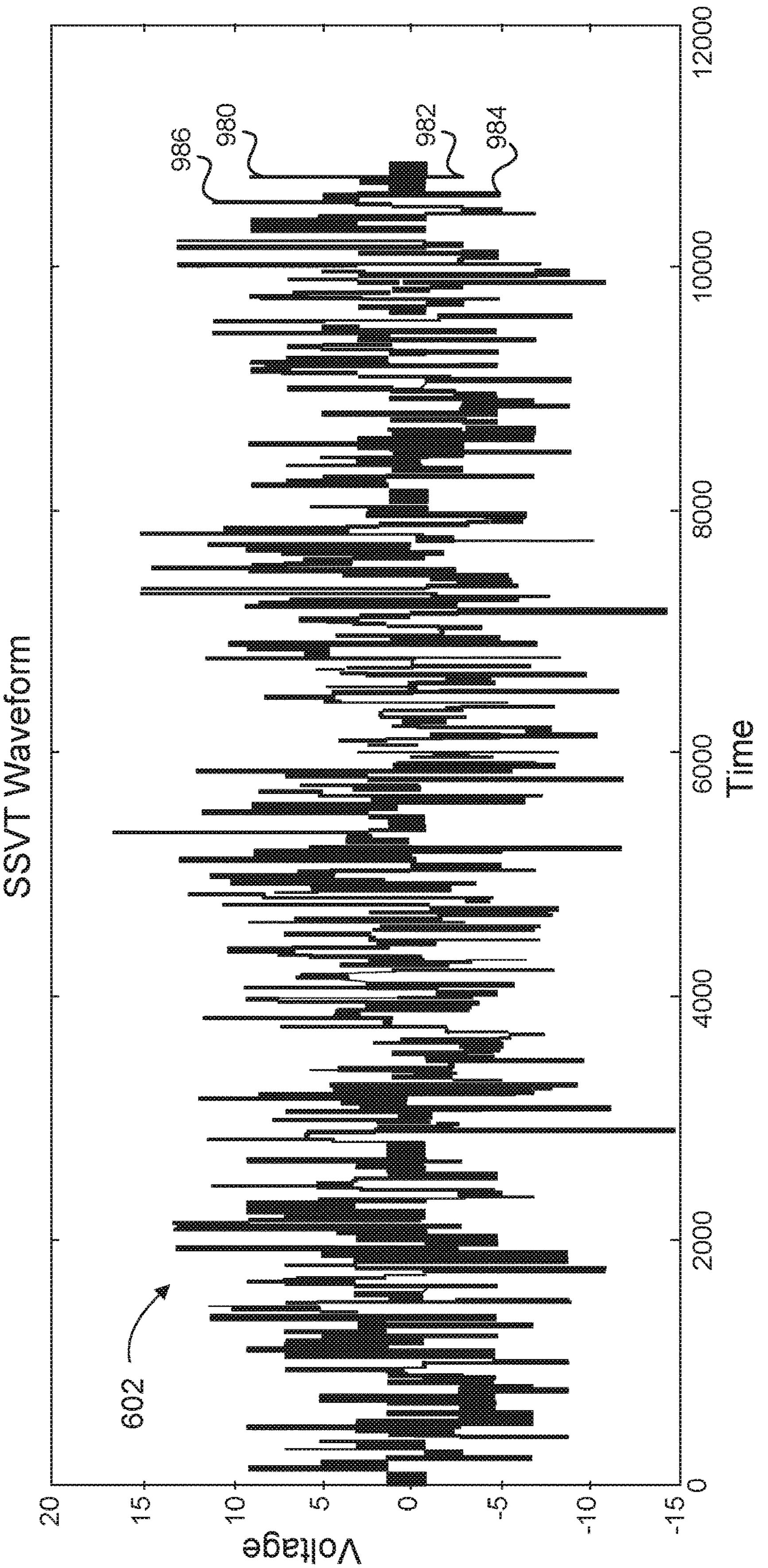
FIG. 9 shows a simulation of an SSVT waveform sent via an EM pathway.

FIG. 9 shows a simulation (similar to an idealized oscilloscope trace) of an SSVT waveform 602 sent via an electromagnetic pathway after being output from an analog encoder (or after being digitally encoded and then converted by a DAC), such as from one of the encoders 250-256 or from one of the DACs 460-466. The vertical scale is voltage, and the horizontal scale is a 100 ps oscilloscope measurement time interval. Note that SSVT signal 602 is an analog waveform rather than a digital signal (i.e., the signal does not represent binary digits) and in this embodiment can transport a range of voltages from about −15 V up to about +15 V. The voltage values of the analog waveform are (or at least can be) fully analog. Also, voltages are not limited to some maximum value, although high values are impractical.

As previously explained, analog voltage levels are sent sequentially over an electromagnetic pathway, each level being the summation of modulated samples per time interval, such as the analog output levels 952-958 above or the digital output levels 952'-958' above (after being passed through a DAC). When sent, these output levels then appear as a waveform such as waveform 602. In particular, voltage level 980 represents the summation in a particular time interval of modulated samples (i.e., an output level). Using a simplistic example, sequential voltage levels 980-986 represent the transmission of four output levels. In this example, 32 codes are used, meaning that 32 samples may be transmitted in parallel; thus, voltage levels 980-986 (followed by a number of subsequent voltage levels, depending upon the number of chips in a code, L) form the transmission in parallel of 32 encoded samples (such as pixel voltages from a video source). Subsequent to that transmission, the next set of L voltage levels of waveform 602 represent the transmission of the next 32 samples. In general, waveform 602 represents the encoding of analog or digital values into analog output levels, and the transmission of those levels in discrete time intervals to form a composite analog waveform.

Figure 26:
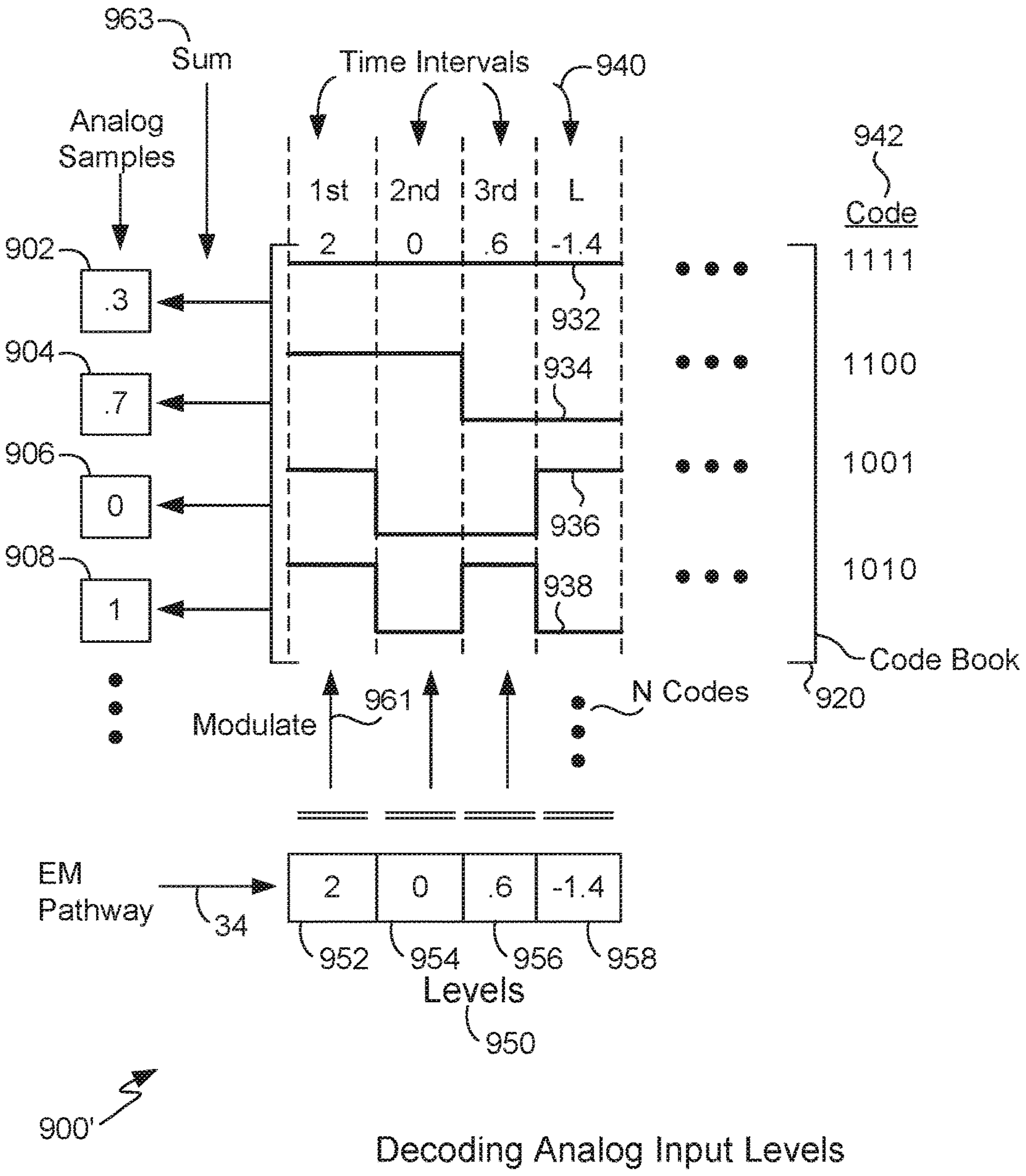
FIG. 26 illustrates the decoding of analog input levels that were encoded using the encoder.

FIG. 26 illustrates the decoding of analog input levels that were encoded using the encoder. As shown, L input levels 950 have been received over a single electromagnetic pathway of a transmission medium. As described herein and noted earlier, code book 920 includes N orthogonal codes 932-938 that will be used to decode input levels 950 to produce an output vector of N analog values 902-908, i.e., the same analog values 902-908 that were encoded above. To perform decoding, as indicated by the vertical arrows, each input level 952-958 is modulated 961 by each chip of each code corresponding to a particular index in the output vector 902-908. Considering modulation of levels 952-958 by the first code 932, such modulation produces the series of modulated values "2, 0, .6, −1.4". Modulation of levels 952-958 by the second code 934 produces the series of modulated values "2, 0, −.6, 1.4". Modulation by the third code 936 produces "2, 0, −.6, −1.4", and modulation by the fourth code 938 produces "2, 0, .6, 1.4".

Next, as indicated by the horizontal arrows, each series of modulated values is summed in order to produce one of the analog values 902-908. For example, the first series is summed to produce the analog value "1.2" (which becomes ".3" after being normalized using the scale factor of "4). In a similar fashion, the other three series of modulated values are summed to produce the analog values "2.8", "0" and "4", and after being normalized yield the output vector of analog values 902-908. Each code may modulate the input levels and then that series may be summed, or, all may modulate the input levels before each series is summed. Thus, the output vector of N analog values 902-908 has been transported in parallel using L output levels. Not shown in these examples is an example of decoding digital input levels, although one of skill in the art will find it straightforward to perform such decoding upon reading the encoding of digital values in the above description.

Figure 27A:
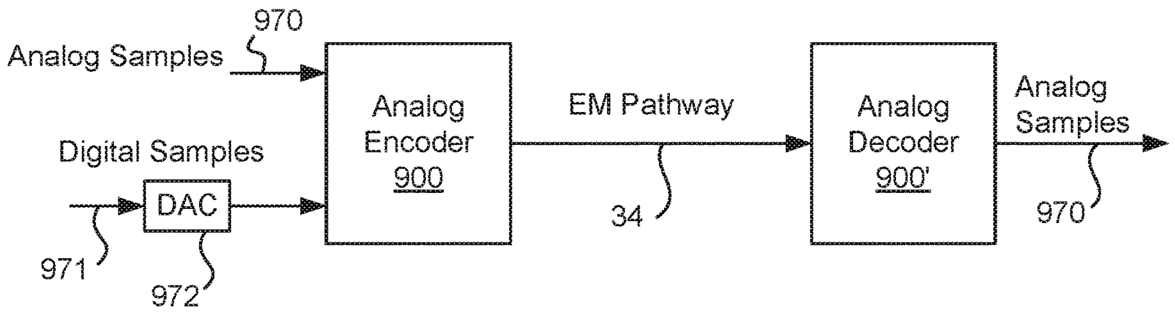
FIG. 27A illustrates use of an analog encoder and a corresponding analog decoder.
Figure 27B:
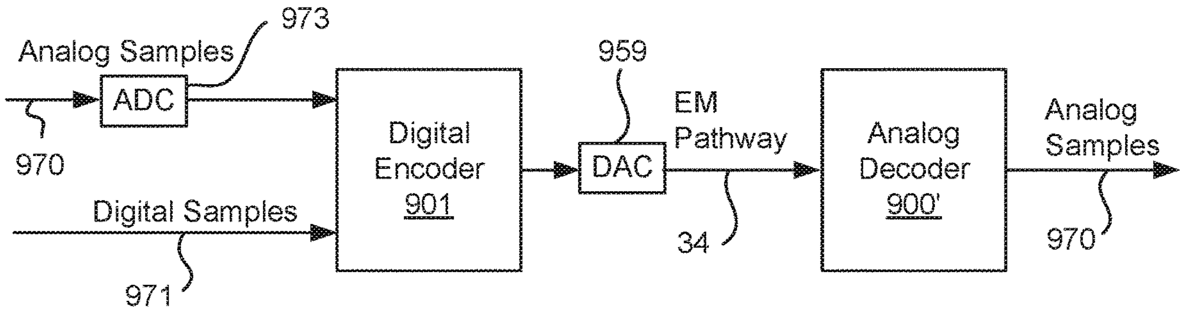
FIG. 27B illustrates use of a digital encoder and a corresponding analog decoder.
Figure 27C:
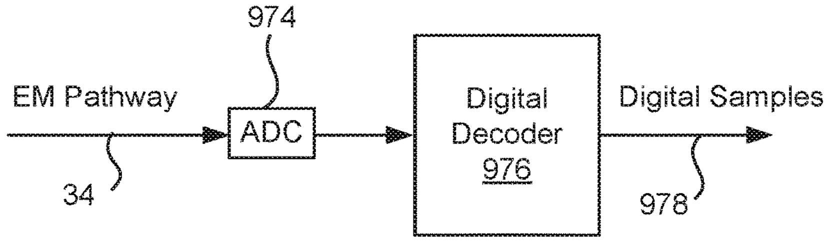
FIG. 27C illustrates use of a digital decoder to decode encoded analog signals that have arrived over an electromagnetic pathway on transmission medium.

FIGS. 27A, 27B and 27C illustrate that the encoders and decoders may operate upon either analog samples or digital samples; the various analog and digital encoders and decoders have previously been described above. As explained above, there may be more than one EM pathway and accordingly more than one encoder/decoder pair and a corresponding number of DACs or ADCs as the case may be.

FIG. 27A illustrates use of an analog encoder and a corresponding analog decoder. Input into analog encoder 900 are either analog samples 970 or digital samples 971 that have been converted into analog by a DAC 972 located at the analog encoder. In this fashion, either analog or digital samples that arrive at the analog encoder may be encoded for transmission over an electromagnetic pathway on transmission medium. Analog decoder 900' decodes the encoded analog samples to produce analog samples 970 for output. Analog samples 970 may be used as is or may be converted into digital samples using an ADC (not shown).

FIG. 27B illustrates use of a digital encoder and a corresponding analog decoder. Input into digital encoder 901 are either digital samples 971 or analog samples 970 that have been converted into digital by an ADC 973 located at the digital encoder. As the encoder is digital, a DAC 959 located at the encoder converts the encoded samples into analog before transmission over the electromagnetic pathway. In this fashion, either analog or digital samples that arrive at the digital encoder may be encoded for transmission over an electromagnetic pathway on transmission medium. Analog decoder 900' decodes the encoded analog samples to produce analog samples 970 for output. Analog samples 970 may be used as is or may be converted into digital samples using an ADC (not shown).

FIG. 27C illustrates use of a digital decoder to decode encoded analog signals that have arrived over an electromagnetic pathway on transmission medium. The encoded analog signals may been transmitted using either the analog encoder or the digital encoder described immediately above. An ADC 974 located at digital decoder 976 receives the encoded analog samples sent via the electromagnetic pathway and converts the samples into digital. These encoded digital samples are then decoded by digital decoder 976 into digital samples 978 (corresponding to the values of an input vector of samples that was originally encoded before transmission over the electromagnetic pathway). Digital samples 978 may be used as is or may be converted into analog samples using a DAC.

Due to such phenomena as attenuation, reflections due to impedance mismatches, and impinging aggressor signals, every electromagnetic pathway degrades electromagnetic signals that propagate through it, and thus measurements taken of input levels at a receiving terminal are always subject to error with respect to corresponding output levels made available at the transmitting terminal. Hence, scaling of input levels at a receiver (or normalization or amplification of output levels at a transmitter) may be performed to compensate, as is known in the art. Further, due to process gain (i.e., due to an increase in L which also increases electrical resilience) decoded input levels at a decoder are normalized by a scale factor using the code length to recover the transmitted output levels as is known in the art. Further, as herein described, although it is preferable that L>=N>=2, in some situations it is possible that L will be less than N, i.e., N>L>=2.

Specific Embodiments

The above describes in general integration of the SSVT transmitter with a timing controller and integration of the SSVT transmitter with a timing controller and system-on-a-chip. Below are specific embodiments showing examples of this integration.

Figure 11:
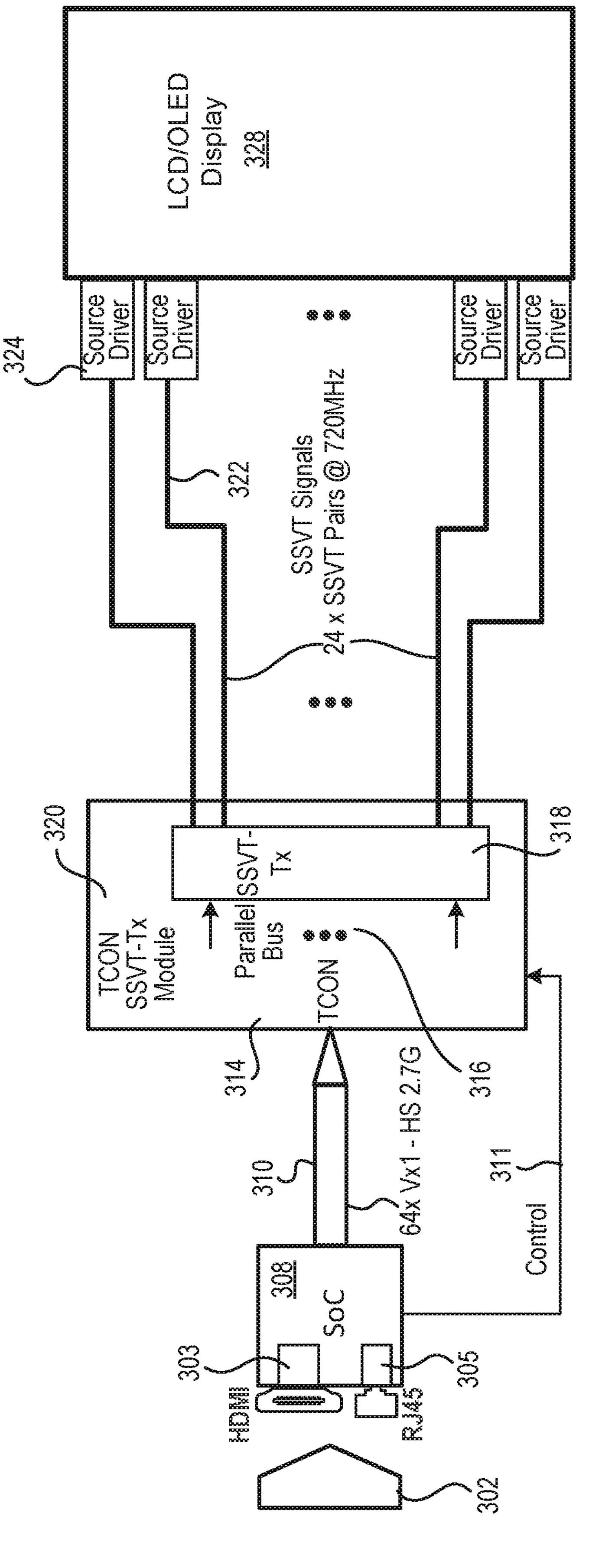
FIG. 11 illustrates an 8K display set with integrated SSVT transmitter and timing controller.

FIG. 11 illustrates an 8K display set with integrated SSVT transmitter and timing controller. Shown are the relevant portions of an 8K144 display set having an LCD/OLED display 328. Input into the SoC 308 of the display set is a compressed digital video signal 302 that may be input via an HDMI connector 303 or an RJ-45 connector 305, among other suitable types of connectors. The SoC uncompresses this digital data (and performs other processing as known in the art and as described above) and transfers this modified digital data using a suitable V-by-One format 310 and speed as shown to an integrated timing controller and SSVT transmitter module 320. Control signal or signals 311 from SoC to integrated module 320 may have many functions such as carrying configuration information for downstream components or framing signals. One function may be adjusting the gamma curve from SDR to HDR ("Standard Dynamic Range" to "High Dynamic Range") or similar adjustments. Other functions include setting the TCON operating parameters such as resolution, backlight type etc.

Integrated module 320 may take different forms such as a single integrated circuit or implementation upon a printed circuit board, and may include a single TCON or two or more TCONs. Module 320 may be implemented as shown in FIGS. 2, 4, 5A, 6, 10, or in a similar manner as will be appreciated by one of skill in the art after a reading of this disclosure. Shown within module 320 are TCON 314 and SSVT transmitter 318 connected by bus 316. Bus 316 passes as input to SSVT Tx 318, for example, 24 or 48 parallel digital signals (which is typically the normal output of a TCON). But these numbers may vary depending upon the implementation. Basically, a large number of pixels are sent during each interval of the SSVT Tx input clock. For example, the width of this bus, in pixels, is at most one row (~23,000 sub-pixels) at the row rate, or a fraction of that number at a corresponding multiple of the row rate.

The encoders of the SSVT transmitter then each send an SSVT signal 322 to corresponding source drivers 324 of the display 328. In this example, there are 24 encoders, meaning 24 SSVT signals and 24 source drivers. As mentioned above, each source driver is preferably implemented as described herein and in U.S. application Ser. No. 17/900,570 and integrates an SSVT receiver (having a corresponding decoder) with elements of a traditional source driver.

Not shown is an example of an 8K120 display set which may be implemented as shown in FIG. 11 except that the transfer from SoC to integrated module 320 would use 64 V×1-HS at 2.3 GHz and the 24 SSVT signal pairs would operate at 634 MHz. Also not shown is how module 320 may replace four prior art TCONs, each having a 16×V×1-HS 4 GHz stream coming from the SoC 308. These four streams may be left as is and input separately into module 320 or may be combined into stream 310 as shown. Also not shown are the timing and framing controls signals from module 320 to the gate drivers of display 328.

Figure 12:
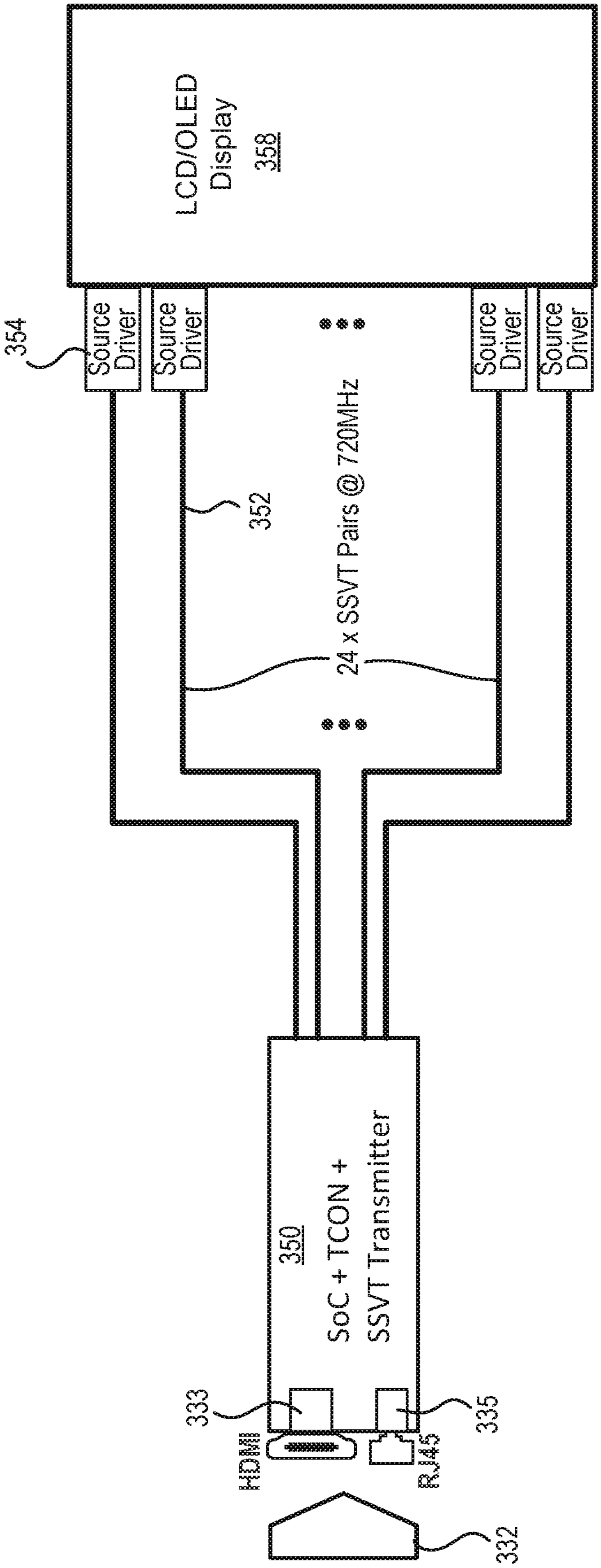
FIG. 12 illustrates an 8K display set with integrated SSVT transmitter, timing controller and SoC.

FIG. 12 illustrates an 8K display set with integrated SSVT transmitter, timing controller and SoC. Shown are the relevant portions of an 8K144 display set having an LCD/OLED display 358. Input into the integrated SoC, TCON and SSVT transmitter 350 of the display set is a compressed digital video signal 332 that may be input via an HDMI connector 333 or an RJ-45 connector 335, among other suitable types of connectors. The SoC uncompresses this digital data (and performs other processing as known in the art and as described above) and transfers this modified digital data internally to the integrated timing controller and SSVT transmitter.

Integrated module 350 may take different forms such as a single integrated circuit or implementation upon a printed circuit board, and may include a single TCON or two or more TCONs. Integration of the TCON and SSVT transmitter may be implemented as shown in FIGS. 2, 4, 5A, 6, 10, or in a similar manner as will be appreciated by one of skill in the art after a reading of this disclosure; integration with the SoC is performed by passing signals 164 internally from the SoC to the unpacker 26. It is contemplated that the integrated implementation is a single chip; alternatively, there may be multiple chips side by side, or also a multi-chip package (which looks like a single chip, but actually contains two or three chips). In one particular embodiment, the 64×V×1 signals 310 of FIG. 11 are replaced with a bespoke intra-chip interface bus that sends a larger number of bits. As no chip pins are required, the bus may be 10 times wider, at a lower rate.

The encoders of the SSVT transmitter then each send an SSVT signal 352 to corresponding source drivers 354 of the display 358. In this example, there are 24 encoders, meaning 24 SSVT signals and 24 source drivers. As mentioned above, each source driver is preferably implemented as described herein and in U.S. application Ser. No. 17/900,570 and integrates an SSVT receiver (having a corresponding decoder) with elements of a traditional source driver. No DACs are needed in such a source driver.

Not shown is an example of an 8K120 display set which may be implemented as shown in FIG. 12 except that the 24 SSVT signal pairs would operate at 634 MHz. Also not shown are the timing and framing controls signals from module 350 to the gate drivers of display 358.

Figure 13:
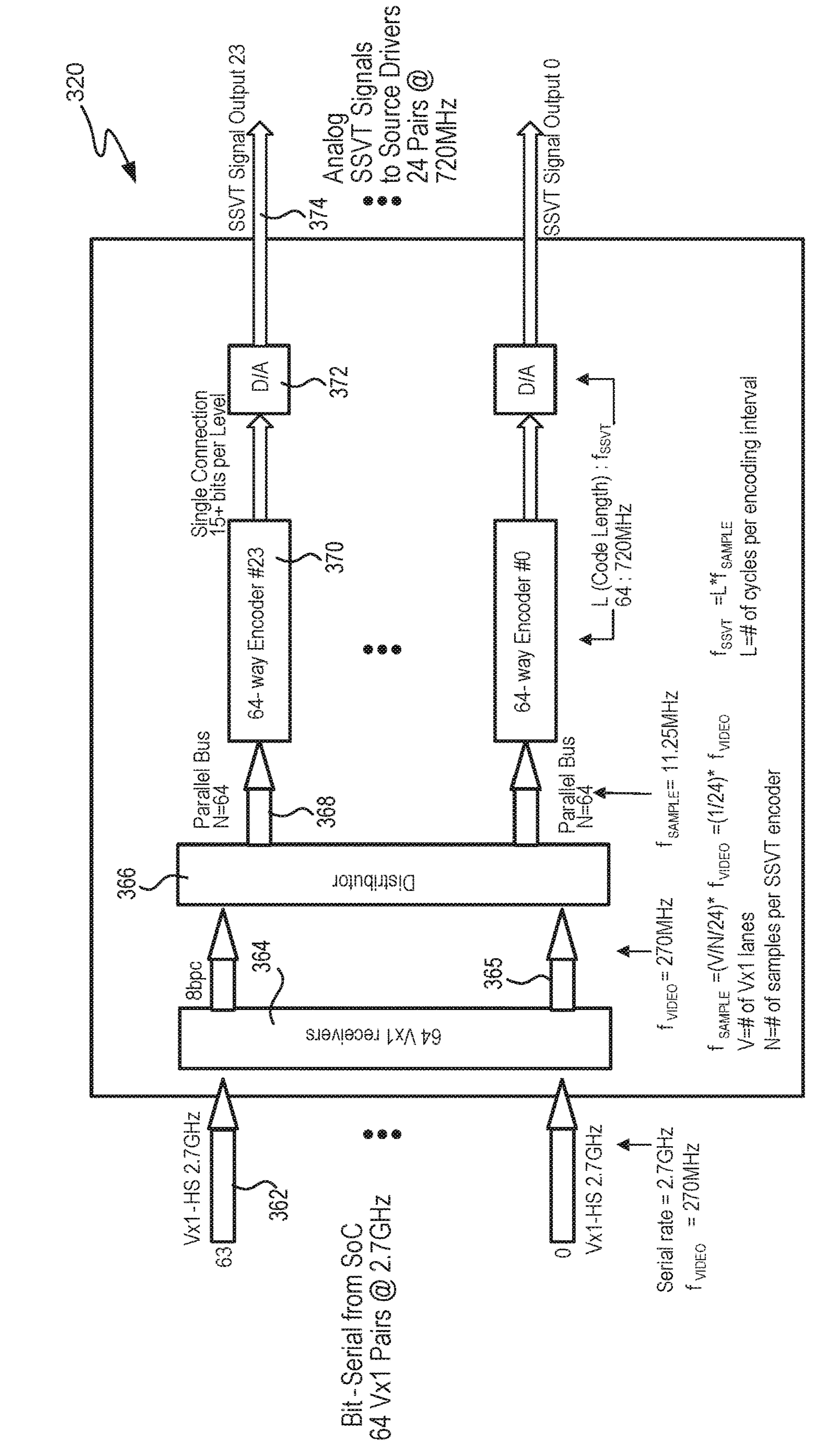
FIG. 13 illustrates one particular embodiment of the integrated module which uses digital encoding.
Figure 14A:
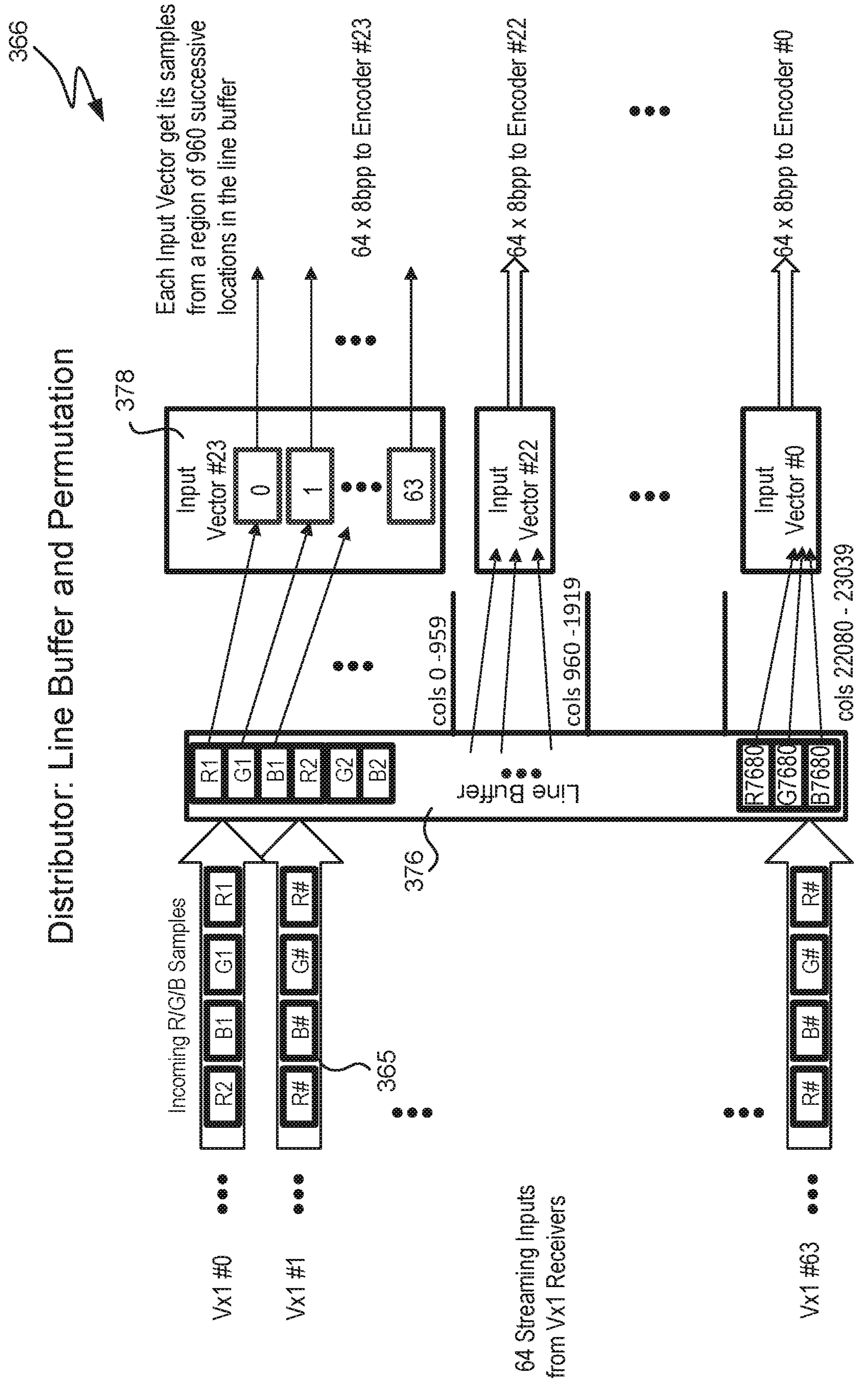
FIG. 14A illustrates one possible implementation for the distributor of FIG. 13 in greater detail.
Figure 14B:
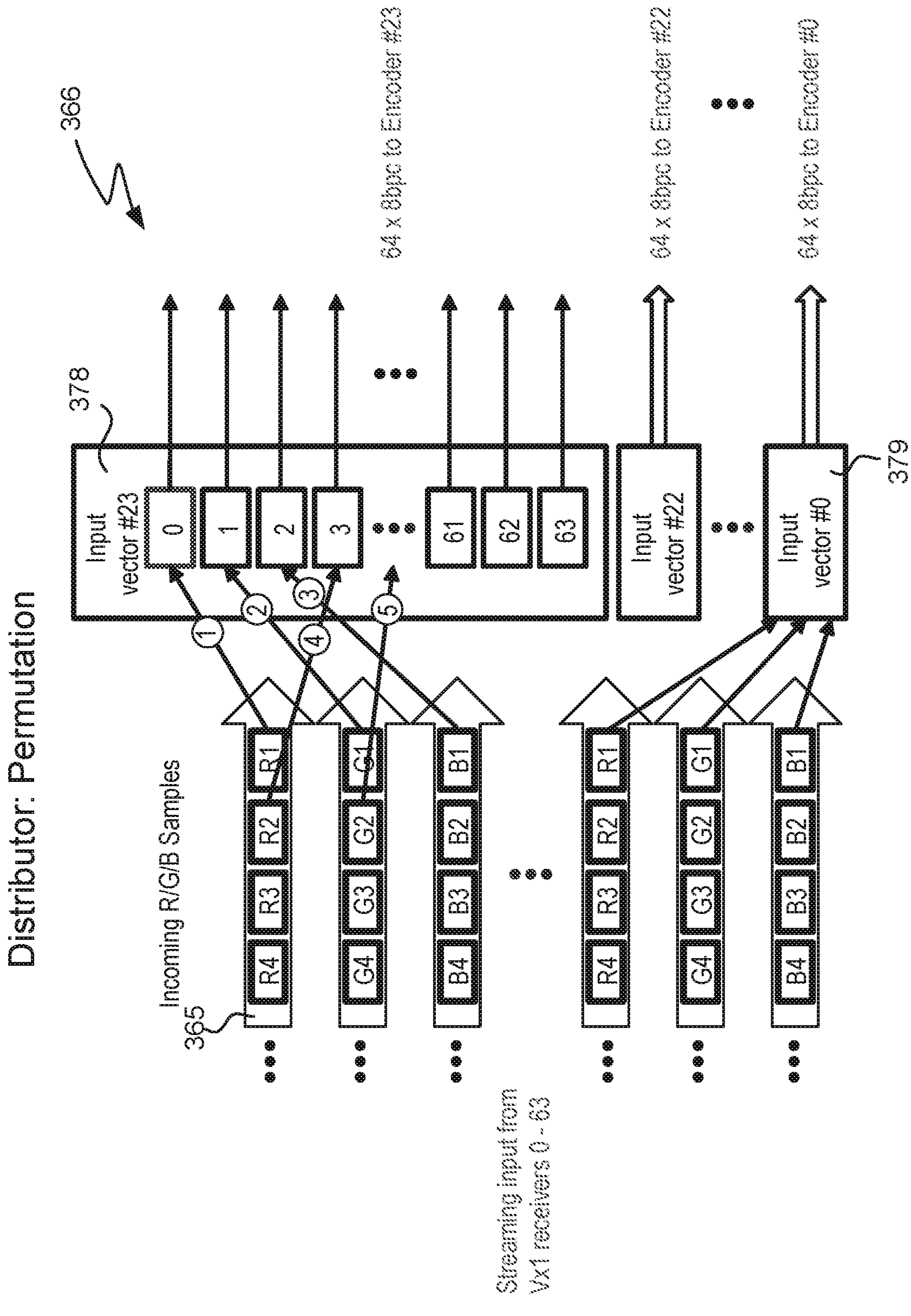
FIG. 14B illustrates another possible implementation for the distributor of FIG. 13 in greater detail.

FIG. 13 illustrates one particular embodiment of the integrated module 320 which uses digital encoding. As shown, 64 streams of V×1 samples 362 are received at corresponding 64 V×1 receivers 364 which each deliver a stream 365 of RGB samples of eight bits per color channel (24 bits per pixel) to a distributor 366. Distributor 366 may be implemented as shown at 40 in FIG. 5A or may be implemented as shown in FIG. 14A or 14B. A total of 24 parallel buses 368 then each delivers 64 samples (N=64) to one of 24 encoders 370 which each digitally encode their N samples and outputs a digital signal which is converted by one of 24 digital-to-analog converters 372 into an SSVT EM signal 374 for delivery to a source driver of a display. The notation "15+ bits per level" means that each analog level output will reflect 15+ bits of information.

FIG. 14A illustrates one possible implementation for the distributor of FIG. 13 in greater detail. As shown, there are 64 streaming inputs 365 from the V×1 receivers 364, each input including a serial stream of RGB samples. The samples of these streams are stored into a line buffer 376. The samples of the line buffer are then permuted into a set of 24 input vectors 378 (one input vector per encoder) using any particular permutation. As shown, each input vector will receive its 64 samples from 64 successive locations of the line buffer, although the samples may be permuted in any order desired when they are placed into each input vector. Once the input vectors are filled, the samples are all delivered in parallel to the encoders for encoding. In this example, each of the 24 input vectors will encode $1/24^{th}$ of the 8K×3 input lines, i.e. 960 lines for each encoder. Each input vector clocks in 64 (or 60) samples at a time, but subsequent blocks clocked in to that input vector add up to 960. E.g., input vector 23 receives input from columns 0-959, vector 22 receives input from columns 960-1919, etc. More specifically, during one encoding interval, 64 locations from the line buffer are encoded via one 64-location input vector. The encoder sends 60 samples and 4 sub-band signals. The encoding process is iterated 16 times during each line interval to convey all 960 samples per row. The assembly, staging bank and presentation banks are not shown in this implementation in this simplified drawing; they may be used as shown in FIG. 5A to implement the permutation.

FIG. 14B illustrates another possible implementation for the distributor of FIG. 13 in greater detail. In this implementation no line buffer is used; the samples are permuted directly into the input vectors from the streaming inputs. As shown, there are 64 streaming inputs 365 from the V×1 receivers 364, each input including a serial stream of RGB samples. The incoming samples from any of the streaming inputs may be assigned to any location in any of the input vectors according to a predetermined permutation. By way of example, the first two positions in input vector 378 come from the first and second streaming inputs, the next two positions come from the third and first streaming inputs, and the fifth position comes from the second streaming input. In this example, three of the positions in input vector 379 come from the last three streaming inputs, thus showing that any permutation is possible.

Figure 15:
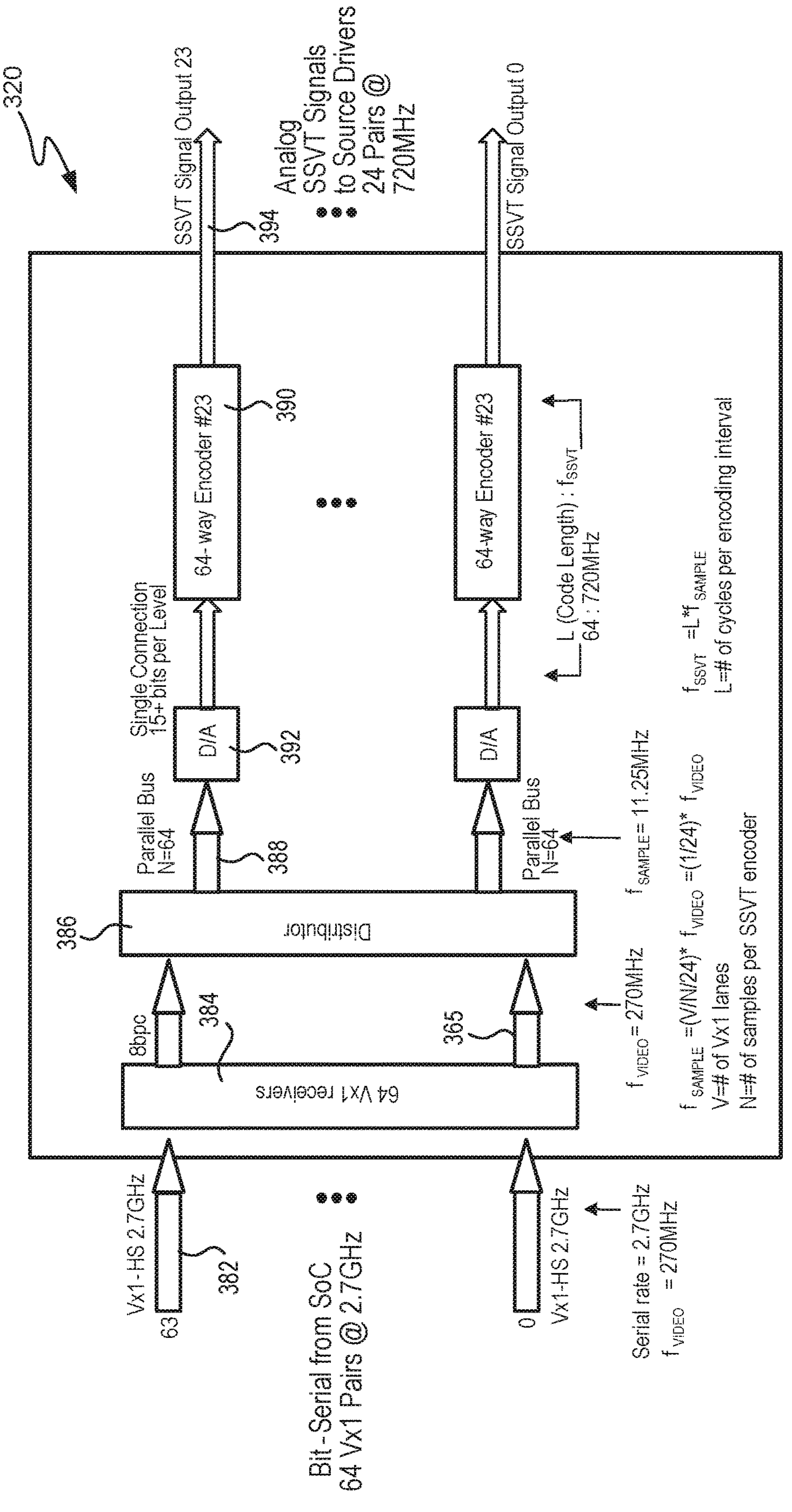
FIG. 15 illustrates one particular embodiment of the integrated module which uses analog encoding.

FIG. 15 illustrates one particular embodiment of the integrated module 320 which uses analog encoding. As shown, 64 streams of V×1 samples 382 are received at corresponding 64 V×1 receivers 384 which each deliver a stream 385 of RGB samples of eight bits per color channel (24 bits per pixel) to a distributor 386. Distributor 386 may be implemented as shown at 40 in FIG. 5A or may be implemented as shown in FIG. 14A or 14B. A total of 24 parallel buses 388 then each delivers 64 samples (N=64) to a digital-to-analog converter 392 (or, each to 64 DACs in parallel) after which the converted samples are delivered in parallel to one of 24 encoders 390 which each use analog encoding in order to encode their N samples and then output an SSVT EM signal 394 for delivery to a source driver of a display. The notation "15+ bits per level" means that each analog level output will reflect 15+ bits of information.

Figure 16:
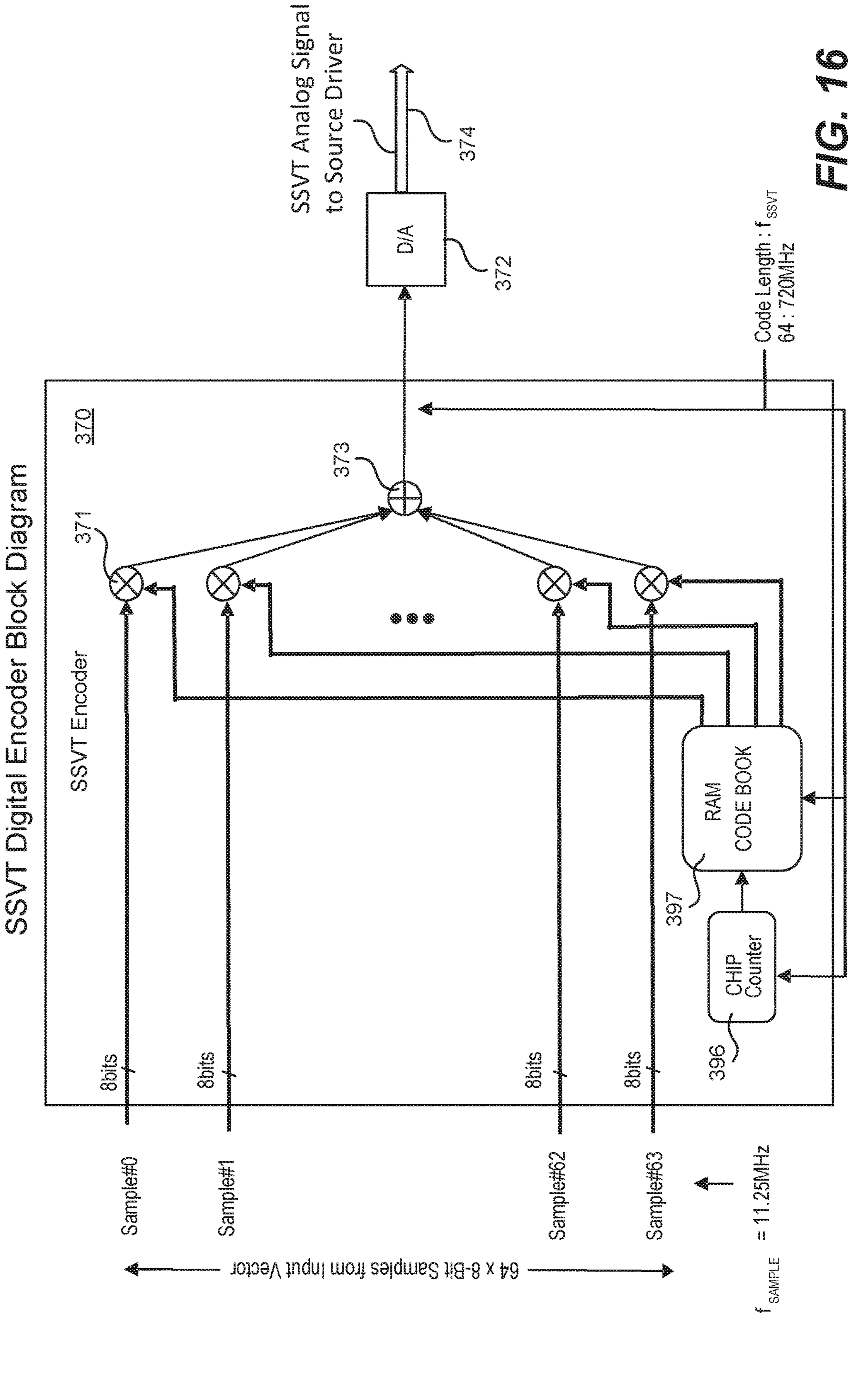
FIG. 16 illustrates in greater detail one of the digital encoders from FIG. 13.

FIG. 16 illustrates in greater detail one of the digital encoders from FIG. 13. As explained above with reference to FIG. 8 (and elsewhere), code book 397 includes a code associated with each incoming sample and chip counter 396 is used to step through each of the chips of the codes during modulation. In operation, each modulator 371 modulates its corresponding digital sample by the current chip of the associated code which are all summed by a summer 373 to produce one of the output levels. This operation is repeated for each chip in a code to produce L output levels which are then converted to analog and output as an SSVT signal 374.

Figure 17:
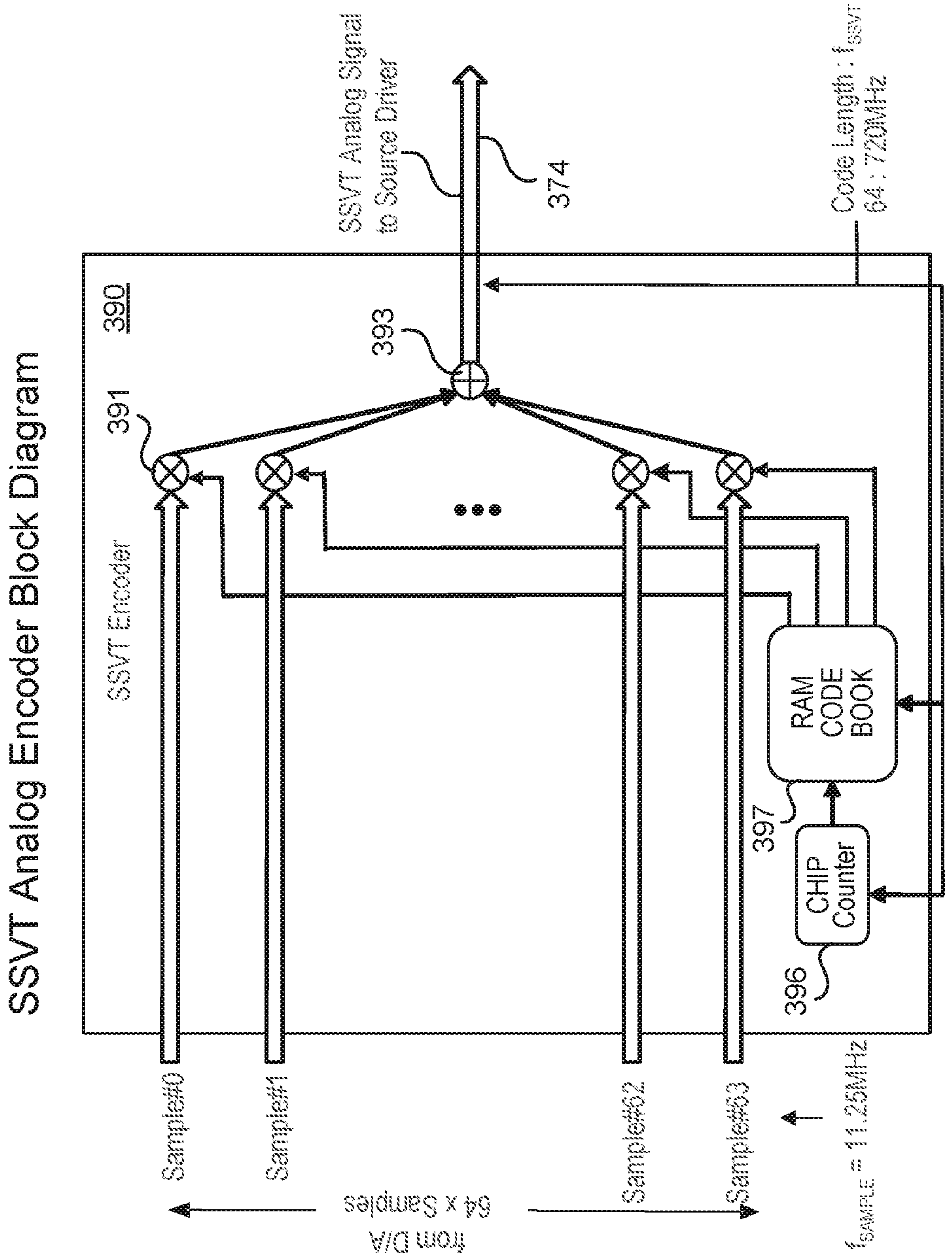
FIG. 17 illustrates in greater detail one of the analog encoders from FIG. 15.

FIG. 17 illustrates in greater detail one of the analog encoders from FIG. 15. As explained above with reference to FIG. 7 (and elsewhere), code book 397 includes a code associated with each incoming sample and chip counter 396 is used to step through each of the chips of the codes during modulation. In operation, each modulator 391 modulates its corresponding analog sample by the current chip of the associated code which are all summed by a summer 393 to produce one of the output levels. This operation is repeated for each chip in a code to produce L output levels which are then output as an SSVT signal 394.

Figure 18:
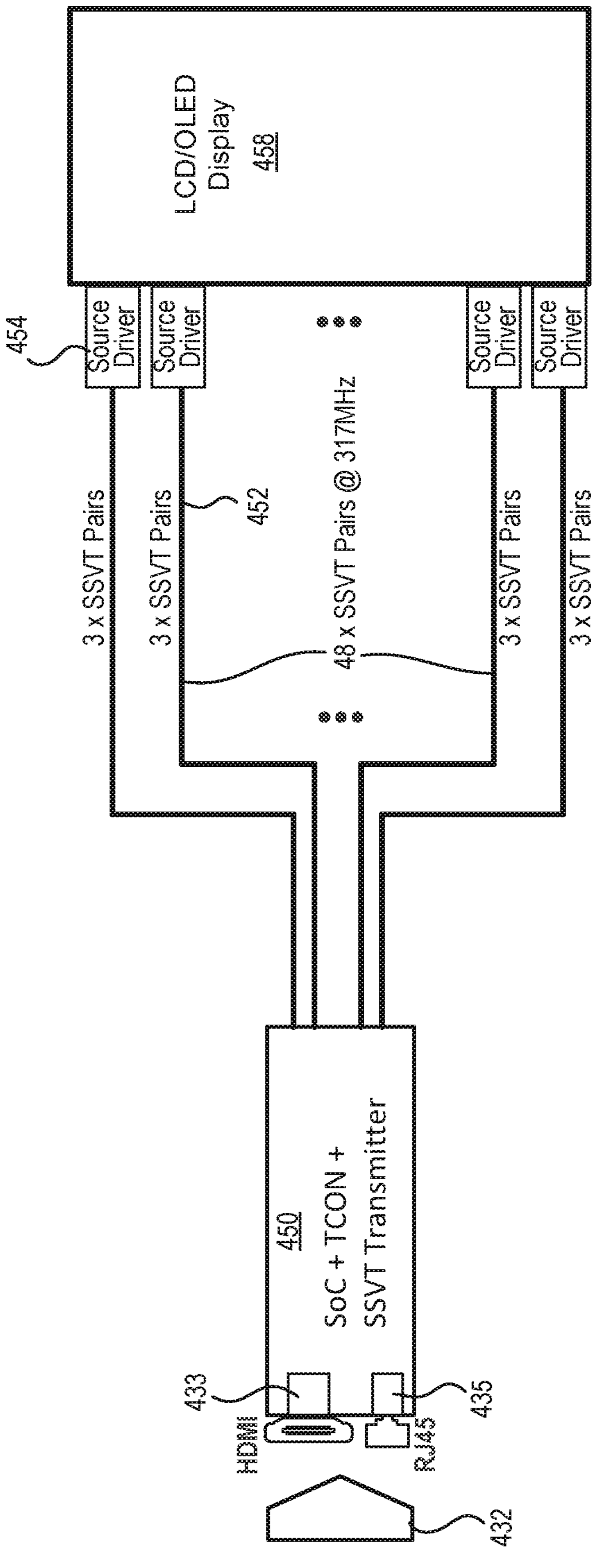
FIG. 18 illustrates an 8K120 display set with integrated SSVT transmitter, timing controller and SoC.

FIG. 18 illustrates an 8K120 display set with integrated SSVT transmitter, timing controller and SoC. This implementation is similar to that shown in FIG. 12 except that each source driver multiplexes any number of incoming SSVT signals. Shown are the relevant portions of the display set having an LCD/OLED display 458. Not shown are the timing and framing controls signals from module 450 to the gate drivers of display 458.

Input into the integrated SoC, TCON and SSVT transmitter 450 of the display set is a compressed digital video signal 432 that may be input via an HDMI connector 433 or an RJ-45 connector 435, among other suitable types of connectors. The SoC uncompresses this digital data (and performs other processing as known in the art and as described above) and transfers this modified digital data internally to the integrated timing controller and SSVT transmitter.

Integrated module 450 may take different forms such as a single integrated circuit or implementation upon a printed circuit board, and may include a single TCON or two or more TCONs. Integration of the TCON and SSVT transmitter may be implemented as shown in FIGS. 2, 4, 5A, 6, 10, or in a similar manner as will be appreciated by one of skill in the art after a reading of this disclosure; integration with the SoC is performed by passing signals 164 internally from the SoC to the Unpacker 26.

The encoders of the SSVT transmitter then each send an SSVT signal 452 to source drivers 354 of the display 458, each source driver receiving three SSVT signals, i.e., 3×SSVT Pairs at 317×3 MSamples/s. In this example, there are 48 encoders, meaning 48 SSVT signals and only 16 source drivers needed because of the multiplexing. As mentioned above, each source driver is preferably implemented as described herein and in U.S. application Ser. No. 17/900,570 and integrates an SSVT receiver (having a corresponding decoder) with elements of a traditional source driver. No DACs are needed in such a source driver. Multiplexing of the three incoming SSVT signals into each source driver may be performed as known to one of skill in the art. Advantageously, the multiplexing dramatically reduces the number and cost of the source drivers.

Integration of SSVT Receiver with Source Drivers of a Display

As mentioned above, the SSVT signals 167 from the integrated SSVT transmitter and timing controller 150 or from the integrated SSVT transmitter, timing controller and SoC 140' shown in the various embodiment herein, are transported to source drivers 169 of a display panel. Below is a description of how an SSVT receiver may be integrated with such a source driver or drivers.

Figure 19:
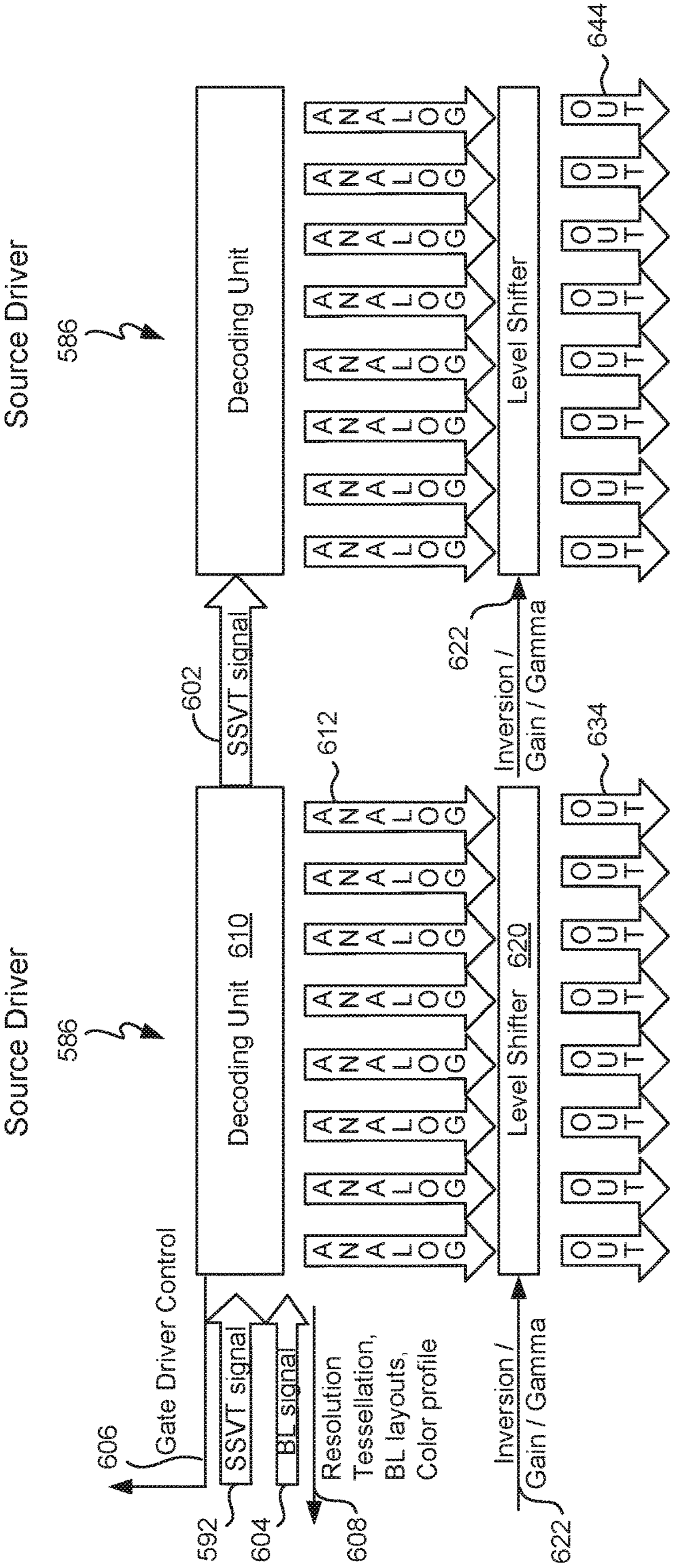
FIG. 19 illustrates display source drivers.

FIG. 19 illustrates display source drivers 586. Multiple source drivers can be cascaded as shown and as known in the art; these multiple source drivers then drive the display panel. As shown, a source driver 586 does not require a DAC (in the signal path for converting digital samples into analog samples for display) as required in prior art source drivers. Input to a decoding unit 610 of each source driver is an analog SSVT signal 592 that has been encoded upstream either within the display unit itself or external to the display unit as is described herein. As shown, SSVT signal 592 is daisy chained between source drivers. In an alternative embodiment, each source driver will have its own SSVT signal and the TCON provides timing information to each source driver chip.

Decoding unit 610 may have any number (P) of decoders and having only a single decoder is also possible. Unit 610 decodes the SSVT signal or signals (described in greater detail below) and outputs numerous reconstructed analog sample streams 612, i.e., analog voltages (the number of samples corresponding to the number of outputs of the source driver). Because these analog outputs 612 may not be in the voltage range required by the display panel they may require scaling and may be input into a level shifter 620 which shifts the voltages into a voltage range for driving the display panel using an analog transformation. Any suitable level shifters may be used as known in the art, such as latch type or inverter type. Level shifters may also be referred to as amplifiers.

By way of example, the voltage range coming out of the decoding unit might be 0 to 1 V and the voltage range coming out of the level shifter may be −8 up to +8 V (using the inversion signal 622 to inform the level shifter to flip the voltage every other frame, i.e., the range will be −8 to 0 V for one frame and then 0 V to +8 V for the next frame). In this way, the SSVT signals do not need to have their voltages flipped every frame; the decoding unit provides a positive voltage range (for example) and the level shifter flips the voltage every other frame as expected by the display panel. The decoding unit may also implement line inversion and dot inversion. The inversion signal tells level shifter which voltages to switch. Some display panels such as OLED do not require this voltage flipping every other frame in which case the inversion signal is not needed and the level shifter would not flip voltages every other frame. Display panels such as LCD do require this voltage flipping. The inversion signal 622 is recovered from the decoding unit as will be explained below.

Also input into the level shifter 620 can be a gain and a gamma value; gain determines how much amplification is applied and the gamma curve relates the luminous flux to the perceived brightness which linearizes human's optical perception of the luminous flux. Typically, in prior art source drivers both gain and gamma are set values determined by the manufactured characteristics of a display panel. In the analog level shifter 620 gain and gamma may be implemented as follows. Gamma is implemented in the digital part of the system in one embodiment, and level shifting and gain are implemented in the driver by setting the output stage amplification. In the case of gamma, implementation is also possible in the output driver, by implementing a non-linear amplification characteristic. Once shifted, the samples are output into outputs 634 which are used to drive the source electrodes in their corresponding column of the display panel as is known in the art.

In order to properly encode an SSVT signal for eventual display on a particular display panel (whether encoded within the display unit itself or farther upstream outside of that display unit) various physical characteristics or properties of that display panel are needed by the GPU (or other display controller) or whichever entity performs the SSVT encoding. These physical characteristics are labeled as 608 and include, among others, resolution, tessellation, backlight layout, color profile, aspect ratio, and gamma curve. Resolution is a constant for a particular display panel; tessellation refers to the way of fracturing the plane of the panel into regions in a regular, predetermined way and is in units of pixels; backlight layout refers to the resolution and diffusing characteristic of the backlight panel; color profile is the precise luminance response of all primary colors, providing accurate colors for the image; and the aspect ratio of a display panel will have discrete, known values.

These physical characteristics of a particular display panel may be delivered to, hardwired into, or provided to a particular display controller in a variety of manners. In one example, a signal 608 delivers values for these physical characteristics directly from the display panel (or from another location within a display unit) to the SSVT transmitter 540. Or, an SSVT transmitter 540 embedded within a particular display unit comes with these values hardcoded within the transmitter. Or, a particular display controller is meant for use with only particular types of display panels and its characteristic values are hardcoded into that display controller.

Input to the display panel can also be a backlight signal 604 that instructs the LEDs of the backlight, i.e., when to be switched on and at which level. In other words, it is typically a low-resolution representation of an image meaning that the backlight LEDs light up where the display needs to be bright and they are dimmed where the display needs to be dim. The backlight signal is a monochrome signal that can also be embedded within the SSVT signal, i.e., it can be another parallel and independent video signal traveling along with the other parallel video signals, R, G and B (for example), and may be low or high resolution.

Output from decoding unit 610 is a gate driver control signal 606 that shares timing control information with gate drivers 560 on the left edge of the display panel in order to synchronize the gate drivers with the source drivers. Typically, each decoding unit includes a timing acquisition circuit that obtains the same timing control information for the gate drivers and one or more of the source driver flex foils (typically leftmost and/or rightmost source driver) will conduct that timing control information to the gate drivers. The timing control information for the gate drivers is embedded within the SSVT signal and is recovered from that signal using established spread spectrum techniques.

Figure 20:
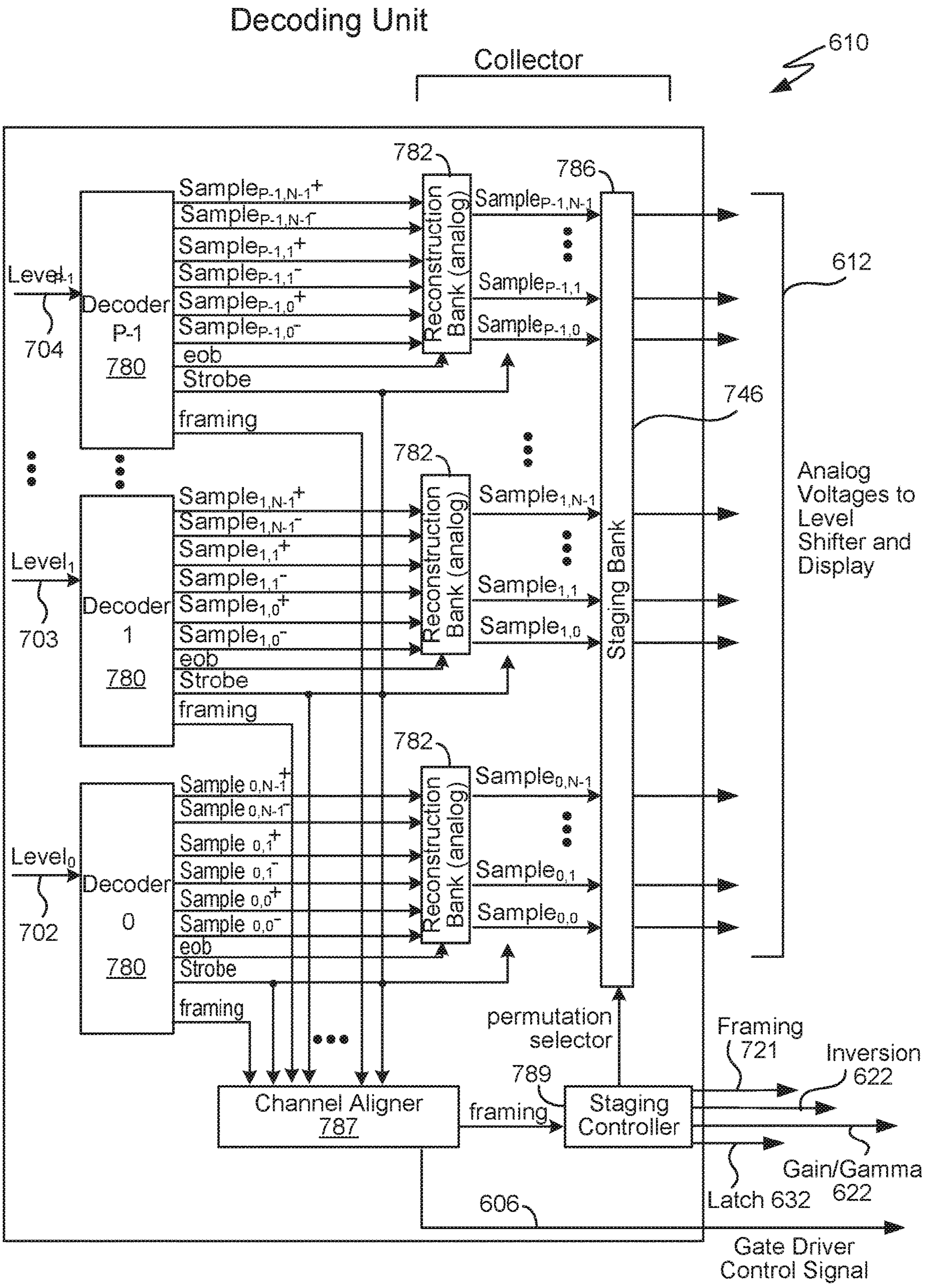
FIG. 20 illustrates a more detailed view of a decoding unit of a source driver.

Note that FIG. 19 shows that the gate driver control signals originate within the decoding unit of a source driver (FIG. 20 has more detail and shows that the gate driver control signals 606 at the bottom originate in the channel aligner 787 associated with the decoders). Also note that FIGS. 2 and 10 show that the timing signals 171 do not travel with the SSVT signals.

Many variations of providing the gate control signals are possible. The gate signal is a stand-alone signal in origin (start pulse+clock+control), but can be transported together with the SSVT signal as shown in FIG. 20 (but need not be encoded). It may also be extracted from the embedded clock signal of the SSVT signal (decoder→framing→aligner). With modern "gate on array" panels, however, the gate signal needs to be modified to multiple clock pulses through a dedicated clock generation integrated circuit, making extraction from the SSVT clock signal less likely (but still possible using the appropriate aligner function). As shown in FIGS. 2, 4, 6, and 10, the gate signal 171 does not travel with the SSVT signals. Typically, the source driver input timing is coordinated with the gate driver timing by the TCON upstream. In one particular implementation, the wiring loom sends the gate driver control signals in parallel with the source driver signals, but the gate driver control signals do not enter the source driver and are not generated by the source driver. Nevertheless, signals 171 may propagate through the flexfoil connecting the source drivers, or may even be propagated through the source drivers themselves in another embodiment.

Typically, a conventional display driver is connected directly to glass using "COF" (Chip-on-Flex or Chip-on-Foil) IC packages; conventional COG (chip-on-glass) is also possible but is not common on large displays. It is possible to replace these drivers by the novel source drivers of FIGS. 19 and 20, thus turning an existing display panel into an SSVT-enabled panel. The inputs of these ICs are usually connected together by a PCBA, providing the input signals from a video source and timing controller. These can be close to or far away from the display panel, transferring the video and control signals across an inexpensive wire.

SSVT Decoding and Integration with Source Driver Detail

On the receive side, the decoders of each source driver are responsible for decoding the stream of the differential EM level signals received over the transmission medium back into a format suitable for display. Once in the suitable format, the video content contained in the samples can be presented on a video display, frame after frame. As a result, the video capture by any video source can be re-created by a video sink. Alternatively, the decoded video information can be stored for display at a later time in a time shifted mode.

FIG. 20 illustrates a more detailed view of a decoding unit 610 of a source driver. P represents the number of input electromagnetic pairs, each pair carrying an SSVT signal independent from the others, except that they are isochronous signals, known to have been generated in lockstep with one another by encoders on the transmit side. The source driver contains P decoders 780 and a collector (blocks 782, 786). A decoder 780 performs the inverse transform of its paired encoder on the transmit side and reconstructs its input differential EM level signals into an output vector of N reconstructed samples (although single-ended inputs rather than differential inputs may be used). The collector assigns the decoder output vector samples (or, "reconstructed samples") to their predetermined positions in the source driver inputs 612. The source driver inputs 612 include S reconstructed samples corresponding to the driven group of columns in the display panel. The retimer function is included within the collector.

The P decoders 780 (labeled 0 through P-1) are arranged to receive differential EM level signals $Level_0$ through $Level_{P-1}$ respectively, 702-704. In response, each of the decoders 780 generates N differential pairs of reconstructed samples ($Sample_0$ through $Sample_{N-1}$). In the case where there are four decoders 780 (P=4), four vectors $V_0$, $V_1$, $V_2$ and $V_3$ are constructed respectively. The number of samples, N, is exactly equal to the number of orthogonal codes used for the earlier encoding i.e., there are N orthogonal codes used, meaning N codes from the code book.

Reconstruction banks 782 sample and hold each of the differential pairs of N reconstructed samples ($Sample_0$ through $Sample_{N-1}$) for each of the four decoder output vectors $V_0$, $V_1$, $V_2$ and $V_3$ at the end of each decoding interval respectively. These received differential pair of voltage signals are then output as samples ($Sample_{N-1}$ through $Sample_0$) for each of the four vectors $V_0$, $V_1$, $V_2$ and $V_3$ respectively. Essentially, each reconstruction bank reconstructs from a differential pair to a single voltage. The staging bank 786 receives all the reconstructed samples ($N_{n-1}$ through $N_0$) for each of the four decoder output vectors $V_0$, $V_1$, $V_2$ and $V_3$ and serves as an analog output buffer as will be described in greater detail below. Once the samples are moved into staging bank 786 they are triggered by a latch signal 632 derived from the decoded SSVT signal. The latch signal may be daisy-chained between source drivers. Once the samples are released from the staging bank they are sent to level shifter 620.

Decoding unit 610 also includes a channel aligner 787 and a staging controller 789, which receives framing information and aperture information from each decoder 780. In response, the staging controller 789 coordinates the timing of the staging bank 786 to ensure that all the samples come from a common time interval in which the level signals were sent by the SSVT transmitter. As a result, the individual channels of the transmission medium do not necessarily have to all be the same length since the channel aligner 787 and staging controller 789 compensate for any timing differences. The gate driver control signals 606 provide the timing information to the gate drivers (or to intermediate circuitry) thus providing the correct timing and control signals to the gate drivers and may originate from channel aligner 787. Note that FIG. 20 discloses a decoder that buffers the samples in staging bank 786 and then shifts levels (amplifies); it is also possible to shift levels and then buffer the samples for output.

Display Panel Source Driver Array

Figure 21:
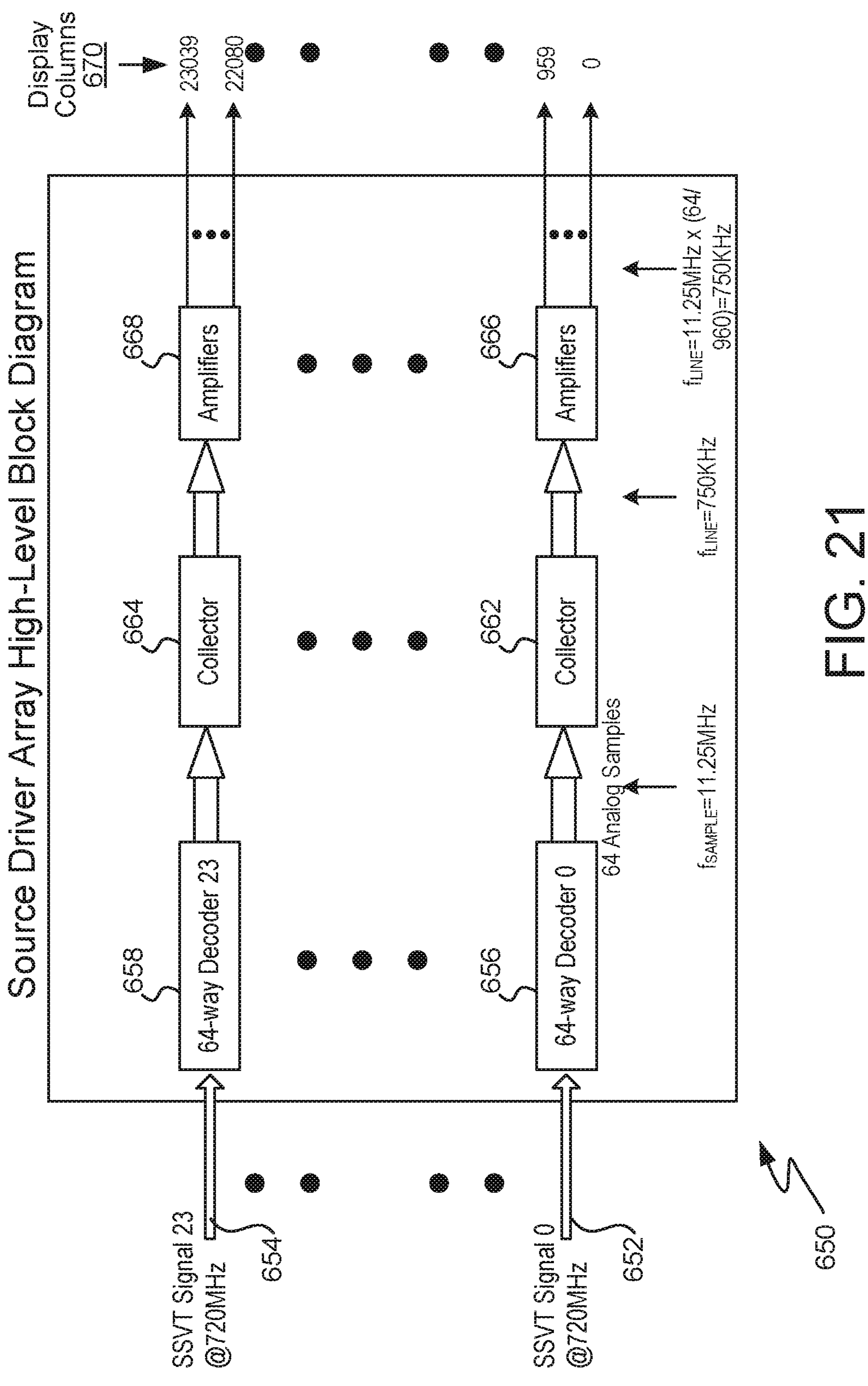
FIG. 21 illustrates an alternative embodiment for implementing an array of source drivers.

FIG. 21 illustrates an alternative embodiment for implementing an array of source drivers. Array 650 is suitable for use with a display panel having 8K resolution and a 144 Hz refresh rate, i.e., an "8K144" panel. FIG. 8 shows in this embodiment that each source driver includes a single decoder (i.e., a decoding unit of one decoder) followed by a collector and amplifiers whereas FIGS. 19 and 20 show that each source driver may have many decoders within the decoding unit of the source driver. Either approach may be used.

Shown are 24 720 MHz SSVT signals 652-654, each being a twisted-wire pair from an SSVT transmitter 540, that is, each twisted wire pair originating at an encoder of the transmitter. Each pair is input into one of decoders 656-658, each decoder outputting 64 analog samples at a frequency of 11.25 MHz. These samples are each input into one of 24 collectors 662-664, each collector collecting 15 sets of these samples before updating its output once every 15 decoding intervals as is shown in greater detail below. As mentioned above, each collector consists of a reconstruction bank plus a staging bank (not shown explicitly in this drawing). In turn, these 960 analog samples from each collector are then input at a frequency of 750 kHz into one of amplifiers 666-668 for amplification before being output at a frequency of 750 kHz (11.25 MHz×64/960) as amplified analog levels 670 onto the display columns of the display panel. In the interests of clarity, not shown are signals 604, 606, 608, 622, 632 which are shown in FIGS. 19 and 20.

Theoretically, the amplifiers or level shifters may be left out if the encoded SSVT signals are higher voltages and the decoded signals result in sample voltages that are required by a display. But, as the SSVT signal will typically be low voltage (and a higher voltage output is required for a display), amplification is necessary. Note that FIG. 21 discloses a decoder that buffers the samples in collector 664 and then amplifies; it is also possible to amplify and then collect (buffer) the samples for output. Either embodiment may be used.

Figure 22:
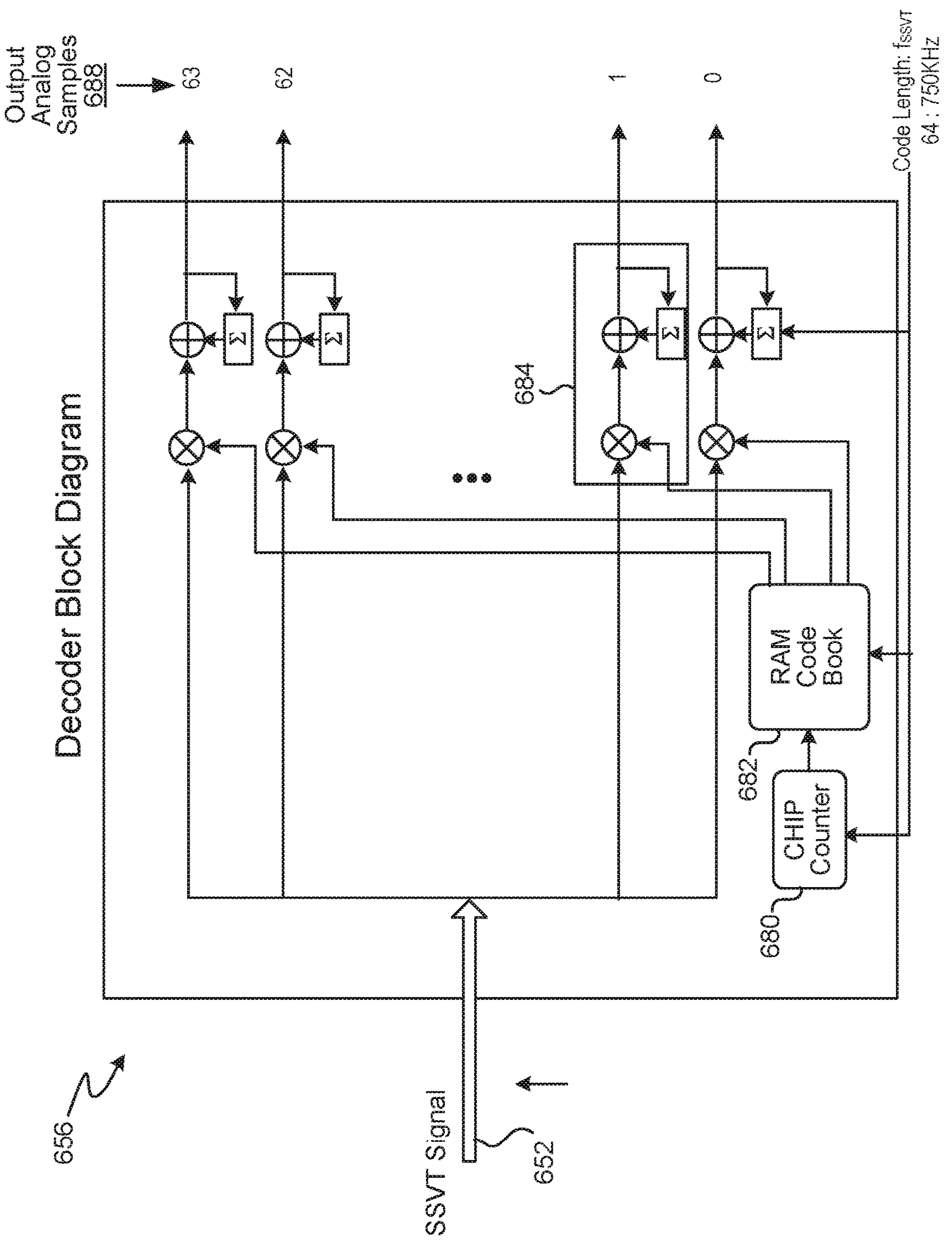
FIG. 22 is a block diagram of one of the decoders from FIG. 21.

FIG. 22 is a block diagram of one of the decoders 656 from FIG. 21. Shown is one of the SSVT signals 652 being input to the decoder. The decoder includes a chip counter 680, a codebook 682 typically stored in RAM that contains the orthogonal codes used for encoding and decoding, as well as a block diagram 684 for each decoding circuit for each of the 64 output analog samples 688. Each group of 64 analog samples are output "valid" every 1 out of L cycles at 11.25 MHz. Decoding is explained in greater detail below along with specific circuit diagrams.

Figure 23:
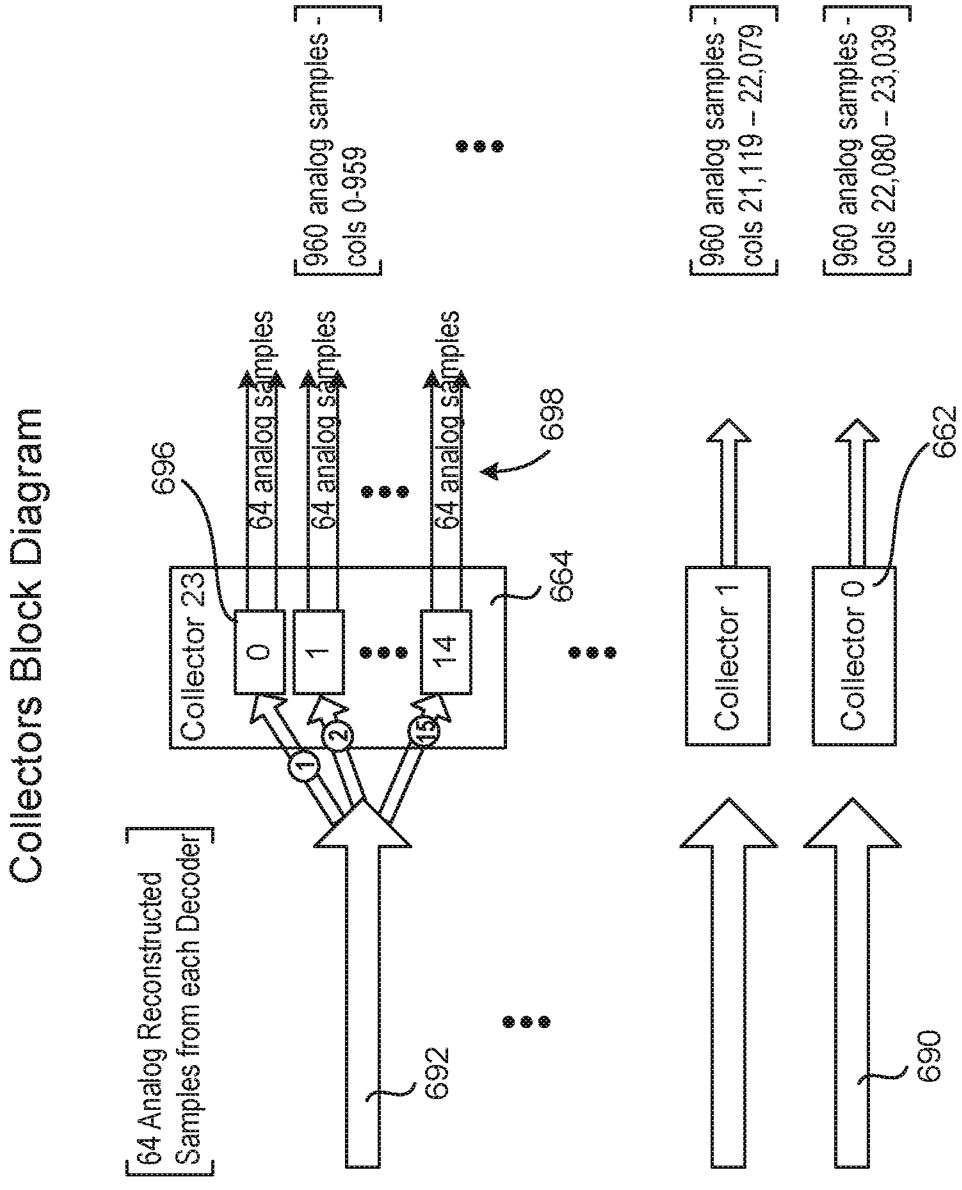
FIG. 23 is a block diagram of the collectors from FIG. 21 and show more detail of the staging bank from FIG. 20.

FIG. 23 is a block diagram of the collectors from FIG. 21 and show more detail of the staging bank 786 from FIG. 20. Basically, an individual collector performs serial-to-parallel conversion into a partitioned line buffer. Shown input into each of collectors 662-664 is a set of 64 analog samples 690-692 from each decoder at a frequency of 11.25 MHz (not shown is the reconstruction bank 782). As shown, during each decoding interval, a new set of incoming 64 reconstructed samples is stored within a collector, each collector being filled once every 15 decoding intervals. After each 15 decoding intervals, the 960 stored samples 698 from each collector are output into their corresponding amplifiers 666-668 before being delivered to the corresponding columns of the display panel as shown. In one particular embodiment, each of the source drivers of FIG. 21 (e.g., decoder 658, collector 664 and amplifiers 668) are implemented within an integrated circuit and each such integrated circuit may be mounted upon a flexible PCB 584.

Decoder Detailed Embodiment

Figure 24:
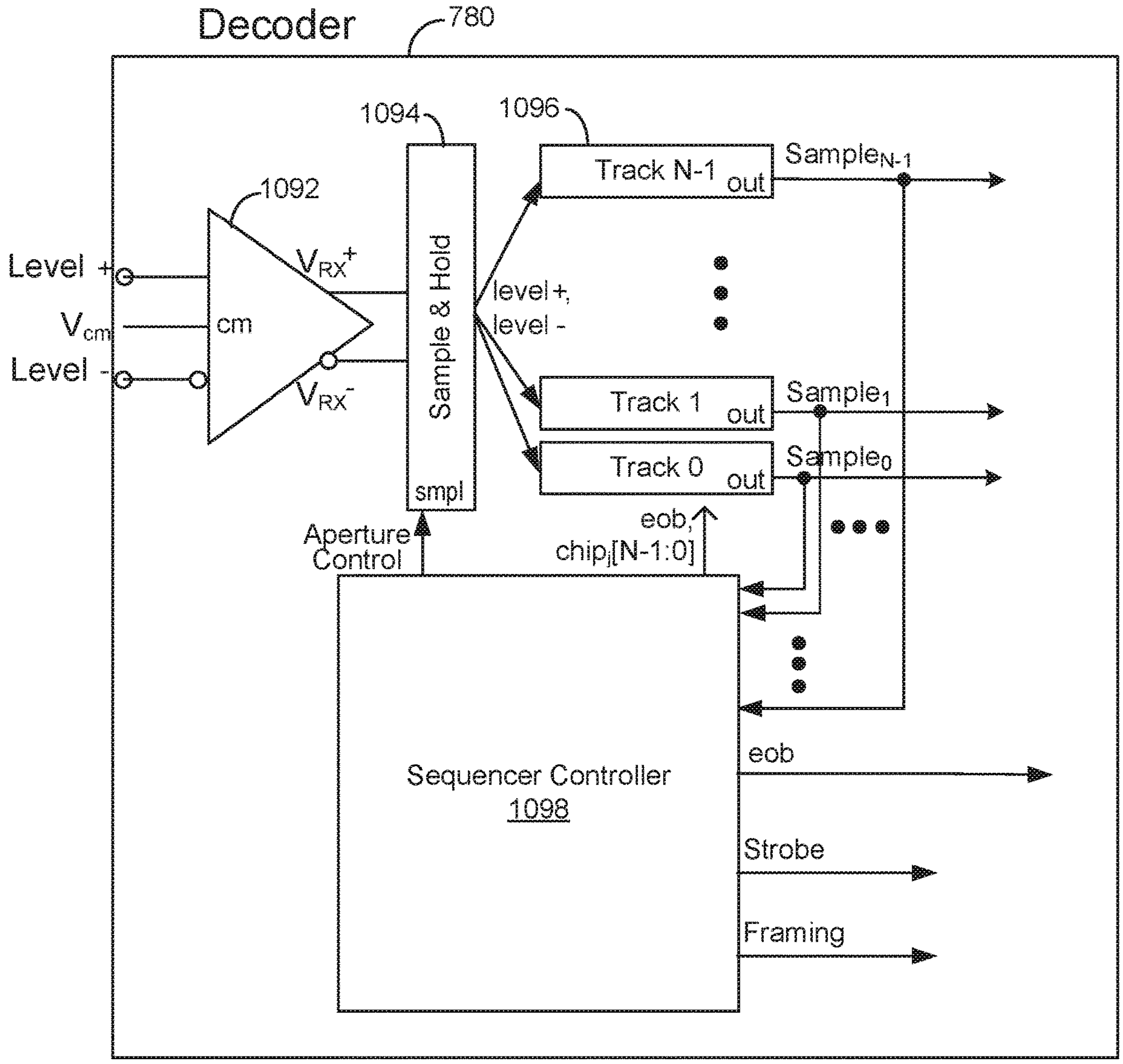
FIG. 24 is a logic diagram for one of the four decoders.

FIG. 24 is a logic diagram for one of the four decoders 780. The decoder 780 includes differential amplifier 1092 and sample and hold circuit 1094 arranged to receive, sample and hold one of the four differential EM level signals received over the transmission medium. Other types of circuits (receivers) arranged to receive, sample and hold an input EM level signal may also be used. The sampled EM level signals are then provided to each of N decoder track circuits 1096 ($N_{n-1}$ through $N_0$). A sequencer controller 1098 provides the same SSDS chip to each of N decoder track circuits 1096 that was applied on the transmit side respectively. As a result, the sample outputs ($N_{n-1}$ through $N_0$) are provided to the reconstruction bank 782. As the same SSDS chip that was used on the transmit side is used by each of the decoder track circuits 1096 the demodulated sample $N_{n-1}$ through $N_0$ is the same as prior to modulation on the transmit side.

The controller 1098 of each of the decoders 780 also generates a number of control signals, including a strobe signal, an end-of-bank (EOB) signal, an aperture signal and a framing signal. The EOB signal is provided to the reconstruction bank 782 and signifies the timing for when the staging bank 786 is completely full with samples. When this occurs, the EOB signal is asserted, clearing both the decoder tracks 1096 and the staging bank 786 in anticipation of a next set of reconstructed samples ($N_{n-1}$ through $N_0$). The aperture control signal is provided to the sample and hold circuit 1094, and the framing signal is provided to the channel aligner 787 and also to the staging controller 789.

Figure 25:
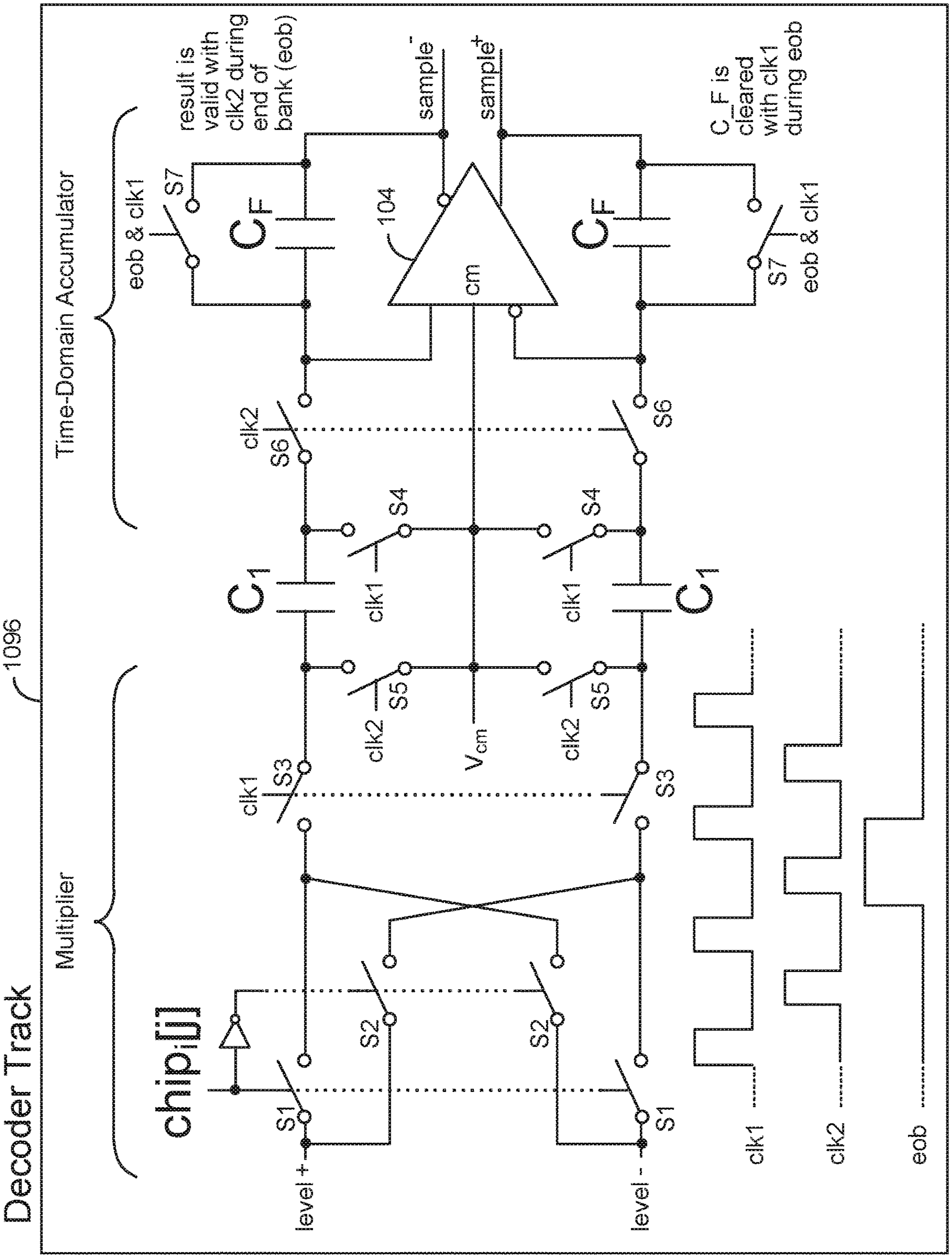
FIG. 25 a diagram of a representative decoder track circuit as illustrated.

Referring to FIG. 25, a diagram of a representative decoder track circuit 1096 as illustrated. The decoder track circuit 1096 includes a multiplier portion and an accumulator portion. The multiplier portion includes a first pair of switches S1-S1, a second pair of switches S2-S2, a third pair of switches S3-S3 and a pair of capacitors C1-C1 on first (positive) and second (negative) power rails respectively.

The accumulator portion includes additional pairs of transistors S4-S4, S5-S5, S6-S6 and S7-S7, an operational amplifier, and a pair of capacitors $C_F$ and $C_F$ on the first (positive) and second (negative) power rails respectively. For each demodulation cycle, a differential EM level signal pair is received at the first level input (level +) terminal and a second level input (level −) terminal. The differential EM level signal pair is demodulated in the multiplier portion by conditionally inverting by multiplying by either positive (1) or negative (−1), depending on the value of the received SSDS chip.

If the SSDS chip has a value of (+1), then transistor pairs S1-S1 and S3-S3 close, while S2-S2 remain open, when clk 1 is active. As a result, the voltage values at the first level input (level +) terminal and the second level input (level −) are passed onto and stored by the two capacitors C1 and C1 on the positive and negative rails respectively. In other words, the input values are multiplied by (+1) and no inversion takes place.

If the SSDS chip has a value of −1, then the S1-S1 switches are both off, while the switches S2-S2 and S3-S3 are all turned on when clk 1 is active. As a result, the voltage values received at the positive or first (+) terminal and the negative or second (−) terminal are swapped. In other words, the input voltage value provided at the first or positive terminal is directed to and stored on the capacitor C1 on the lower negative rail, while the voltage value provided on the second or (−) terminal is switched to and stored on the capacitor C1 on the positive upper rail. The received voltage values at the input terminals are thereby inverted or multiplied by (−1).

When clk 1 transitions to inactive, the accumulated charge on C1 and C1 remain. When clk 2 transitions to active, then transistor pairs S4-S4 open while transistor pairs S5-S5 and S6-S6 close. The accumulated charge on the capacitors C1 on the upper or positive rail and C1 on the lower or negative rail are then provided to the differential inputs of the operational amplifier. The output of the operational amplifier is the original +/− sample pair prior to encoding on the transmit side.

The accumulated charge on the two capacitors C1 and C1 are also passed on to the capacitors CF and CF on the upper or positive rail and the lower or negative rail when Clk 2 is active. With each demodulation cycle, the charges on the capacitors C1 and C1 on the upper and lower rails are accumulated onto the two capacitors CF and CF on the upper and lower rails, respectively. When clk 1 and the EOB signal are both active, then the transistor pair S7-S7 are both closed, shorting the plates of each of the capacitors CF and CF. As a result, the accumulated charge is removed, and the two capacitors CF and CF are reset and ready for the next demodulation cycle.

Since each decoder 780 has N decoder track circuits 1096, N decoded or original +/− sample pairs are re-created each demodulation cycle. These N +/− sample pairs are then provided to the reconstruction bank 782, and then to the staging bank 786. As a result, the original set of samples is re-created with its original color content information (e.g., S=3 for RGB).

The decoder track 1096 reconstructs incoming level samples over a succession of L cycles, demodulating each successive input level with the successive SSDS chips of that tracks code. The results of each of the L demodulations is accumulated on the feedback capacitor CF. When EOB is asserted during clk 1 corresponds to the first demodulation cycle of the decoding cycle, CF is cleared after EOB such that it can begin again accumulating from zero volts or some other reset voltage. In various non-exclusive embodiments, the value of L is a predetermined parameter. In general, the higher the parameter L the greater the SSDS process gains and the better the electrical resiliency of the transmission of the SSVT signals over the transmission medium. On the other hand, the higher the parameter L, the higher the required frequency for the application of the SSVT modulation, which may compromise the signal quality due to insertion losses caused by the transmission medium. The above-described demodulation cycle is repeated over and over with each of the decoders. The net result is the recovery of the original time-ordered sets of samples, each with their original color content information (i.e., a set of S samples).

Mobile Telephone Specific Embodiment

Figure 28:
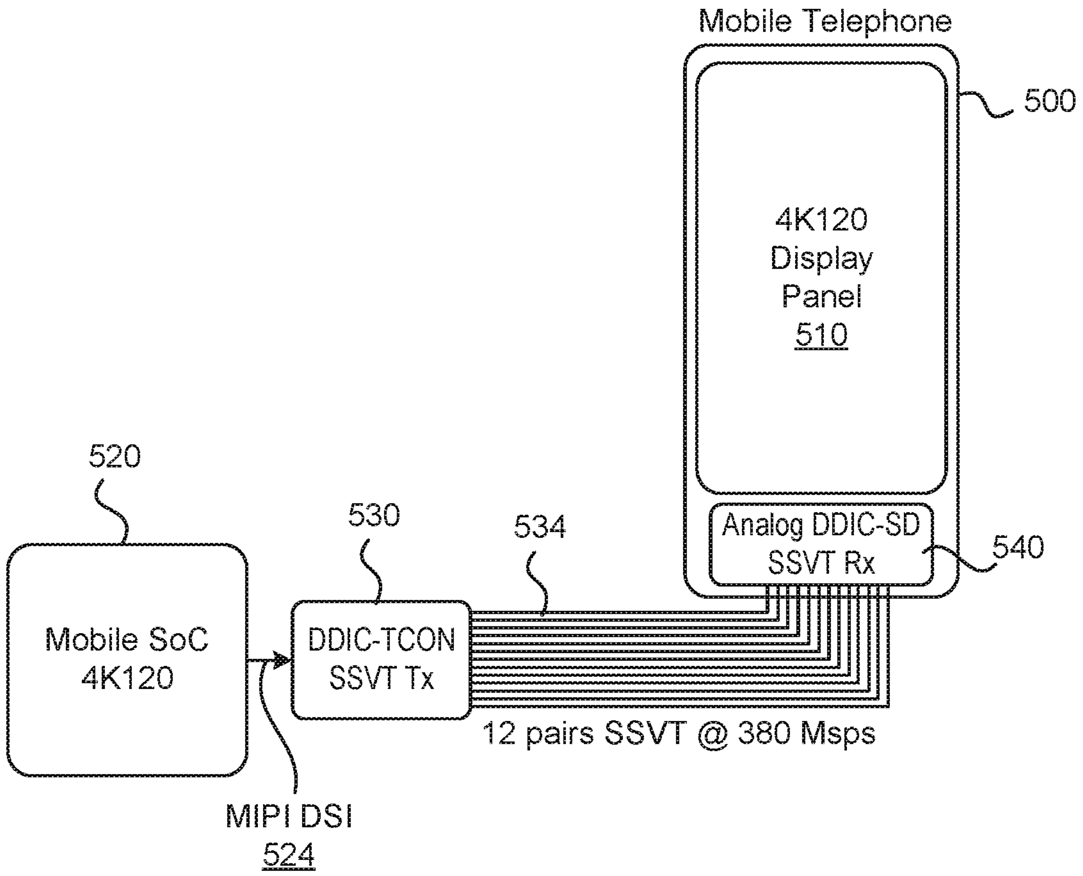
FIG. 28 is a block diagram of using SSVT to transport video samples within a mobile telephone.

FIG. 28 is a block diagram of using SSVT to transport video samples within a mobile telephone. Prior art displays on existing OLED DDIC devices such as mobile telephones are in need of improvement due to the high refresh rate of 4K smartphone displays, the MIPI receiver, SRAM, digital image processing, and significant use of analog signals requiring approximately 1,000 digital-to-analog converters.

We propose a split OLED DDIC architecture which will have the following advantages: enables optimal DDIC-TCON and DDIC-SD partitioning; provides a short distance MIPI transmission from the SoC; optimizes the digital DDIC-TCON for SRAM and image processing; provides a simplified DDIC which is all analog; and only requires a small number of digital-to-analog converters in DDIC-TCON integrated with the SSVT transmitter.

Shown is a mobile telephone (or smartphone) 500 which may be any similar handheld, mobile device used for communication and display of images or video. Device 500 includes a display panel 510, a traditional mobile SoC 520, an integrated DDIC-TCON (Display Driver IC-Timing Controller) and SSVT transmitter module 530, and an integrated analog DDIC-SD (DDIC-source driver) and SSVT receiver 540. Mobile SoC 520 and module 530 are shown external to the mobile telephone for ease of explanation although they are internal components of the telephone.

Mobile SoC 520 is any standard SoC used in mobile devices and delivers digital video samples via MIPI DSI 524 (Mobile Industry Processor Interface Display Serial Interface) to the module 530 in a manner similar to V×1 input signals discussed above. Included within module 530 is the DDIC-TCON integrated with an SSVT transmitter. Upon a reading of this disclosure and with reference to the previous drawings, one of skill in the art will understand how to implement the SSVT transmitter in order to output any number of analog SSVT signals 534. In this example, the SSVT transmitter outputs 12 pairs of SSVT signals at 380 Msps. Not shown are the timing and framing controls signals from module 530 to the gate drivers of display panel 510. Typically, for a mobile telephone, the DDICs are located at the bottom narrow edge of the telephone while the SoC is about in the middle of the device. Accordingly, the integrated DDIC-TCON/SSVT transmitter is located close to the SoC, within about 10 cm or less, or even about 1-2 centimeters or less. Since the transmission of digital data is at extreme frequencies, it is advantageous to keep the conductor lengths as short as possible. For a table computer, the distance is about 25-30 cm or less.

These analog SSVT signals received at the integrated analog DDIC-SD and SSVT receiver 540. A description of how to integrate a source driver with an SSVT receiver in order to receive any number of analog SSVT signals and to generate voltages for driving a display panel may be found herein and in application Ser. No. 17/900,570 referenced above. Advantageously, only a single source driver is needed to drive the display panel 510 and module 540 does not need any digital-to-analog converters.

Other Embodiments

The invention includes the following other embodiments.

1. An apparatus that integrates a timing controller with an encoder, said apparatus comprising:
   - a line buffer controller that receives at least one media signal of digital samples originating at a system-on-chip of a display set;
   - a line buffer in communication with said line buffer controller arranged to store a line of said digital samples;
   - at least one DAC that receives a subset of said line of said digital samples and outputs a subset of analog samples;
   - at least one encoder that encodes said output subset of analog samples from said at least one DAC and outputs a series of analog output values presented to an electromagnetic pathway corresponding to said at least one encoder; and
   - a gate driver controller arranged to receive framing flags from said line buffer controller and to output gate driver control signals to gate drivers of said display set.
2. An apparatus as recited in embodiment 1 wherein said apparatus is integrated within a single integrated circuit of said display set.
3. An apparatus as recited in embodiment 1 wherein said output values are delivered over said electromagnetic pathway to a corresponding decoder associated with a source driver of said display set.
4. An apparatus as recited in embodiment 3 wherein said output values are a series of analog values delivered from said encoder to said decoder.
5. An apparatus as recited in embodiment 1 further comprising:
   - an unpacker that receives a digital video signal from said system-on-a-chip and produces said at least one media signal.
6. An apparatus as recited in embodiment 1 wherein said at least one media signal is a plurality of media signals which are R, G, B signals.
7. An apparatus as recited in embodiment 1 wherein said line buffer controller receives three media signals, R, G and B, store said samples in said line buffer and delivers said subset of said samples to said DAC.
8. An apparatus as recited in embodiment 2 wherein said integrated circuit is located within about 10 cm of said system-on-a-chip.
9. An apparatus that integrates a timing controller with an encoder, said apparatus comprising:
   - a line buffer controller that receives at least one media signal of digital samples originating at a system-on-chip of a display set;
   - a line buffer in communication with said line buffer controller arranged to store a line of said samples;
   - at least one encoder that inputs a subset of said digital samples and outputs a series of digital output values;
   - a DAC that receives said series of digital output values and outputs a series of analog output values that are presented to an electromagnetic pathway corresponding to said at least one encoder; and
   - a gate driver controller arranged to receive framing flags from said line buffer controller and to output gate driver control signals to gate drivers of said display set.
10. An apparatus as recited in embodiment 9 wherein said apparatus is integrated within a single integrated circuit of said display set.
11. An apparatus as recited in embodiment 9 wherein said analog output values are delivered over said electromagnetic pathway to at least one corresponding decoder associated with a source driver of said display set.
12. An apparatus as recited in embodiment 11 wherein said output values are a series of analog values delivered from said encoder to said decoder.
13. An apparatus as recited in embodiment 9 further comprising:
    - an unpacker that receives a digital video signal from said system-on-a-chip and produces said at least one media signal.
14. An apparatus as recited in embodiment 9 wherein said at least one media signal is a plurality of media signals which are R, G, B signals.
15. An apparatus as recited in embodiment 9 wherein said line buffer controller receives three media signals, R, G and B, store said samples in said line buffer and delivers said subset of said samples to said DAC.
16. An apparatus as recited in embodiment 10 wherein said integrated circuit is located within about 10 cm of said system-on-a-chip.
17. An apparatus that integrates a timing controller and an encoder with a system-on-chip of a display set, said apparatus comprising:
    - a line buffer controller that receives at least one media signal of digital samples originating at said system-on-chip, wherein said timing controller, said encoder and said system-on-chip are integrated within an integrated circuit;
    - a line buffer in communication with said line buffer controller arranged to store a line of said digital samples;
    - at least one DAC that receives a subset of said line of said digital samples and outputs a subset of analog samples;
    - at least one encoder that encodes said output subset of analog samples from said at least one DAC and outputs a series of analog output values presented to an electromagnetic pathway corresponding to said at least one encoder; and
    - a gate driver controller arranged to receive framing flags from said line buffer controller and to output gate driver control signals to gate drivers of said display set.
18. An apparatus that integrates a timing controller and an encoder with a system-on-chip of a display set, said apparatus comprising:
    - a line buffer controller that receives at least one media signal of digital samples originating at said system-on-chip, wherein said timing controller, said encoder and said system-on-chip are integrated within an integrated circuit;
    - a line buffer in communication with said line buffer controller arranged to store a line of said samples;
    - at least one encoder that inputs a subset of said digital samples and outputs a series of digital output values;
    - a DAC that receives said series of digital output values and outputs a series of analog output values that are presented to an electromagnetic pathway corresponding to said at least one encoder; and a gate driver controller arranged to receive framing flags from said line buffer controller and to output gate driver control signals to gate drivers of said display set.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. An apparatus that integrates a timing controller with a transmitter, said apparatus comprising:

at least one receiver arranged to receive a plurality of streams of digital video samples originating at a system-on-chip of a display set;

a distributor arranged to distribute said digital video samples of said streams into a plurality of input vectors according to a predetermined permutation, each input vector having N digital video samples;

a plurality of digital-to-analog converters (DACs) for each input vector that convert said digital video samples of said each input vector into analog video samples in parallel;

a line driver for each input vector that receives said N analog video samples as an ordered series of L analog output values, wherein L>=N>=2, and transmits said series of L analog values to a display of said display set via an electromagnetic pathway corresponding to said line driver; and a gate driver controller arranged to output gate driver control signals to gate drivers of said display of said display set.

2. The apparatus as recited in claim 1 wherein L=N.

3. The apparatus as recited in claim 2 further comprising:

an encoder for each input vector that encodes said N analog samples of said each input vector with reference to a predetermined code set of N codes each of length L into said ordered series of L analog output values, each of said N codes being associated with one of said samples, wherein said code set is an identity matrix and chip values in said code set are constrained to be "+1" or "0."

4. The apparatus as recited in claim 1 further comprising:

an encoder for each input vector that encodes said N analog samples of said input vector with reference to a predetermined code set of N mutually-orthogonal codes each of length L into said ordered series of L analog output values, each of said N codes being associated with one of said samples.

5. An apparatus as recited in claim 1 wherein said apparatus is integrated within a single integrated circuit of said display set.

6. An apparatus as recited in claim 1 wherein said distributor inputs said digital video samples of said streams at a first clock frequency and outputs said input vectors to said DACs of said input vectors at a second clock frequency slower than said first clock frequency, thus effecting a clock domain crossing.

7. An apparatus as recited in claim 1 wherein said system-on-chip (SoC) is integrated with said timing controller and said transmitter within said apparatus, and wherein said SoC receives a digital video signal external to said display set, said streams of digital video samples being derived from said digital video signal.

8. An apparatus that integrates a timing controller with a transmitter, said apparatus comprising:

at least one receiver arranged to receive a plurality of streams of digital video samples originating at a system-on-chip of a display set;

a distributor arranged to distribute said digital video samples of said streams into a plurality of input vectors according to a predetermined permutation, each input vector having N digital video samples;

a digital-to-analog converter (DAC) for each input vector that receives said each N digital video samples as a series of L digital values and converts said series of L digital values into a series of L analog values that are transmitted to a display of said display set via an electromagnetic pathway corresponding to said each DAC; and a gate driver controller arranged to output gate driver control signals to gate drivers of said display of said display set.

9. The apparatus as recited in claim 8 wherein L=N.

10. The apparatus as recited in claim 9 further comprising:

an encoder for each input vector that encodes said N digital samples of said each input vector with reference to a predetermined code set of N codes each of length L into said ordered series of L digital values, each of said N codes being associated with one of said samples, wherein said code set is an identity matrix and chip values in said code set are constrained to be "+1" or "0."

11. The apparatus as recited in claim 8 further comprising:

an encoder for each input vector that encodes said N digital samples of said input vector with reference to a predetermined code set of N mutually-orthogonal codes each of length L into said ordered series of L digital values, each of said N codes being associated with one of said samples.

12. An apparatus as recited in claim 8 wherein said apparatus is integrated within a single integrated circuit of said display set.

13. An apparatus as recited in claim 8 wherein said distributor inputs said digital video samples of said streams at a first clock frequency and outputs said input vectors to said DACs of said input vectors at a second clock frequency slower than said first clock frequency, thus effecting a clock domain crossing.

14. An apparatus as recited in claim 8 wherein said system-on-chip (SoC) is integrated with said timing controller and said transmitter within said apparatus, and wherein said SoC receives a digital video signal external to said display set, said streams of digital video samples being derived from said digital video signal.

15. A system for transporting video to a display panel of a display set, said system comprising:

a transmitter integrated with a timing controller that receives a plurality of streams of digital video samples originating at a system-on-chip of said display set, said transmitter including a distributor arranged to distribute said digital video samples of said streams into a plurality of input vectors each of length N according to a predetermined permutation, said transmitter arranged to transmit each of said input vectors of N digital video samples as a series of L analog values to said display panel via an electromagnetic pathway per series of L analog values, said transmitter including a gate driver controller arranged to output gate driver control signals to gate drivers of said display panel, wherein L>=N>=2; and a plurality of source drivers, each source driver arranged to receive one of said series of L analog values from said transmitter and to produce N analog samples for output on outputs of said source driver, whereby said streams of digital video samples may be displayed on said display panel of said display set.

16. The system as recited in claim 1 wherein L=N.

17. The system as recited in claim 16 further comprising:

an encoder for each input vector that encodes said N samples of said each input vector with reference to a predetermined code set of N codes each of length L into said ordered series of L analog values, each of said N codes being associated with one of said samples, wherein said code set is an identity matrix and chip values in said code set are constrained to be "+1" or "0."

18. The system as recited in claim 15 further comprising:

an encoder for each input vector that encodes said N samples of said input vector with reference to a predetermined code set of N mutually-orthogonal codes each of length L into said ordered series of L analog values, each of said N codes being associated with one of said samples.

19. The system as recited in claim 15 wherein said distributor inputs said digital video samples of said streams at a first clock frequency and outputs said input vectors to DACs of said input vectors at a second clock frequency slower than said first clock frequency, thus effecting a clock domain crossing.

20. The system as recited in claim 15 wherein said system-on-chip (SoC) is integrated with said timing controller and said transmitter, and wherein said SoC receives a digital video signal external to said display set, said streams of digital video samples being derived from said digital video signal.

21. The system as recited in claim 15 wherein said transmitter further includes at least one digital-to-analog converter (DAC) that converts said digital video samples into said L analog video values.

* * * * *